(12) United States Patent
Krekeler et al.

(10) Patent No.: US 7,647,935 B2
(45) Date of Patent: Jan. 19, 2010

(54) RADIOACTIVE MATERIAL SEQUESTRATION

(75) Inventors: Mark P. S. Krekeler, Centreville, VA (US); Stephen C. Elmore, Stafford, VA (US); Cynthia Tselepis, Arlington, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 18 days.

(21) Appl. No.: 11/742,589

(22) Filed: Apr. 30, 2007

(65) Prior Publication Data

US 2007/0253897 A1    Nov. 1, 2007

Related U.S. Application Data

(60) Provisional application No. 60/746,095, filed on May 1, 2006.

(51) Int. Cl.
*G21F 9/16* (2006.01)

(52) U.S. Cl. .................... 134/109; 134/113; 134/169 C; 134/184; 588/900

(58) Field of Classification Search ............ 15/3.5, 15/3.51, 3.52, 320, 3; 134/1, 169 R, 109, 134/110, 113, 169 C, 184; 588/9, 900, 13
See application file for complete search history.

(56) References Cited

U.S. PATENT DOCUMENTS

| | | | | | |
|---|---|---|---|---|---|
| 3,421,939 | A | * | 1/1969 | Jacke ............................ | 134/1 |
| 4,691,724 | A | * | 9/1987 | Garcia et al. ............ | 134/169 R |
| 4,775,494 | A | * | 10/1988 | Rowsell et al. .................. | 588/9 |
| 4,781,860 | A | * | 11/1988 | Doan ............................ | 588/9 |
| 6,517,639 | B2 | * | 2/2003 | Toepfer et al. ................ | 134/21 |

* cited by examiner

*Primary Examiner*—Matthew O Savage
(74) *Attorney, Agent, or Firm*—David Yee

(57) ABSTRACT

A radioactive material sequestration system may include a radionuclide containment composition dispenser and a sorption based media container. The radionuclide containment composition dispenser may be configured for holding a radionuclide containment composition and be capable of dispensing the radionuclide containment composition to remove radionuclides from a radioactive material. The radionuclide containment composition is a mixture of a clay mineral and water. The sorption based media container may be configured for holding a sorption based media; receiving dispensed radionuclide containment composition; and sequestering the radionuclides. The radioactive material sequestration system may also include a probe.

8 Claims, 34 Drawing Sheets

RADIOACTIVE MATERIAL SEQUESTRATION

CROSS REFERENCE TO RELATED APPLICATIONS

The present application claims the benefit of provisional patent application Ser. No. 60/746,095 to Krekeler et al., filed on May 1, 2006, entitled "Radioactive Material Sequestration," which is hereby incorporated by reference.

DETAILED DESCRIPTION OF THE INVENTION

Figure 1:
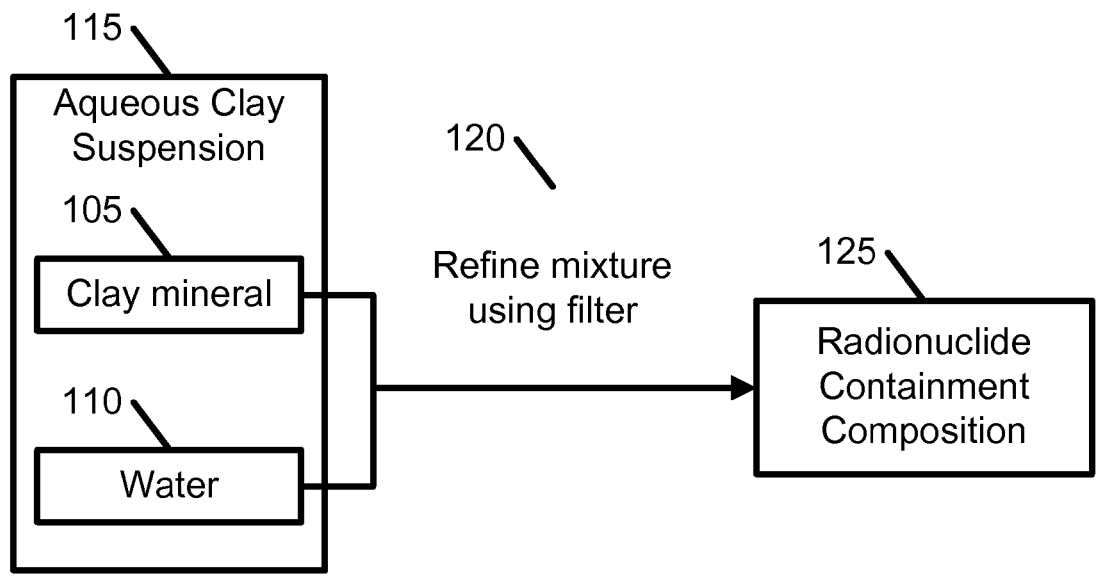
FIG. 1 shows an example of a block diagram for creating a radionuclide containment composition.

The present invention embodies compositions, methods and systems for removing sequestered radioactive materials that have been contained by a radionuclide containment composition.

As an embodiment, radioactive material sequestration system may comprise a radionuclide containment composition dispenser and a sorption based media container. The radionuclide containment composition dispenser, which may hold a radionuclide containment composition, may dispense the radionuclide containment composition to remove radionuclides from a radioactive material. When the radionuclide containment composition comes in contact with the radioactive material, the contact generally allows the radionuclides to be exchanged with cations in the radionuclide containment composition. As a result, an aqueous slurry may be formed. The radionuclides can be collected from the aqueous slurry by using a sorption based media, which may be stored in the sorption based media container. Besides serving as a container for holding the sorption based media, the sorption based media container can also be configured for receiving the dispensed radionuclide containment composition and sequestering the radionuclides.

As another embodiment, the radionuclide containment composition may comprise a mixture of a clay mineral and water, forming an aqueous clay suspension. The mixture may be refined into a uniform suspension by filtering the mixture to remove coarse material.

As another embodiment, the clay mineral is montmorillonite.

As another embodiment, the weight ratio of the clay mineral to the water ranges from 1:99 to 99:1.

As another embodiment, the mixture of the clay mineral and water is refined by using sieves to filter and remove coarse material. The aperture size of the sieves can range from 300 µm to <38 µm. Typically, a minimum size of 5 microns was found to be the functional limit to produce materials efficiently.

As another embodiment, the sorption based media is a clay mineral from the palygorskite-sepiolite mineral group.

As another embodiment, the sorption based media may sequester radioactive materials by chemical ion exchange, mechanical separation of floccules, or both.

As another embodiment, to move the aqueous slurry towards the sorption based media, a probe may be used.

As another embodiment, the probe is an ultrasonic probe.

As another embodiment, the probe may have an illuminator device. Examples include flashlights, fluorescent lights, night vision apparatuses, electroluminescent devices, light emitting diodes, etc.

As another embodiment, the probe may have a camera.

As another embodiment, the probe may have a video camera.

As another embodiment, the probe may have a digital camera.

As another embodiment, the probe may have a radiation detector.

As another embodiment, the probe may have a chemical sensor.

As another embodiment, the probe may have a sensor for biological materials.

As another embodiment, the probe may have a sensor for bioweapons, including but not limited to, anthrax, smallpox, and similar agents.

As another embodiment, the probe may have a sensor for chemical weapons, including but not limited to, VX, sarin, ricin, chlorine, hydrofluoric acid and similar materials.

I. Introduction

Radioactive isotopes (also referred to herein as radionuclides) are naturally occurring in the environment or are created using nuclear technologies, such as nuclear reactors, etc. Human exposure to many types of radioactive isotopes may lead to several detrimental health effects, such as cancer, skin burn, organ malfunction, etc. Examples of radioactive isotopes, which are of concern to human health, include, but are not limited to, americium-241 ($^{241}$Am), cesium ($^{134}$Cs, $^{137}$Cs), cobalt-60 ($^{60}$Co), iodine-131 ($^{131}$I), iridium-192 ($^{192}$Ir), lutonium ($^{238}$Pu, $^{239}$Pu, $^{240}$Pu, and $^{242}$Pu), strontium-90 ($^{90}$Sr), uranium-235 ($^{235}$U), uranium-238 ($^{238}$U) and chlorine-36 ($^{36}$Cl).

Radiological materials can be weaponized in many forms by terrorists and used for terrorist attacks. For instance, materials can be packed in a traditional explosive device and detonated in a public area. Such deployment is commonly referred to as a radiological dirty bomb or a radiological dispersal device (RDD).

Because of the possibility of RDD use, a major concern of security deals with water sources, such as public water supplies, rivers, lakes, streams, aquifers, water wells, water storage tanks, water treatment plants, bottling facilities (e.g., water, soda, beer, etc.), sewers and other drainage systems, water pipes, marsh lands, swimming pools, etc. Water is an absolute necessity. If radioactive and/or hazardous materials were used as chemical weapons or dirty bombs and such materials somehow entered into any water supply, catastrophic results can easily occur.

Similar health effects can also occur in nonwater environments or areas where some amount water can be found. For example, dirty bombs or chemical weapons with radioactive material used in parks, buildings, streets, cars, etc. can also have similar deleterious and/or carcinogenic health effects.

One radioactive material of current interest that may be used in RDD is radioactive chloride. While two stable isotopes of chlorine, $^{35}$Cl and $^{37}$Cl, occur naturally, several radioactive isotopes of chlorine also exist, as indicated in TABLE 1.

TABLE 1

Radioactive Isotopes of Chlorine

| Isotope | Mass | Half-life | Mode of decay | Nuclear spin | Nuclear magnetic moment |
|---|---|---|---|---|---|
| $^{36}$Cl | 35.9683 | 301,000 years | $\beta^-$ to $^{36}$Ar | 0 | 1.28547 |
| $^{38}$Cl | 37.968 | 37.2 minutes | $\beta^-$ to $^{38}$Ar | 2 | 2.05 |
| $^{39}$Cl | 38.968 | 55.6 minutes | $\beta^-$ to $^{39}$Ar | 3\2 | |
| $^{40}$Cl | 39.9704 | 1.38 minutes | $\beta^-$ to $^{40}$Ar | 2 | |
| $^{41}$Cl | 40.9707 | 34 seconds | $\beta^-$ to $^{41}$Ar | | |
| $^{42}$Cl | 41.9732 | 6.8 seconds | $\beta^-$ to $^{42}$Ar | | |
| $^{43}$Cl | 42.9742 | 3.3 seconds | $\beta^-$ to $^{43}$Ar | | |

Of particular concern is $^{36}$Cl, which, as shown in TABLE 1, has a half-life of approximately 301,000 years. Its specific activity is about 0.033 (Ci/g) and decays via beta particle emission (generally 98% of decay occurs through this mechanism) and electron capture. The radiation energy is about 0.027 MeV. Lifetime cancer mortality risk coefficient for inhalation is about $9.6 \times 10^{-11}$ pCi. Lifetime cancer mortality risk coefficient for ingestion is about $2.9 \times 10^{-12}$ pCi. The $^{36}$Cl isotope is typically found naturally in very minute quantities from cosmogenic radiation interactions with $^{36}$Ar in the atmosphere, and may be used as a geochronological tool. Additionally, this isotope may also be found in the nuclear water stream. Hence, this isotope can be a component in RDD. It may also become an environmental concern if released into the environment.

Previously, $^{36}$Cl has been produced in large quantities during nuclear weapons testing between 1952 and 1958. The mode of production was achieved by irradiation of seawater. For instance, at the U.S. Department of Energy, Hanford site, graphite neutron moderation material in plutonium production reactors was treated with $Cl_2$ gas at high temperatures. The $^{35}$Cl that remained in the reactors was converted to $^{36}$Cl. Currently, $^{36}$Cl may be found in these reactors, as well as similar reactors, and waste streams from them. The amount of $^{36}$Cl that has been generated by the former Soviet Union and other countries with nuclear capabilities or developing capabilities remain unclear.

Another radioactive material that may be used in RDD is cesium-137 ($^{137}$Cs). Cesium-137 commonly occurs as $^{137}$CsCl and as a major component of nuclear waste stream generated from nuclear technologies worldwide.

$^{137}$Cs decays by emission of beta particles and gamma rays to barium-137m ($^{137}$Ba), a short-lived decay product, which in turn decays to a non-radioactive form of barium ($^{134}$Ba). $^{137}$Cs has a half-life of approximately 30 years.

As one of the most common radioactive isotopes used in various industries, $^{137}$Cs can be implemented in numerous devices. Examples include, but are not limited to, moisture-density gauges in the construction industry, leveling gauges in the piping industry, thickness gauges in industries (such as metal, paper and film), and well-logging devices in the drilling industry.

Another fairly common radioactive isotope is $^{134}$Cs. Having similar properties to $^{137}$Cs, $^{134}$Cs decays (e.g., beta decay) to $^{134}$Ba. The half life of $^{134}$Cs is approximately 2 years. $^{134}$Cs may be used in photoelectric cells in ion propulsion systems under development.

However, when comparing $^{137}$Cs with $^{134}$Cs, $^{137}$Cs tends to have more significant environment and health concerns than $^{134}$Cs. For instance, $^{137}$Cs is often a greater environmental contaminant than $^{134}$Cs. Moreover, although $^{137}$Cs is sometimes used in medical therapies to treat cancer, exposure to $^{137}$Cs (like other radionuclides) can also increase the risk of cancer and damage tissue because of its strong gamma ray source. Nonetheless, $^{134}$Cs can still be a concern for the environment.

Because of cesium's chemical nature, cesium can easily move through the environment, and thus making the cleanup of $^{137}$Cs releases difficult. For example in April 1986, large amounts of $^{137}$Cs were released during the Chernobyl incident. Significant amounts of $^{137}$Cs were deposited in Europe and Asia. Today, $^{137}$Cs can still be found in those areas. According to Great Britain's National Radiological Protection Board, there may be up to 1,000 additional cancers over the next 70 years among the population of Western Europe exposed to fallout from the nuclear accident at Chernobyl, in part due to $^{137}$Cs. Yet, of course, the magnitude of the health risk depends on exposure conditions. These conditions include factors such as strength of the source, length of exposure, distance from the source, and whether there was shielding between the person and the source (such as metal plating).

Although several routes may exist in delivering $^{137}$Cs as a weapon, one expected route is dispersing $^{137}$Cs in the form of radioactive cesium chloride powder ($^{137}$CsCl) in populated areas (e.g., downtowns, malls, etc.). Another anticipated route of dispersing $^{137}$Cs is through water supplies. For example, if 5 kg of $^{137}$CsCl were deposited and dispersed (whether via a dirty bomb or other means) in a large city (e.g., Chicago) having 5 m.p.h. winds, a computer model generated by the Los Alamos National Labs predicts that approximately 300 city blocks would be affected one hour after detonation. Risk of cancer may increase from 1 to 10-fold. The high solubility in water and the relatively low hardness of $^{137}$CsCl are both properties that are normally characteristic of an effective "radiological powder weapon."

In addition to $^{137}$Cs, it is well within the scope of the present invention that other radioactive isotopes may be used as the radioactive ingredient in a radioactive material for use in a dirty bomb or some form of weapon. Examples include all of the radioactive isotopes previously mentioned.

To contain dispersed radioactive material as a weapon (e.g., RDD) having a radioactive isotope or radionuclide, a radionuclide containment composition may be used. The radionuclide containment composition is defined as an aqueous clay suspension comprising a mixture of a clay mineral and water. This suspension may be filtered to remove residual coarse material to impart a processed uniform suspension.

II. Radioactive Material Sequestration Process

Figure 2:
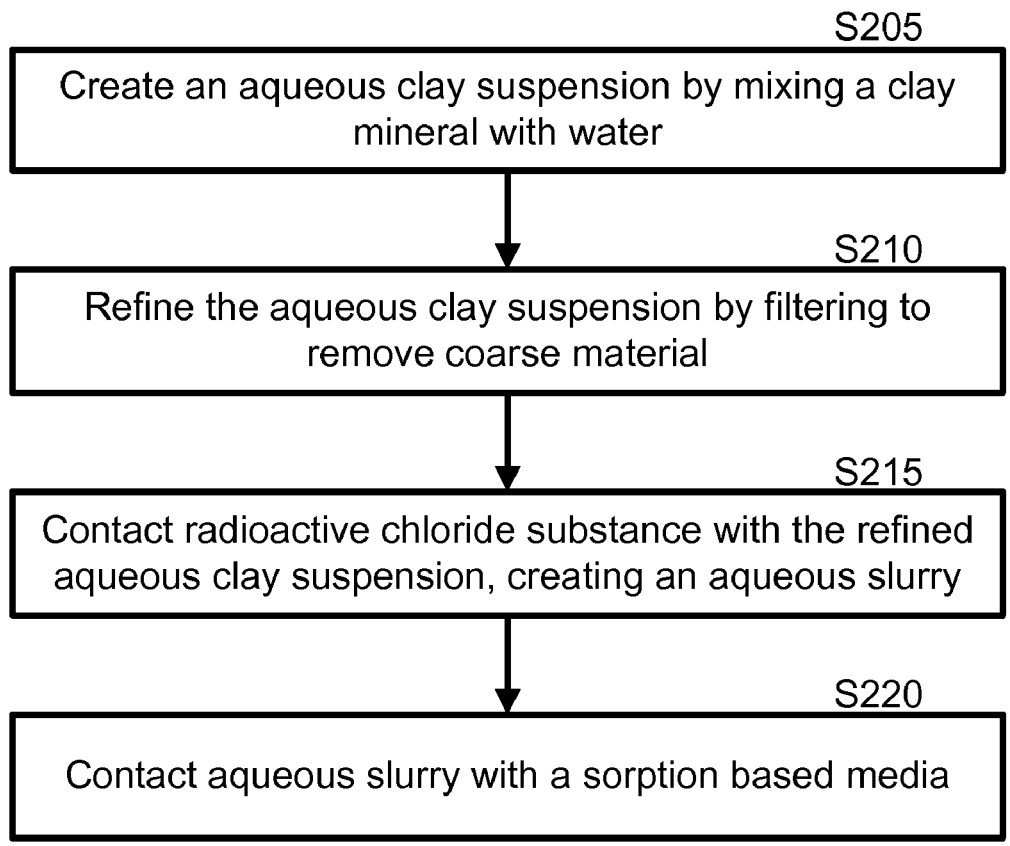
FIG. 2 shows an example of a flow diagram for containing radioactive materials.

Referring to FIGS. 1 and 2, the overall radioactive material sequestration may begin by mixing a clay mineral 105 with water 110 to form an aqueous clay suspension 115, S205. The aqueous clay suspension 115 can be refined by filtering 120 to remove residual coarse material S210. Filtering may be achieved by using sieves with aperture sizes ranging from 300 µm to <38 µm. The resulting refined aqueous clay suspension may be referred to hereinafter as radionuclide containment composition 125. The radionuclide containment composition 125 may be applied to a radioactive material S215. The application may form an aqueous slurry. Radioactive nuclides trapped within this aqueous slurry may be removed using a sorption based media S220. A probe may be used to assist the aqueous slurry to come into contact with the sorption based media.

Figure 3:
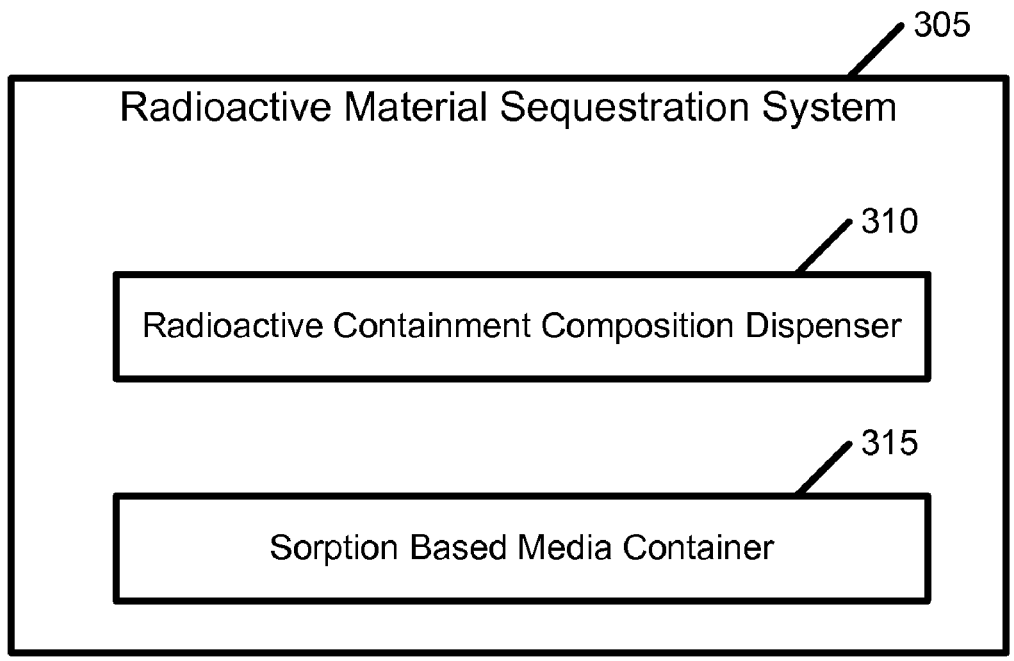
FIG. 3 shows an example of a block diagram of a radioactive material sequestration system.

As shown in FIG. 3, the present invention also embodies a radioactive material sequestration system 305. The radioactive material sequestration system 305 may comprise a radioactive containment composition dispenser 310 and a sorption based media container 315. The radioactive containment composition dispenser 310 may be configured for holding a radionuclide containment composition 125 and being capable of dispensing said radionuclide containment composition 125 to remove radionuclides from one or more radioactive materials. The sorption based media container 315 may be configured for holding a sorption based media; receiving dispensed radionuclide containment composition 125; and sequestering radionuclides.

The radioactive material sequestration system 305 can be operated manually or automatically. Manual operation may include turning on/off a release mechanism (e.g., a switch or valve, etc.). Automatic operation may include the use of sensors that automatically dispenses the radioactive containment composition 125 from the radioactive containment composition dispenser 310 when the sensors detect the presence of radionuclides, chemicals, biohazardous materials, etc. or when a certain threshold of radioactivity is met.

The radioactive material sequestration system 305 may also incorporate a wireless mechanism (e.g., card or other device) that allows the system to be operated remotely and/or wirelessly. A computer or a device may execute a computer-readable program to instruct the radioactive containment composition dispenser 310 to dispense the radionuclide containment composition 125. It may also instruct the timing, amount and rate of dispensing. It may also indicate the levels of radionuclide containment composition 125 remaining in the radioactive containment composition dispenser 310.

Figure 4:
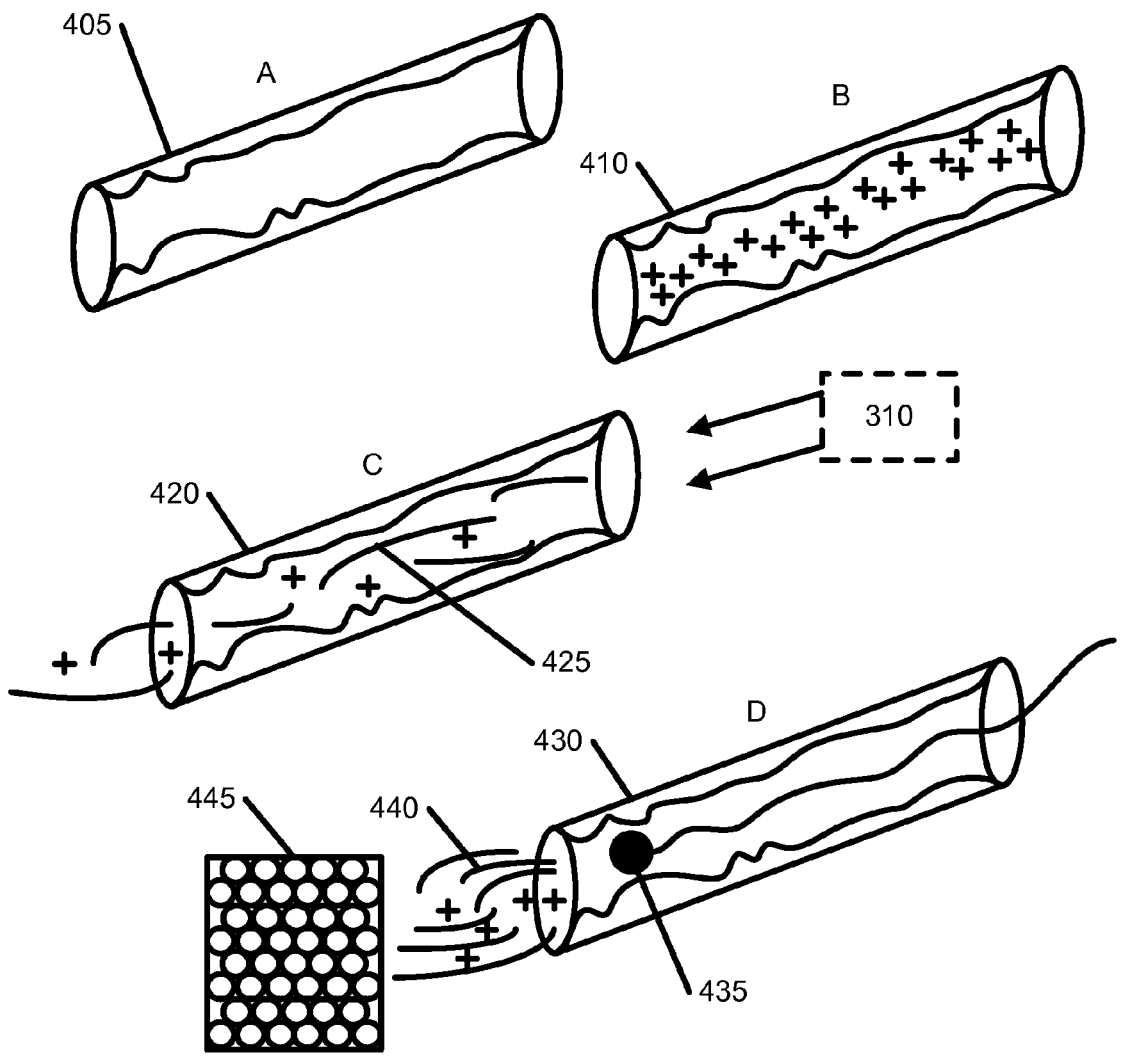
FIG. 4 shows an example of sequestering radioactive materials with the sorption based media.
Figure 4:
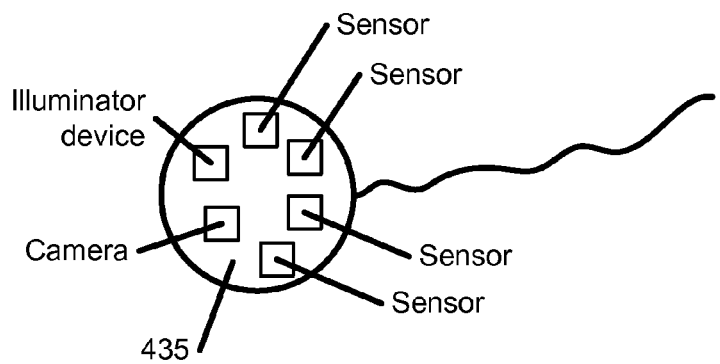

FIG. 4 illustrates an example of how the sorption based media can sequester radioactive materials. As exemplified in A, a pipe 405 may contain water and scale. In B, the pipe 410 may be contaminated with radioactive materials 415. In C, the radionuclide containment composition 125 having a montmorillonite-based liquid is injected into the pipe 420. The combination of the radionuclide containment composition 125 and radioactive materials 415 may create an aqueous slurry 425. It is possible that the radionuclide containment composition 125 may be poured into the pipe 420. Alternatively, it 125 may or be dispersed into the pipe 420 from a radionuclide containment composition dispenser 310. In D, after such composition 125 is sent, a probe 435, such as an ultrasonic probe, may be inserted into the pipe 430. The probe 435 is activated to encapsulate and remove radioactive materials and/or scale 440. This radioactive waste mixture 440 may pass through sorption based media 445, which may for instance comprise palygorskite-rich media, to collect floccules and fine polish the water.

Using a probe may provide a multitude of advantages. For instance, the probe can help move the aqueous slurry towards the sorption based media. The probe may be an ultrasonic probe that sends sonic pulses to move the aqueous slurry. It may also be a rod, pipe cleaner, flexible brush, etc.

To help one see where the radioactive materials and/or aqueous slurry may be present, the probe may have an illuminator device, camera, video camera, digital camera, etc. Examples of the illuminator device include flashlights, fluorescent lights, night vision apparatuses, electroluminescent devices, light emitting diodes, etc.

The probe may even include a detector or sensor to detect radioactive, chemical and/or biological materials. Nonlimiting examples of detectors include a radiation detector, a chemical sensor, a sensor for biological materials, a sensor for bioweapons, including but not limited to, anthrax, smallpox, and similar agents, etc.

The present invention can be used to clean or remediate water pipes that have been affected by radiological contaminants or attacks. Such pipes include, but are not limited to, any pipe system on military or naval vessels, cargo ships, cruise ships, yachts, etc; any pipe system associated with water supply systems for rural and/or urban areas, military bases, agricultural areas, food supplies and/or channels, etc; any stormwater, sewer or drainage pipe systems; etc.

The present invention can also be used in combination with various methods of cleaning, including but not limited to sonic cleaning, vibrational cleaning, rotational cleaning, and chemical cleaning, such as surface bleaching. Cleaning methods (e.g., sonic, vibrational, rotational, chemical cleaning, etc.) of pipe systems may be combined with the use of one or more probes.

The present invention may even be used to clean or remediate reservoirs, aqueducts, water treatment plants, etc.

A. Clay Mineral

Figure 5:
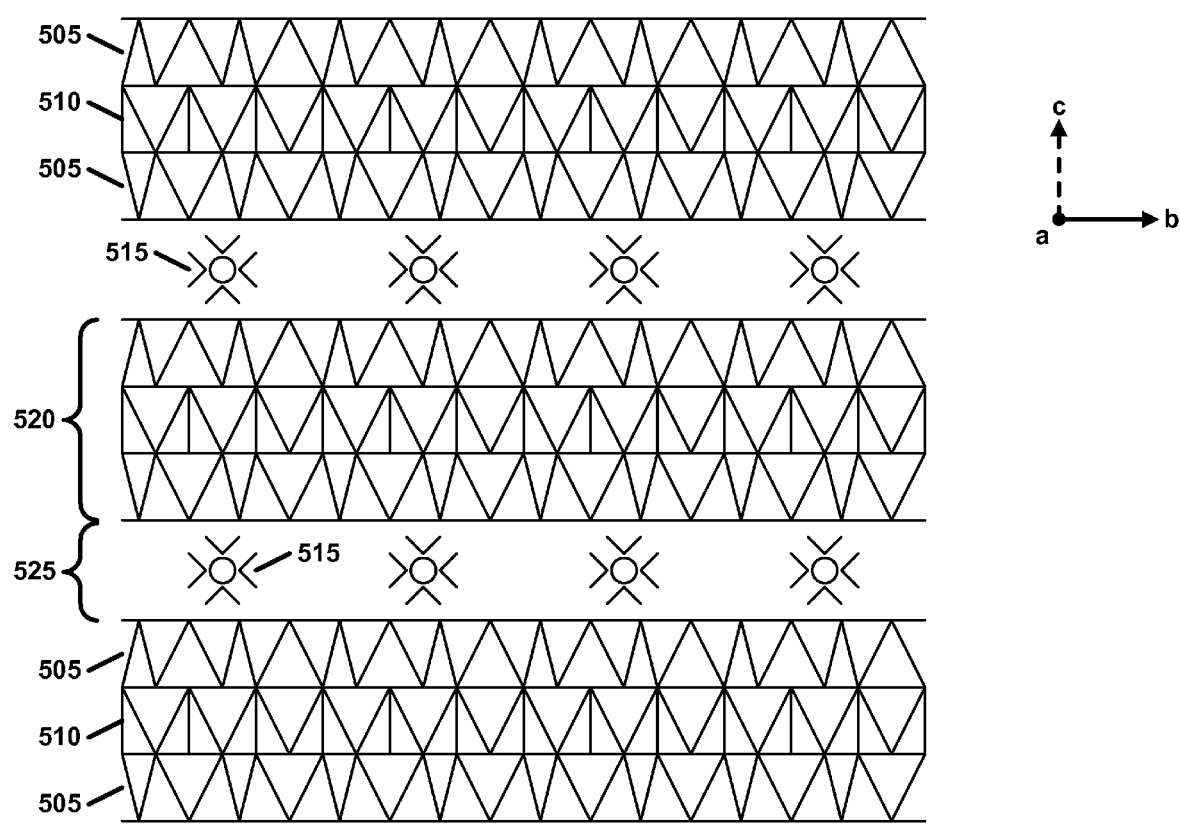
FIG. 5 shows the structure of a 2:1 clay mineral.

The clay mineral 105 is a layer silicate having at least one tetrahedral sheet 505 and an octahedral sheet 510, as shown in FIG. 5.

The tetrahedral sheet 505 is made up of a layer of horizontally linked, tetrahedral-shaped units coordinated to oxygen atoms and arranged in a hexagonal pattern. Each unit may include a central coordinated atom (e.g., $Mg^{2+}$, $Si^{4+}$, $Al^{3+}$, $Fe^{3+}$, etc.) surrounded by (and maybe bonded to) oxygen atoms that, in turn, may be linked with other nearby atoms (e.g., $Mg^{2+}$, $Si^{4+}$, $Al^{3+}$, $Fe^{3+}$ etc.).

The octahedral sheet 510 is made up of a layer of horizontally linked, octahedral-shaped units that may also serve as one of the basic structural components of silicate clay minerals. Arranged in an octahedral pattern, each unit may include a central coordinated metallic atom (e.g., $Al^{3+}$, $Mg^{2+}$, $Fe^{3+}$, $Zn^{2+}$, $Fe^{2+}$, etc.) surrounded by (and maybe bonded to) a oxygen atoms and/or hydroxyl groups. The oxygen atoms and/or hydroxyl groups may be linked with other nearby metal atoms (e.g., $Al^{3+}$, $Mg^{2+}$, $Fe^{3+}$, $Zn^{2+}$, $Fe^{2+}$, etc.). This combination may serve as inter-unit linkages that hold the sheet together.

Within both tetrahedral and octahedral layers, $O^{2-}$ and/or $OH^-$ ions may be present.

Where only one tetrahedral and one octahedral sheet are present for each layer, the clay is known as a 1:1 clay. Where, for each layer, there are two tetrahedral sheets with the unshared vertex of each sheet pointing towards each other and forming each side of the octahedral sheet 520, the clay is known as a 2:1 clay. As one embodiment of the present invention, either 1:1 or 2:1 clays, or a combination of the two, may be used.

As another embodiment, the clays of interest generally fall within the silicate class. As yet another embodiment, the subclass may be phyllosilicates. Examples include, but are not limited to, those from the smectite group, such as montmorillonite, bentonite, beidellite, hectorite, nontronite, R0 illite-smectite, R1 illite smectite, sauconite, saponite, stevensite, etc. Montmorillonite may include, but is not limited to, montmorillonite, calcium-montmorillonite (Ca-montmorillonite), magnesium-montmorillonite (Mg-montmorillonite), sodium-montmorillonite (Na-montmorillonite), cesium-montmorillonite (Cs-montmorillonite), etc. Another example is illite-smectites. The crystalline structure includes a stack of layers interspaced with at least one interlayer site 525. Each interlayer site may include cations (e.g., $Na^+$, $K^+$, $Ca^{2+}$, etc.) 515 or a combination of cations and water. A further example is the palygorskite group, such as palygorskite, sepiolite, tuperssuatsiaite, yofortierite, falconite, loughlinite, ferrisepiolite, Mn-sepiolite, Fe-palygorskite, Mn-palygorskite, etc.

Depending on the composition of the tetrahedral 505 and octahedral 510 sheets, the layers may either have no charge or will have a net negative charge. If the layers are neutral in charge, the tetrahedral 505 and octahedral 510 sheets are likely to be held by weak van der Waals forces. If the layers are charged, this charge may be balanced by interlayer cations.

In one embodiment, the clay mineral 105 is montmorillonite. Montmorillonite is a common smectite having one layer of aluminum atoms (i.e., middle layer) connected to two opposing layers of silicon atoms (i.e., outer layer) in a 2:1 layer structure. One version of the basic chemical formula, as a hydrous magnesium aluminum silicate, is $MgAl_2Si_5O_{14}.nH_2O$ or $MgO.Al_2O_3 5SiO_2.nH_2O$, where n for both may vary from 5 to 8. $H_2O$ may be approximately 20.0 to 25.0 percent, of which half of this volume may be found at a temperature of about 100° C. Some calcium may replace some of the magnesium. Alternatively, the chemical formula for montmorillonite may also be written as:

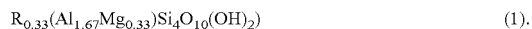

$$R_{0.33}(Al_{1.67}Mg_{0.33})Si_4O_{10}(OH)_2) \qquad (1).$$

VI can be equal to −0.33; IV can be equal to 0. VI (denoted as such because of the 6-fold coordination) indicates the octahedral sheet and its charge. IV (denoted as such because of the 4-fold coordination) indicates the tetrahedral sheet and its charge. R is the exchangeable cation in the interlayer space. Variations of this chemical formula are also well known in the art.

Montmorillonite is a chief constituent of bentonite, a clay-like material which may be formed by altering volcanic ash. Bentonite is the name of the rock which includes largely of the mineral montmorillonite. Besides bentonite, montmorillonite may also be found in granite pegmatites as an altered product of some silicate mineral. Montmorillonite may be a major constituent of shales and clay deposits in rocks that may be Jurassic in age or younger.

In another embodiment, the clay mineral 105 is Na-montmorillonite. Na-montmorillonite is a 2:1 layer silicate which may be derived from bentonite. Two tetrahedral sheets, which may be composed predominantly of $Si^{4+}$ tetrahedrons, may be bonded to an octahedral sheet, which may be composed of $Mg^{2+}$, $Al^{3+}$ and $Fe^{3+}$ octahedrons. Each $Si^{4+}$ tetrahedron may be coordinated to oxygen atoms. Each octahedron may be coordinated to oxygen atoms and/or hydroxyl groups.

It should be noted that unless otherwise specified (e.g., distinguished separately), the description described herein with respect to montmorillonite also applies to M-montmorillonite, where M is an exchangeable cation, such as Cs and Sr.

Naturally, montmorillonite tends to have defects in its crystal structure. Most evident is the turbostratic stacking of the 2:1 layers. This defect structure is believed to be the cause of the small crystallite size commonly observed. Having a flake-like shape resembling a corn flake, crystallites commonly vary in diameter from approximately 10 micrometers to approximately 0.01 micrometers.

A distinguishing feature of montmorillonite is its ability to swell with water. After surpassing a certain swelling threshold, montmorillonite tends to slump and goes into pieces. Montmorillonite can expand from approximately 12 Å to approximately 140 Å in aqueous systems. Fundamentally, the reason for this expansion is that cation substitution (e.g., $Mg^{2+}$ for $Al^{3+}$) in the octahedral sheet combined with minimal cation substitution (e.g., $Al^{3+}$ for $Si^{4+}$) in the tetrahedral sheet may give rise to a low negative charge on the 2:1 layer. This result may cause the crystal structure to have weak bonding along (001). In essence, this effect may give rise to exchange sites between the 2:1 layer that may take up $M^+$ or $M^{2+}$ cations from aqueous solutions.

The low negative charge on the 2:1 layer may enable cation exchange to take place. The charge deficiency in the 2:1 layer may need to be balanced by exchangeable cations. The quantity of cations required to create a net charge balance is called the cation exchange capacity.

Commonly, the cation exchange capacity of montmorillonite varies between about 80 and about 150 meq/100 g. The pH dependence on this physical property may be absent or negligible. The internal charge deficiency of the clay mineral 105 may result in a net negative charge of the particle. Examples of exchangeable cations include, but are not limited to, sodium, calcium, magnesium, and potassium.

Cation exchangeability tends to enable montmorillonite to remove heavy metals (e.g., Hg, Zn, Cd, Cu, Pb, As, etc.), alkaloids, alkalines, etc. from water. Removal of heavy metals is often associated with, inter alia, significant impacts, such as wastewater treatment. Additionally, ion exchange may also remove cationic and/or neutral organics, resulting in intercalate and/or polymer interaction.

The combination of ion exchange capacity and capacity to swell may allow the material to form floccules with suspended solids that can be precipitated out. Removal of floccules may be achieved using a sorption based media, washing and/or centrifugation.

These features, along with its chemical composition, are key elements to montmorillonite's exchange behavior with cesium and other cations.

B. Liquids

The water 110 used to create the aqueous clay suspension 115 may be tap water, distilled water, de-ionized water, etc.

Where it is desirable to remove microbes from the clay mineral, the aqueous clay suspension 115 may be mixed with a liquid mixture. As an example, the liquid mixture may include part water 110 and some other liquid, such as hydrogen peroxide. Hydrogen peroxide may be advantageous for decontaminating the clay mineral 105 from bacteria, viruses, other microparasites, parasites, etc. Where the liquid mixture is part hydrogen peroxide and part water 110, the weight ratio of hydrogen peroxide to water 110 may range from about 1:99 to about 1:2.

The present invention also allows a silver-based solution to be added. For instance, the silver-based solution may be silver nitrate solution (also referred to herein as one of the following: $AgNO_3$, $AgNO_3$ solution or $AgNO_3$ solution (aq)).

Alternatively, the silver-based solution may be silver hydroxide solution (also referred to herein as AgOH (aq)). Because AgOH (aq) has low solubility, it may be heated to allow for more silver ions in the solution. Heating may range, for example, from ~100° F. to ~180° F.

As an exemplified embodiment, silver nitrate solution may be added to the aqueous slurry after the radionuclide containment composition 125 has come in contact with a radioactive material to create an aqueous slurry S215. The product may be referred to as a suspension.

In another embodiment, the $AgNO_3$ solution may also be used as a pretreatment step before sequestration by the clay mineral 105 and water 110 mixture for discovering a stock of poisonous or radioactive materials. In this instance, the $AgNO_3$ solution may be applied to the clay mineral 105. After this application, water 110 may then be added to this pretreated clay mineral 105 to form the aqueous clay suspension 115. The aqueous clay suspension 115 may be refined 120 by using sieves to filter coarse materials. After filtering, the resulting product (i.e., radionuclide containment composition 125) may be applied to a radioactive material. To the aqueous slurry that may be formed, a silver-based solution may be added.

The minimum ratio of silver-based solution to aqueous slurry is about 1:20. As one embodiment, the ratio of silver nitrate solution to aqueous slurry is 1:4.

As an embodiment, adding a silver based solution to the aqueous slurry or as a pretreatment step may help remove chloride ions. These chloride ions may be found where the radioactive materials are present or have been dispersed, such as pipes, water aqueducts, reservoirs, warehouses, ground, public forums, etc.

Because silver nitrate has inherent antibacterial/antiseptic properties, it may also serve as an antibacterial/antiseptic agent.

The addition of $AgNO_3$ solution may produce sodium nitrate as a byproduct. To remove the sodium nitrate, the suspension may be heated. Temperature may vary. For example, the temperature may be approximately 475° F. The length of heating may also vary. For example, heating may take 3 hours.

C. Filters

Once the mixture is created and allowed to sit, the aqueous clay suspension 115 may be refined by using a filter 120, S210, such as a sieve. Filtering may help remove coarse material. One or more containers (e.g., beaker, bucket, silo, etc.) may be used to receive the filtered aqueous clay suspension 115.

In general, where a sieve is exercised, smaller sieve apertures tend to result in a processed suspension that is more uniform with less residual coarse material. Hence, embodied sieve aperture sizes may range from 300 μm to <38 μm. A minimum of 5 μm appears to be the functional limit for producing fluids. Although some fragments of coarse material (or fractions) may penetrate through the filter, they contribute minimally to the aqueous clay suspension 115 being employed. Nevertheless, the penetrable fragments may be used for forensic purposes to identify original materials.

The makeup and grain size of the filtered coarse fractions may be analyzed to determine the composition of the clay mineral 105. Analysis may be achieved by, for instance, back scatter scanning electron microscopy. Having mineralogical data may provide some insight into the nature of the clay minerals used.

D. Radionuclide Containment

Radionuclides from radioactive materials may be contained by contacting the radioactive material with a radionuclide containment composition to form an aqueous slurry. It should be noted that it is alternatively possible to contact the radioactive material with an aqueous clay suspension 115 to form the aqueous slurry.

Generally, this aqueous clay suspension 115 is a processed, uniform suspension (having a possible gel-like consistency) comprising a clay mineral 105 mixed with water 110. The aqueous clay suspension 115 may be refined 120 to filter and remove coarse materials S210. This filtering can generate a smoother consistency. If refined, the composition may be referred to as a radionuclide containment composition 125.

At the point of contact between the radioactive material and aqueous clay suspension (refined or unrefined) 115, S215, radionuclides may be absorbed by the aqueous clay suspension 115. The result may be an aqueous slurry.

The radioactive material may include, but are not limited to, compounds having at least one of the following radionuclide: $^{241}$Am, $^{134}$Cs, $^{137}$Cs, $^{60}$Co, $^{131}$I, $^{192}$Ir, $^{238}$Pu, $^{239}$Pu, $^{240}$Pu, $^{242}$Pu, $^{90}$Sr, $^{235}$U and $^{238}$U. The radioactive material may also include a radioactive chloride, as discussed earlier.

For example, as an embodiment, the radioactive material is $^{137}$CsCl. Cesium has an affinity to bond with chloride ions. When the two ions are combined, a crystallized powder is formed. Combining $^{137}$Cs ions and chloride ions can produce $^{137}$CsCl.

As another embodiment, the radioactive material is CsCl, where the radionuclide is a radioactive chloride, such as $^{36}$Cl.

As another embodiment, other radioactive materials involving radioactive chloride may include, but are not limited to, CsCl, RaCl$_2$, SrCl$_2$.6H$_2$O, BaCl$_2$, HgCl, HgCl$_2$, PbCl$_2$, CdCl$_2$, ZnCl$_2$, CoCl$_2$, etc. Additionally, other nonlimiting examples of poisonous or radioactive chloride compounds include uranium, actinide and lanthanide chlorides.

As another embodiment, the clay mineral 105 used to contain $^{137}$CsCl may be any smectite mineral.

Using montmorillonite as an exemplified embodiment of smectite and $^{137}$CsCl as the exemplified radioactive material, these selections may be based on a variety of factors. One, montmorillonite is generally expandable. Two, because of montmorillonite has the ability to exchange alkali cations in aqueous systems, Cs$^+$ cations may be readily exchanged when these two are combined. Commonly, when Cs is exchanged, Cs is irreversibly sorbed on smectite minerals. This interaction can be exploited for transporting and storing $^{137}$CsCl and could be used to respond to $^{137}$CsCl release. Three, there are many sources of montmorillonite. Four, montmorillonite is comparatively low in cost.

The radionuclide containment composition 125 may be applied to powder or aqueous solutions of radioactive materials using numerous techniques. Techniques include, but are not limited to, contacting, spraying (e.g., using a spray bottle, squirt gun, hose, etc.), pouring, covering, mixing, etc. Because of the rheological properties of the aqueous clay suspension 115, little to no agitation and/or dispersal of the radioactive material should occur.

Optionally, montmorillonite may be pretreated with aqueous salt solution, such as NaCl, NaOH, and NaClO$_4$. Where NaCl is used for pretreatment, montmorillonite's sorption of Na$^+$ cations is expected to produce Na-montomorillonite. Having an aqueous or gel-like consistency, this exchanged composition may be washed to remove excess aqueous salt solution. Additionally, the exchanged composition may be tested for residual anions by using a precipitating agent (e.g., silver nitrate, etc.).

The radionuclide containment composition 125 may be applied to powder or aqueous solutions of radioactive materials using numerous techniques. Techniques include, but are not limited to, contacting, spraying (e.g., using a spray bottle, squirt gun, hose, etc.), pouring, covering, mixing, etc. Because of the rheological properties of the aqueous clay suspension, little to no agitation and/or dispersal of the radioactive material should occur.

Using $^{137}$CsCl for demonstrative purposes, as a result of applying the aqueous clay suspension 115 onto $^{137}$CsCl, the aqueous clay suspension 115 may directly and irreversibly absorb $^{137}$Cs cations. It may be the case where exchange occurs spontaneously or essentially immediately. A dramatic change in the rheological properties should occur where the aqueous/gel-like consistency of the radionuclide containment composition 125 disappears and becomes a waxy paste in the Cs-montmorillonite form.

In general, a waxy paste, or alternatively aqueous slurry, may be formed after a radionuclide containment composition contacts a radioactive material. This aqueous slurry may then be contacted with a sorption based media. This latter contacting is a different containment stage that is separate from the initial containment stage (i.e., the former contacting). To assist this latter contacting, a probe may be used. Examples of probes include sonic and/or ultrasonic probes, magnetic probes, electrical probes, mechanical probes (e.g., rods, plunging devices, etc.), oil and similar oily substances, detergents, pressurized air, pressurized water, etc. Additionally, gravity or gravitational probes may be used. Any combination of probes may also be used.

E. Sorption Based Media

Sorption based media is a composition used to remove and sequester radionuclides captured by the aqueous slurry. Sequestering may be achieved by chemical ion exchange with the radionuclides (which may be found in the aqueous slurry and/or radioactive material), mechanical separation of floccules (which may be formed when the radionuclide containment composition contacts a radioactive material), or a combination of the two.

The sorption based media may include one or more different clay minerals. In one embodiment, a clay mineral from the palygorskite-sepiolite mineral group (also sometimes referred to as palygorskite group), such as palygorskite, may be used as the primary mineral for the sorption based media. Also known as attapulgite, palygorskite is a 2:1 clay mineral that is known to have a high sorption capacity for organic molecules. Overall, palygorskite comprises fibrous felted masses as well as disseminated grains and platy crystals. The tetrahedral sheet tends to be continuous; the octahedral sheet tends to be discontinuous. The general formula can be presented as:

$$(Mg_{5-y-z}R^{3+}_y)(Si_{8-x}R^{3+}_x)O_{20}(OH)_2(OH_2)_4$$
$$R^{2+}_{(x-y+2z)/2}(H_2O)_4 \qquad (2)$$

where $R^{2+}_{(x-y+2z)/2}$ and (H$_2$O) represent the charge balancing cations and water in the rectangular cavities, y is the fraction of Mg substituted by Al in the octahedral sheet, and x is the fraction of Si substituted by Al in the tetrahedral sheet. Isomorphous substitution is often relatively low in the tetrahedral sheet, with Al occupying 0.01 to 0.09 of 8 tetrahedral sites. On the contrary, isomorphous substitution is relatively high in the octahedral sheet, with Al occupying 28-59% of the octahedral sites. Other cations, including but not limited to $Fe^{2+}$, $Fe^{3+}$ and Mn are also present.

Other examples of clay minerals from the palygorskite group that can be used as the sorption based media include, but are not limited to, palygorskite, sepiolite, tuperssuatsiaite, yofortierite, falconite, loughlinite, ferrisepiolite, Mn-sepiolite, Fe-palygorskite, Mn-palygorskite.

It is also possible that as another embodiment, other clays that may be used as the sorption based media fall within the silicate class. As yet another embodiment, the subclass may be phyllosilicates. Examples include, but are not limited to, those from the smectite group.

In an embodiment, the sorption based media may comprise palygorskite-rich media made of ~50%-~80% palygorskite. In addition, the sorption based media may also comprise ~10%-40% in other minerals, such as montmorillonite, illite and kaolinite. Furthermore, ~10% (or less) in impurities, such as quartz, feldspar and titanium oxide, may also exist in the sorption based media. Having a mixture of clays may aid or enhance the radionuclide sorption ability.

The sorption based media may be housed in a separated compartment or container.

III. Stability of the Aqueous Clay Suspension

To demonstrate the stability of aqueous clay suspension 115 (both refined and unrefined) when applied to a radioactive chloride material, such as $^{137}CsCl$, which is a typical substance encountered in a dirty bomb, the aqueous clay suspension 115 may be aged. There is no restrictive time limit in the aging process since the aging process may, depending on a user's desires, last from minutes to years. For instance, the aging process may last for 10 months.

The pH values for reacted aqueous clay suspension 115 may vary from ~3 to ~4.65. Dissolution of the clay mineral 105, such as montmorillonite, is a possibility under these pH conditions.

A new rate law described by Keren Amram and Jiwchar Ganor may be applied under these pH conditions. Cf. Amram, K. and Ganor, J., 69 Geochimica et Cosmochimica Acta 2535-2546 (2005). Their rate law for montmorillonite (and also broadly applicable to smectites) is:

$$\text{Rate} = 220 \cdot e^{-17460/RT} \cdot (3 \times 10^{-6} \cdot e^{10700/RT} \cdot a_{H+}) / (1 + 3 \times 10^{-6} \cdot e^{10700/RT} \cdot a_{H+}) \quad (1)$$

Id. Their work may serve as a worst case scenario for dissolution for the present invention because their dissolution investigation is set up based on flow-through reactor experiments.

In a vast majority of applications, the present invention may be used in batch-mode, where the material will be placed in containers. Amram and Ganor's rate law tends to be appropriate for the present invention because, analogously, they used montmorillonite with a similar chemical composition similar to the present invention. Furthermore, Amram and Ganor found that dissolution rates were not affected by the addition of up to 0.3 M $NaNO_3$, a compound that is likely to be produced in the present invention from the exchange of $Na^+$ in the starting montmorillonite and the resulting $NO_3^-$.

Amram and Ganor performed experiments using flow-through reactors in thermostatic water at temperatures of 25° C., 50° C. and 70° C. ±0.1° C. Cf. Amram, K. and Ganor, J., 69 Geochimica et Cosmochimica Acta 2535-2546 (2005). The dissolution rates obtained were based on the release of Si and Al at a steady state. Id. Their results indicate dissolution rate increases with temperature and decreases with increasing pH. Id. They developed a specific model to describe the effect of temperature and pH on the dissolution of smectite. Id. Their model is linearly proportional to concentrations of absorbed protons on the surface of the mineral. Id. They also model proton sorption using a Langmuir adsorption isotherm. Id.

The dissolution rates obtained by Amram and Ganor varied from $2.6 \pm 0.5 \times 10^{-12}$ mol $g^{-1}s^{-1}$ to $2.8 \pm 0.5 \times 10^{-12}$ mol $g^{-1}s^{-1}$. Cf. Amram, K. and Ganor, J., 69 Geochimica et Cosmochimica Acta 2535-2546 (2005). Therefore, the total range possible for the rate of dissolution of montmorillonite is approximately $2.1 \times 10^{-12}$ mol $g^{-1}s^{-1}$ to $3.3 \times 10^{12}$ mol $g^{-1}s^{-1}$.

These results equate to a range of mass loss (i.e., in mol g) between approximately 0.000066 and 0.00011 per year. A conservative estimation based on these numbers indicates that the montmorillonite will be stable for at least 100 years.

IV. Experiments

Volclay SPV 200, an American Colloid product, is placed in aqueous suspension using a ratio range of 20 oz to 60 oz volume Volclay 200 to 5 gallons of water 110.

Optionally, prior to saturation with water 110, Volclay SPV 200 may be pretreated with aqueous NaCl solution. Alternatively, the Volclay SPV 200 may be pretreated with either aqueous NaOH or $NaClO_4$. This process may create an exchanged composition wherein the ions in the interlayer of montmorillonite may be exchanged with $Na^+$ (aq) from the aqueous salt solution. Saturation was allowed to occur overnight. After saturation, the exchanged composition washed. The process was repeated 5 times to allow for full exchange to take place. Afterwards, the exchanged composition can be washed and tested for residual anions from the aqueous salt solution.

The material is mixed mechanically for 5 minutes and is allowed to stand overnight. The suspension is then filtered through a 45 μm metal screen to remove coarse material. The filtration process breaks up the material and imparts a uniform suspension.

For preparing and verifying the properties of the radionuclide containment composition, the present invention also relies on the teachings of PCT Patent Application No. PCT/US2006/019763 to Krekeler et al., filed on May 22, 2006, entitled "Counter Weapon Containment" and PCT Patent Application No. PCT/US2006/035844 to Krekeler et al., filed on Sep. 14, 2006, entitled "Secondary Process for Radioactive Chloride Deweaponization and Storage."

A. Properties of Starting Material

Grain size analysis was performed on the raw starting material (Volclay SPV 200, American Colloid) using standard mechanical sieves. Approximately 100 grams of raw material was analyzed using 8" sieves using fractions between 300 μm and 38 μm. The percentage that passed the 38 μm sieve was included in the analysis. Sieve stacks were shaken mechanically for 15 minutes. Fractions captured in each sieve were then weighed. Normalized percentages of each size fraction were calculated based on the total sum of mass retained in each sieve. Differences between total mass analyzed and total mass retained varied from 3% to 7%.

Grain size analysis indicates that for most analyses, a single normal distribution of particles does not exist in the starting material. The variability in the size distribution of particles is attributed to variation in processing, or natural variability of source material in the mine at the manufacturer's source. The modes at 180 μm, 106 μm, 75 μm, and <38 μm are common. Analyses of grain size distribution at various modes are shown in TABLE 2. These analyses have single and multiple modes.

TABLE 2

Grain Size Distribution by Normalized Percentages for Analyses 1–10

|        | 1      | 2      | 3      | 4      | 5      | 6      | 7      | 8      | 9      | 10     |
|--------|--------|--------|--------|--------|--------|--------|--------|--------|--------|--------|
| 300 μm | 0.11   | 0.14   | 0.06   | 0.22   | 1.62   | 0.67   | 0.37   | 0.07   | 0.070  | 0.051  |
| 250 μm | 0.22   | 0.36   | 0.40   | 0.78   | 0.30   | 0.21   | 0.52   | 0.43   | 0.087  | 0.174  |
| 212 μm | 11.84  | 7.53   | 0.43   | 14.79  | 0.36   | 0.32   | 1.73   | 7.66   | 0.210  | 0.245  |
| 180 μm | 7.68   | 30.14  | 0.58   | 26.61  | 0.73   | 0.53   | 3.76   | 23.54  | 0.576  | 0.562  |
| 150 μm | 3.30   | 19.44  | 0.89   | 16.88  | 1.35   | 1.21   | 9.61   | 17.20  | 0.960  | 1.094  |
| 125 μm | 13.18  | 13.01  | 1.62   | 13.16  | 2.21   | 2.23   | 16.79  | 16.30  | 2.113  | 1.809  |
| 106 μm | 14.10  | 0.78   | 2.50   | 8.09   | 3.24   | 3.02   | 24.71  | 14.00  | 2.235  | 3.741  |
| 90 μm  | 0.75   | 5.31   | 8.01   | 1.26   | 5.58   | 6.95   | 0.66   | 0.47   | 20.080 | 13.493 |
| 75 μm  | 2.76   | 11.77  | 12.60  | 2.84   | 29.92  | 30.70  | 4.51   | 0.09   | 13.236 | 13.544 |
| 63 μm  | 5.13   | 1.71   | 26.66  | 3.89   | 21.48  | 23.87  | 7.44   | 2.03   | 4.226  | 6.930  |
| 53 μm  | 14.22  | 6.88   | 24.95  | 7.60   | 13.39  | 18.74  | 14.53  | 9.21   | 11.053 | 15.476 |
| 43 μm  | 11.67  | 2.17   | 14.94  | 3.54   | 10.29  | 6.60   | 8.23   | 3.50   | 12.135 | 12.144 |
| 38 μm  | 9.88   | 0.77   | 5.96   | 0.30   | 6.80   | 3.07   | 7.13   | 5.51   | 15.872 | 14.535 |
| <38 μm | 5.16   | 0.00   | 0.40   | 0.02   | 2.72   | 1.90   | 0.00   | 0.00   | 17.147 | 16.202 |
| Sum    | 100.00 | 100.00 | 100.00 | 100.00 | 100.00 | 100.00 | 100.00 | 100.00 | 100.00 | 100.00 |

The raw material used to make the aqueous clay suspension 115 (e.g., uniform aqueous Na-montmorillonite suspension) is a processed bentonite. The coarse fraction of the raw starting material used to make this technology was investigated using back scatter scanning electron microscopy as a means to characterize the raw material. The mineralogical characteristics of the coarse fraction provide some insight into the nature of the raw material. However, the coarse fraction has a very minimal role in contributing to the properties of the aqueous clay suspension 115. Because the raw material is processed, some small fragments of the coarse fraction minerals may enter the technology product. Therefore, the data on the coarse fraction is useful for forensic purposes once the aqueous clay suspension 115 is deployed. The coarse mineral data also serves as a characteristic of the original material.

Coarse fraction mineral grains varied between very angular to rounded shapes. However, most grains are very angular to angular. Minerals commonly observed are plagioclase, biotite, zircon, quartz, K-feldspar, calcite, and iron oxides. PbS (galena) was also observed. There are two general groups of minerals based on geologic processes. Plagioclase, biotite, zircon, and quartz are volcanic in origin while calcite, K-feldspar, iron oxides, and galena are authigenic in origin. K-feldspar (sanidine) can also be volcanic in origin. Aggregates of calcite and K-feldspar were observed, and galena was observed with these two minerals. Such authigenic mineral associations have been observed in Ordovician bentonites. Energy dispersive spectroscopy (EDS) spectra analyses indicate that the biotite is intermediate in composition with respect to Fe and Mg concentrations. There is also Ti and Cl in the biotite. EDS analyses indicate that the plagioclase is commonly labradoritic to albitic in composition. Zircon crystals are end member composition and no Hf was detected. The detection limit is approximately 1%.

B. Grain Size Analysis of the Aqueous Clay Suspension

For transmission electron microscopy investigation, grain mounts were prepared of the Na-montmorillonite using alcohol as a dispersing medium. Analyses were prepared on 300 mesh hole carbon Cu grids. Analyses were investigated using a 300 kV JEM 3010 transmission electron microscope (TEM) and a 200 kV 2010 scanning transmission electron microscope (SEM).

TEM investigations indicate that the montmorillonite phase used in the process appears dominantly composed of montmorillonite particles (~>95%) and with a lesser amount of silica particles. The morphology of the montmorillonite particles are generally described based on the classification outlined in Güven. See Güven, N. 19 Smectites 495-559 (1988). The montmorillonite from the suspension and process may comprise commonly of foliated lamellar aggregates. Such aggregates may compose about 40 to 75% of the montmorillonite particles. Subhedral platelets and compact subhedral lamellar aggregates may occur as well. Both may make up about 10 to 40% of the montmorillonite particles. Subhedral lamellar aggregates may also occur. These may make up about 5 to 10% of the montmorillonite particles.

Foliated lamellar aggregates may vary in diameter from ~0.2 to >5.0 μm. Subhedral lamellar aggregates may vary in diameter from ~0.1 to ~3.5 μm. Subhedral platelets may vary in diameter from ~0.5 to >5.0 μm.

SAED patterns taken along 001 on discrete particles show concentric rings. Discrete diffraction spots tend to occur, owing to localized regular stacking but are typically not abundant or well ordered. These patterns appear consistent with turbostratic stacking of the 2:1 layers in commonly observed montmorillonite. Diffraction patterns may range from nearly homogenous rings to rings with about 40% spots.

EDS spectra were collected using the 300 kV JEM 3010 TEM. EDS spectra were collected using spot size 2-3. Spectra with Si peaks greater than 100 counts were deemed significant. Variation in intensity was related to apparent thickness. The higher contrast particles appeared to produce more intense spectra. Analyses were performed on the center of particles.

Figure 17:
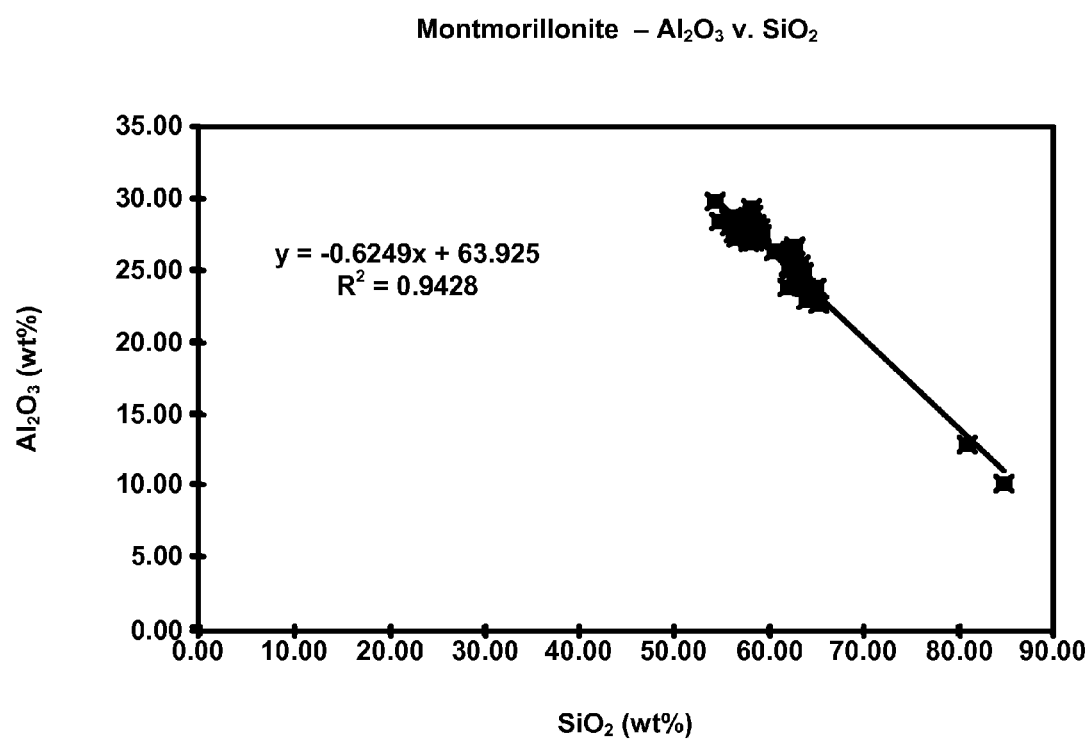
FIG. 17 shows an EDS compositions plot for $Al_2O_3$ and $SiO_2$ in wt % of montmorillonite used.
Figure 18:
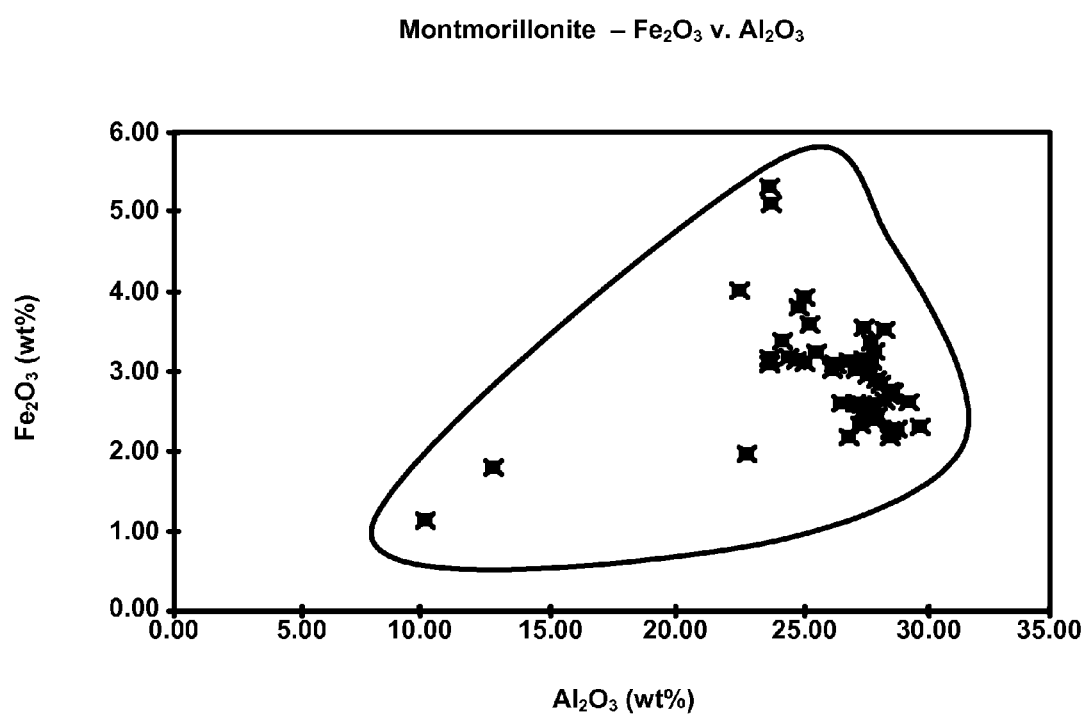
FIG. 18 shows an EDS compositions plot for $Al_2O_3$ and $Fe_2O_3$ in wt % of montmorillonite used.
Figure 19:
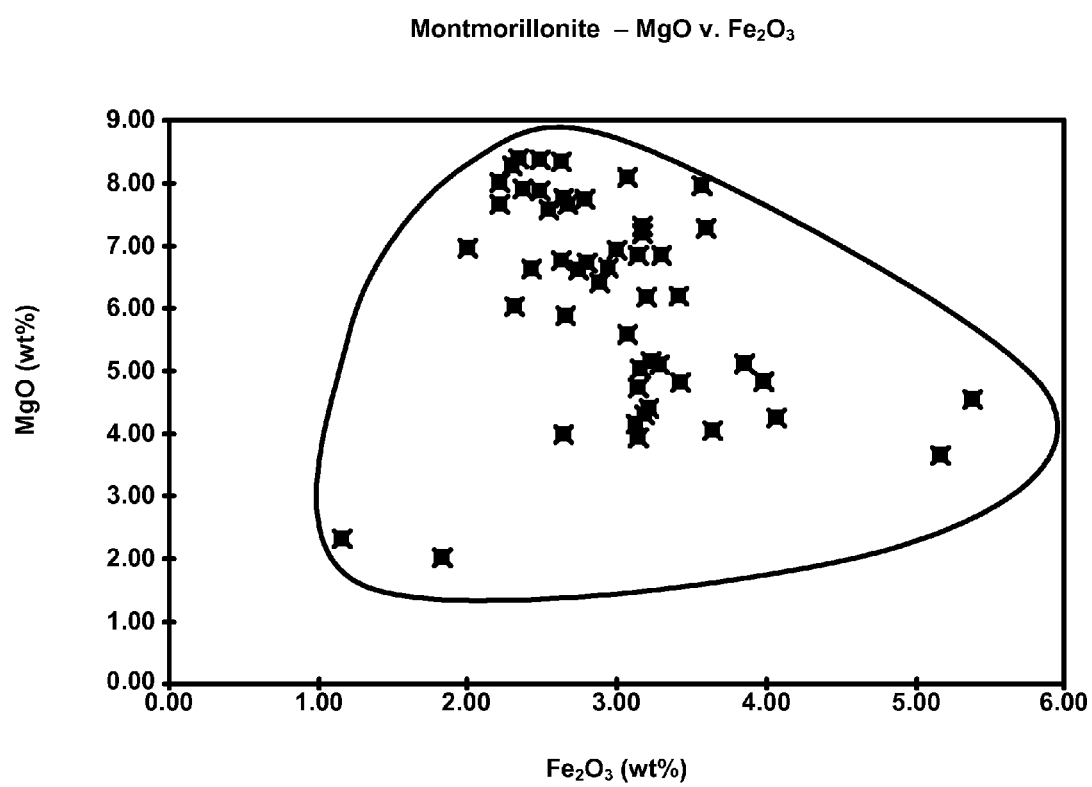
FIG. 19 shows an EDS compositions plot for MgO and $Fe_2O_3$ in wt % of montmorillonite used.

The elements observed include Si, Al, Fe, Ca, K, Na and Mg. Systematic drift in EDS analyses occurred. $SiO_2$ concentrations tend to be elevated and $Na_2O$ concentrations may be lower than actual concentrations, owing to diffusion in either the solid state or release of hydrated interlayer sodium cations. EDS chemical composition data (weight percent of oxides for each experimental run) are provided in TABLE 3. The minimum, maximum, median, variance and standard deviation of the elements are presented in TABLE 4. FIGS. 6-12 illustrate some TEM and associated SAED images of montmorillonite particles. FIGS. 13-16 illustrate some TEM images of montmorillonite particles. FIGS. 17-19 illustrate plot concentrations of oxides from these tables.

TABLE 3

Chemical compositions of individual unreacted montmorillonite particles with descriptive statistics

| Analysis | SiO$_2$ | Al$_2$O$_3$ | Fe$_2$O$_3$ | MgO | CaO | Na$_2$O | K$_2$O | total |
|---|---|---|---|---|---|---|---|---|
| 1 | 62.55 | 25.61 | 3.29 | 5.10 | 0.80 | 2.59 | 0.06 | 100.00 |
| 2 | 58.42 | 26.91 | 2.22 | 7.65 | 1.01 | 3.74 | 0.05 | 100.00 |
| 3 | 63.90 | 23.74 | 3.22 | 4.40 | 1.26 | 3.40 | 0.08 | 100.00 |
| 4 | 57.99 | 27.63 | 3.15 | 6.84 | 0.70 | 3.60 | 0.08 | 100.00 |
| 5 | 58.21 | 29.30 | 2.66 | 5.88 | 0.69 | 3.24 | 0.03 | 100.00 |
| 6 | 84.85 | 10.02 | 1.16 | 2.32 | 0.50 | 1.14 | 0.00 | 100.00 |
| 7 | 58.79 | 27.80 | 3.42 | 6.19 | 0.67 | 3.10 | 0.03 | 100.00 |
| 8 | 56.50 | 28.35 | 2.67 | 7.65 | 0.74 | 4.08 | 0.01 | 100.00 |
| 9 | 54.40 | 29.75 | 2.35 | 8.38 | 0.87 | 4.14 | 0.11 | 100.00 |
| 10 | 63.34 | 25.34 | 3.65 | 4.05 | 1.33 | 2.21 | 0.07 | 100.00 |
| 11 | 62.21 | 25.14 | 3.99 | 4.83 | 0.78 | 2.97 | 0.08 | 100.00 |
| 12 | 57.93 | 27.93 | 3.30 | 6.84 | 0.73 | 3.15 | 0.12 | 100.00 |
| 13 | 59.24 | 27.48 | 3.20 | 6.18 | 0.62 | 3.24 | 0.05 | 100.00 |
| 14 | 62.30 | 24.91 | 3.86 | 5.11 | 0.78 | 2.84 | 0.20 | 100.00 |
| 15 | 62.34 | 26.33 | 3.15 | 4.73 | 0.97 | 2.44 | 0.05 | 100.00 |
| 16 | 62.66 | 26.38 | 3.13 | 4.15 | 0.74 | 2.89 | 0.04 | 100.00 |
| 17 | 63.67 | 24.82 | 3.19 | 4.30 | 0.99 | 2.90 | 0.13 | 100.00 |
| 18 | 64.05 | 22.83 | 2.00 | 6.96 | 0.70 | 3.39 | 0.07 | 100.00 |
| 19 | 56.13 | 28.67 | 2.79 | 7.74 | 0.70 | 3.97 | 0.00 | 100.00 |
| 20 | 56.80 | 27.41 | 2.63 | 8.33 | 0.77 | 3.96 | 0.11 | 100.00 |
| 21 | 58.32 | 28.82 | 2.32 | 6.03 | 0.66 | 3.81 | 0.06 | 100.00 |
| 22 | 58.27 | 28.01 | 2.95 | 6.64 | 0.74 | 3.32 | 0.07 | 100.00 |
| 23 | 57.99 | 28.54 | 2.80 | 6.72 | 0.69 | 3.20 | 0.06 | 100.00 |
| 24 | 55.88 | 28.58 | 2.30 | 8.27 | 0.76 | 4.19 | 0.04 | 100.00 |
| 25 | 56.41 | 27.50 | 2.49 | 8.37 | 0.84 | 4.35 | 0.05 | 100.00 |
| 26 | 57.89 | 28.52 | 2.75 | 6.61 | 0.73 | 3.50 | 0.02 | 100.00 |
| 27 | 62.79 | 25.16 | 3.16 | 5.03 | 1.04 | 2.75 | 0.08 | 100.00 |
| 28 | 55.98 | 28.03 | 2.49 | 7.87 | 0.99 | 4.56 | 0.08 | 100.00 |
| 29 | 62.74 | 26.61 | 2.65 | 3.98 | 1.09 | 2.88 | 0.05 | 100.00 |
| 30 | 56.26 | 28.56 | 2.22 | 8.00 | 0.69 | 4.19 | 0.09 | 100.00 |
| 31 | 57.95 | 27.37 | 2.37 | 7.90 | 0.62 | 3.74 | 0.05 | 100.00 |
| 32 | 62.87 | 24.27 | 3.43 | 4.81 | 0.87 | 3.56 | 0.18 | 100.00 |
| 33 | 57.39 | 27.50 | 2.55 | 7.57 | 0.74 | 4.25 | 0.00 | 100.00 |
| 34 | 58.68 | 28.18 | 2.89 | 6.41 | 0.66 | 3.12 | 0.07 | 100.00 |
| 35 | 60.60 | 26.25 | 3.07 | 5.58 | 0.73 | 3.67 | 0.09 | 100.00 |
| 36 | 56.99 | 27.82 | 3.17 | 7.30 | 0.91 | 3.74 | 0.06 | 100.00 |
| 37 | 57.78 | 27.67 | 3.00 | 6.92 | 0.94 | 3.55 | 0.14 | 100.00 |
| 38 | 56.60 | 27.52 | 3.60 | 7.27 | 0.97 | 3.92 | 0.12 | 100.00 |
| 39 | 80.96 | 12.74 | 1.83 | 2.03 | 0.73 | 1.61 | 0.12 | 100.00 |
| 40 | 62.79 | 24.51 | 3.23 | 5.15 | 1.04 | 3.19 | 0.10 | 100.00 |
| 41 | 57.89 | 26.89 | 3.17 | 7.19 | 0.87 | 3.92 | 0.07 | 100.00 |
| 42 | 62.06 | 23.74 | 5.39 | 4.55 | 0.81 | 3.35 | 0.10 | 100.00 |
| 43 | 65.29 | 22.55 | 4.08 | 4.25 | 1.18 | 2.48 | 0.18 | 100.00 |
| 44 | 56.69 | 27.20 | 3.07 | 8.08 | 0.59 | 4.28 | 0.09 | 100.00 |
| 45 | 57.82 | 27.18 | 2.65 | 7.75 | 0.80 | 3.67 | 0.13 | 100.00 |
| 46 | 64.97 | 23.74 | 3.15 | 3.93 | 1.22 | 2.61 | 0.39 | 100.00 |
| 47 | 59.09 | 27.90 | 2.43 | 6.62 | 0.70 | 3.24 | 0.02 | 100.00 |
| 48 | 58.91 | 27.82 | 2.63 | 6.76 | 0.67 | 3.12 | 0.09 | 100.00 |
| 49 | 63.47 | 23.81 | 5.18 | 3.65 | 1.05 | 2.71 | 0.12 | 100.00 |
| 50 | 54.83 | 28.35 | 3.58 | 7.95 | 0.90 | 4.32 | 0.08 | 100.00 |

TABLE 4

Summary of Weight % of Oxides in Montmorillonite

| | SiO$_2$ | Al$_2$O$_3$ | Fe$_2$O$_3$ | MgO | CaO | Na$_2$O | K$_2$O | Cs$_2$O | Cl |
|---|---|---|---|---|---|---|---|---|---|
| Minimum | 55.40 | 15.87 | 1.32 | 1.29 | 0.00 | 0.40 | 0.00 | 9.09 | 0.42 |
| Maximum | 64.08 | 23.15 | 3.17 | 5.79 | 0.14 | 1.89 | 2.17 | 18.77 | 2.18 |
| Median | 58.00 | 19.92 | 1.93 | 4.45 | 0.06 | 0.88 | 0.02 | 13.36 | 0.87 |
| Variance | 3.07 | 1.83 | 0.14 | 1.22 | 0.00 | 0.13 | 0.40 | 4.40 | 0.12 |
| St. Dev. | 1.751 | 1.3512 | 0.379 | 1.11 | 0.036 | 0.362 | 0.6352 | 2.097 | 0.352 |

SAED pattern (bottom image) is a very diffuse SAED pattern of (hk0) reflections showing a high degree of structural disorder. The few diffraction spots which do occur are heavily streaked and rings are weak. The pattern indicates turbostratic stacking.

Figure 7:
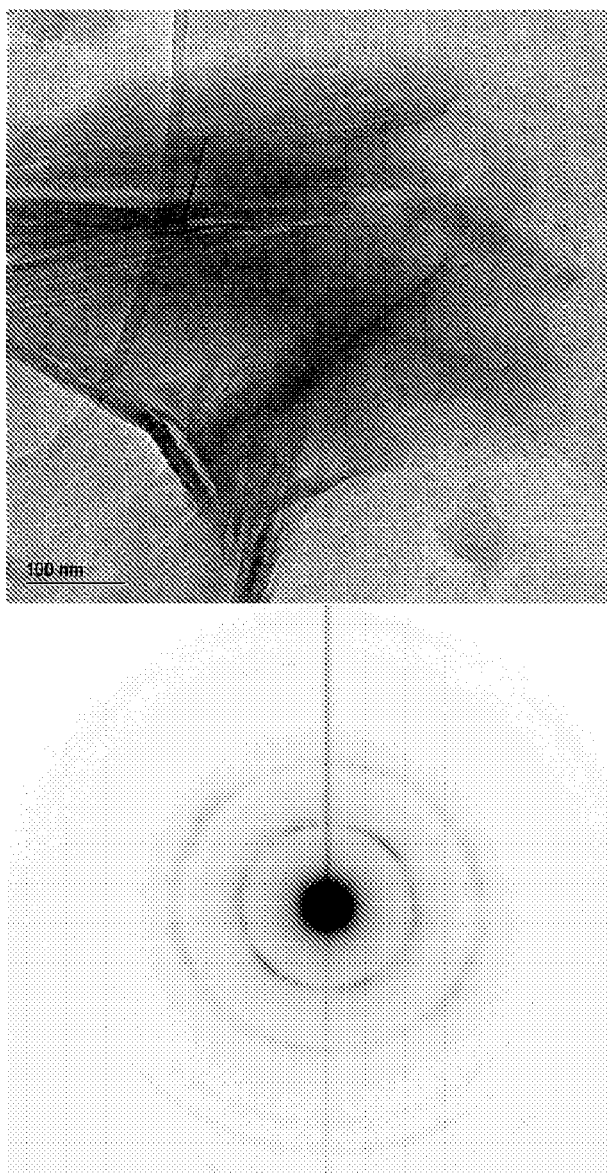
FIG. 7 shows another example of a TEM image of a particle exhibiting some straight edges and an associated SAED diffraction.

FIG. 7 shows a representative TEM image (top image) of particle exhibiting some straight edges. This texture is intermediate between platy morphologies and lamellar aggregates commonly observed. The SAED pattern (bottom image) is a very diffuse SAED pattern showing a high degree of structural disorder. The few diffraction spots which do occur are heavily streaked are of the (hk0) reflections. The well developed rings are indicative of turbostratic stacking.

Figure 8:
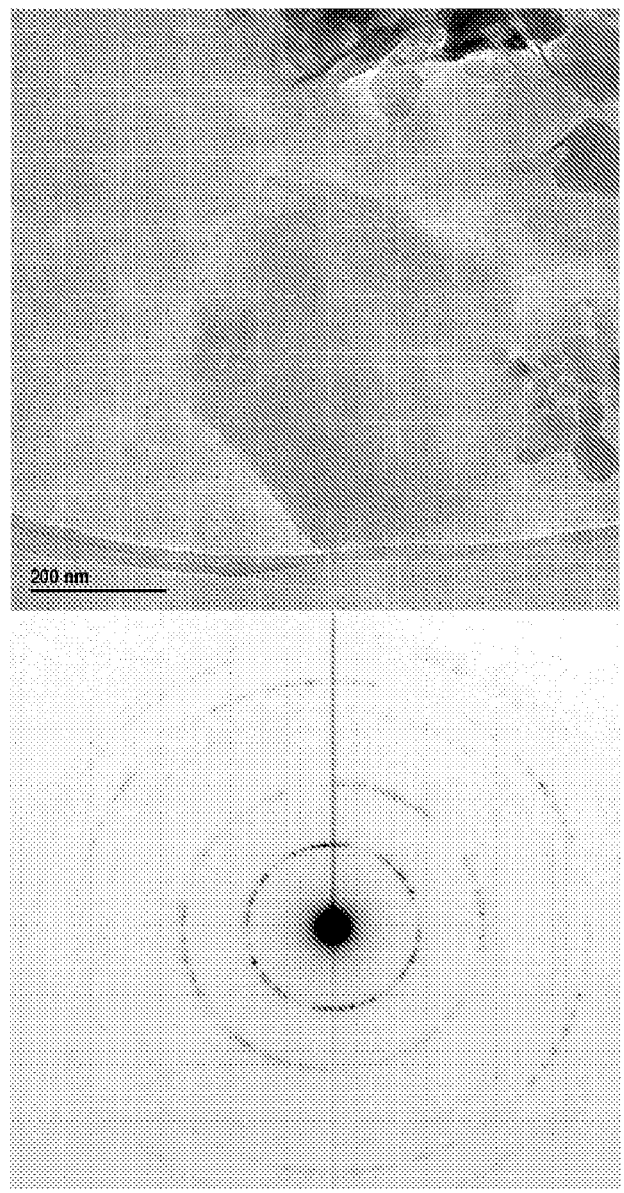
FIG. 8 shows an example of a TEM image of a subhedral platy particle of montmorillonite showing some near straight edge terminations and an associated SAED diffraction pattern.

FIG. 8 shows a representative TEM image (top image) of a subhedral platy particle of montmorillonite showing some near straight edge terminations. The particle is ~450 nm in diameter. An aggregate of silica particles is adjacent on the right of the particle. Smaller platy montmorillonite particle can be observed in the image will diameters between ~50 nm and ~120 nm. The SAED pattern (bottom image) taken along (hk0) for the subhedral particle in the lower center of the image above showing diffraction rings indicative of a high degree of rotational turbostratic stacking disorder with some discrete spots.

Figure 9:
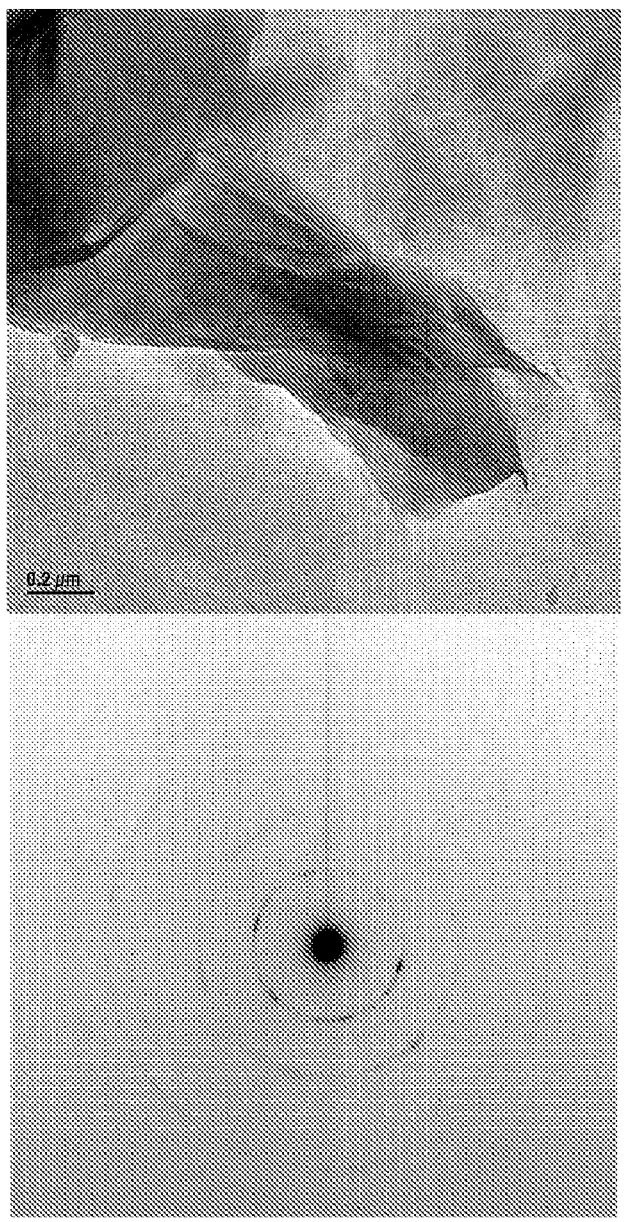
FIG. 9 shows an example of a TEM image of lamellar aggregate of montmorillonite used in fluid and an associated SAED diffraction pattern.

FIG. 9 shows a representative TEM image (top image) of lamellar aggregate of montmorillonite used in fluid. Central portion of image shows an example of an anhedral lamellar aggregate with irregular morphology. The diameter of the particle shown is ~1.8 μm. The particle is surrounded by smaller discrete particles with a more platy morphology. The SAED pattern (bottom image) taken along (hk0) for the lamellar aggregate particle in the image above showing diffraction rings indicative of a high degree of rotational turbostratic stacking disorder with minor discrete spots.

Figure 10:
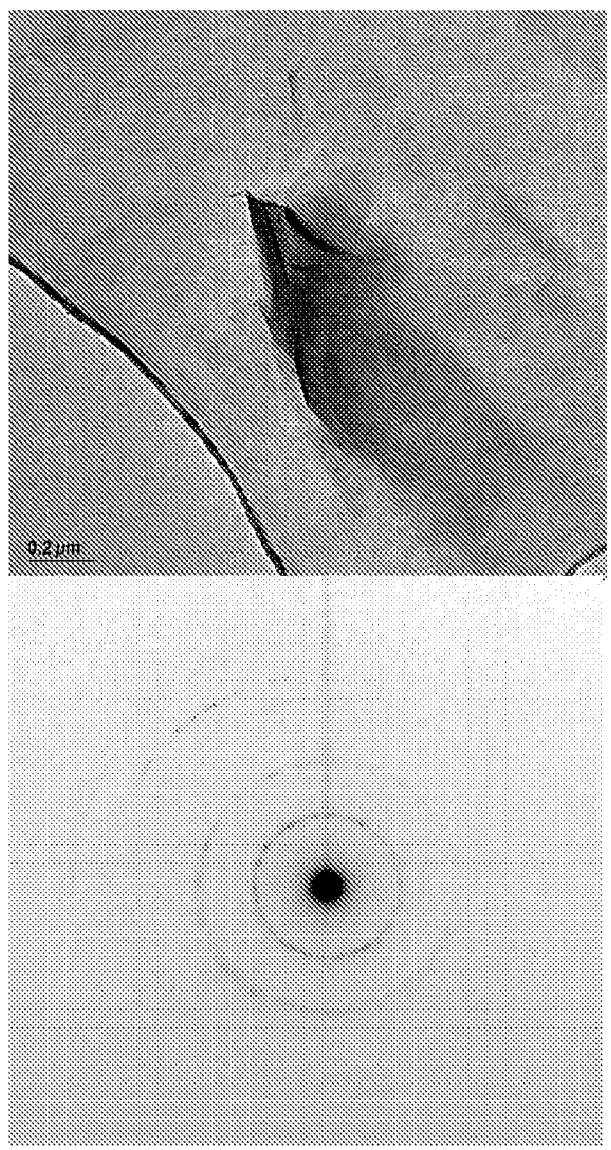
FIG. 10 shows another example of a TEM image of lamellar aggregate of montmorillonite used in fluid and an associated SAED diffraction pattern.

FIG. 10 shows a representative TEM image (top image) of lamellar aggregate of montmorillonite used in fluid. Central portion of image shows an example of an anhedral lamellar aggregate with irregular morphology. The particle is surrounded by smaller discrete particles. The SAED pattern (bottom image) taken along (hk0) for the large particle in the image above showing diffraction rings indicative of a high degree of rotational turbostratic stacking disorder with minor discrete spots.

Figure 6:
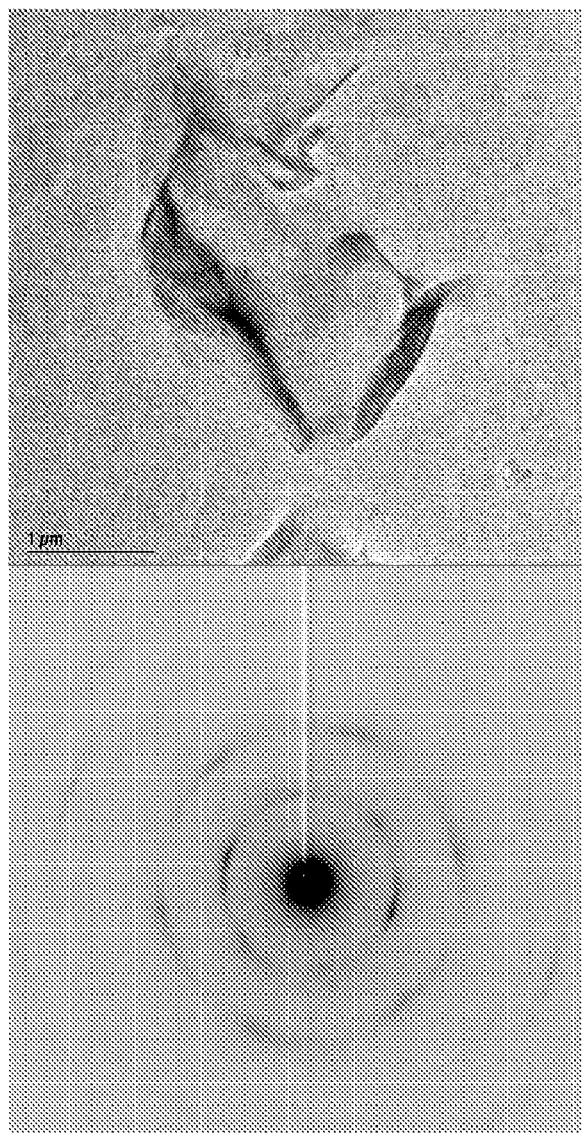
FIG. 6 shows an example of a TEM image of lamellar aggregate of montmorillonite and an associated SAED diffraction pattern.
Figure 11:
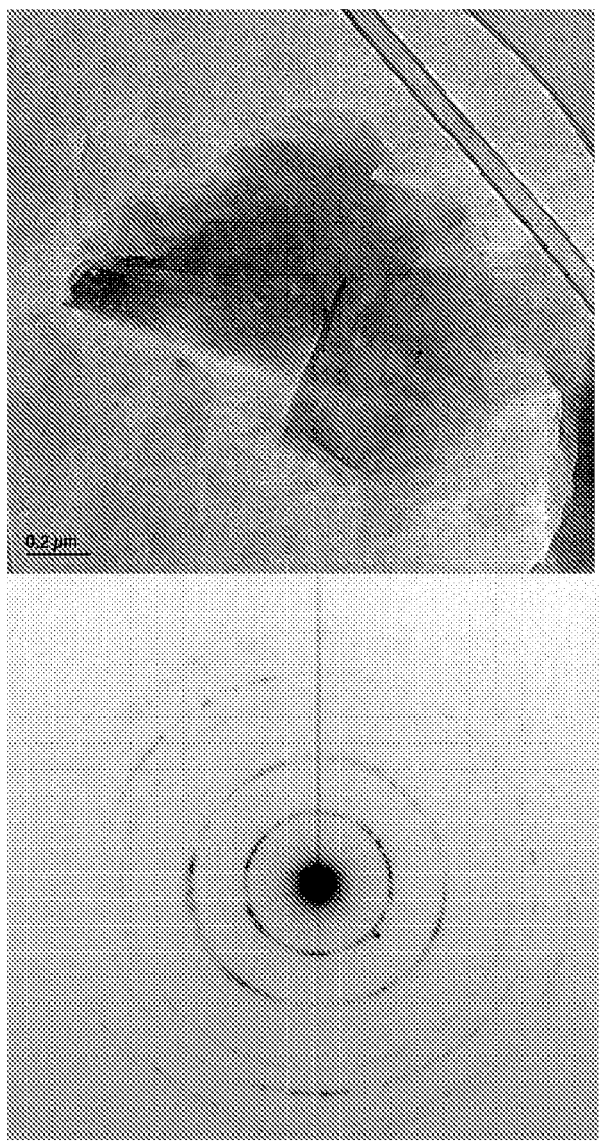
FIG. 11 also shows another example of a TEM image of lamellar aggregate of montmorillonite used in fluid and an associated SAED diffraction pattern.

FIG. 11 shows a representative TEM image (top image) of lamellar aggregate of montmorillonite used in fluid. Central portion of image shows an example of a aggregate with a complex morphology. Near straight edge terminations on one side of the particle are present with anhedral edge terminations occurring on the opposite side of the particle. The larger FIG. 6 shows a representative TEM image (top image) of lamellar aggregate of montmorillonite with characteristic irregular terminations of particles. This particle has a diameter of ~4.5 μm. Folded regions can be as long as ~3 μm. The particle in the center is surrounded by smaller subhedral to anhedral particles that are ~0.1 μm to ~0.5 μm in diameter. Particle morphologies such as these are common in the montmorillonite used in the fluid. The SAED pattern (bottom image) taken along (hk0) for the large particle in the image above showing some discrete spots but still a large degree of rotational turbostratic stacking disorder.

Figure 12:
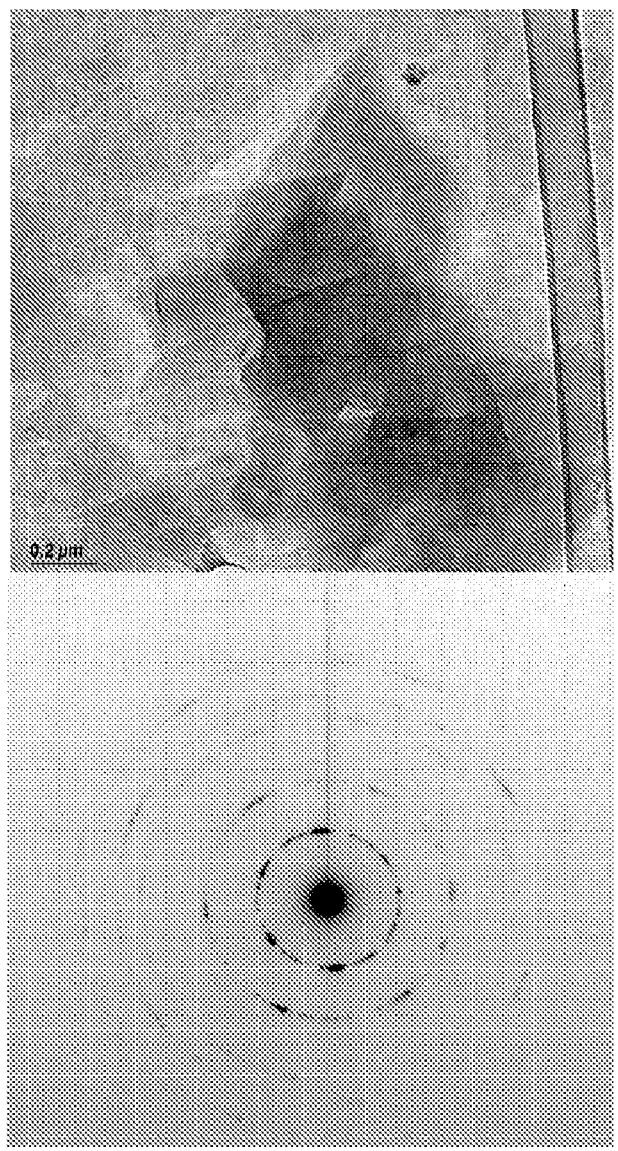
FIG. 12 shows yet another example of a TEM image of lamellar aggregate of montmorillonite used in fluid and an associated SAED diffraction pattern.

FIG. 12 shows a representative TEM image (top image) of lamellar aggregate of montmorillonite used in fluid. Upper portion of image shows an example of a pseudo rhombohedral morphology which is sometimes observed. Near straight edge terminations shown elsewhere in this image are also common. Subhedral lamellar aggregates are common in the montmorillonite used in the fluid. The SAED pattern (bottom image) taken along (hk0) for the image above showing some discrete spots but still a large degree of rotational turbostratic stacking disorder.

Figure 13:
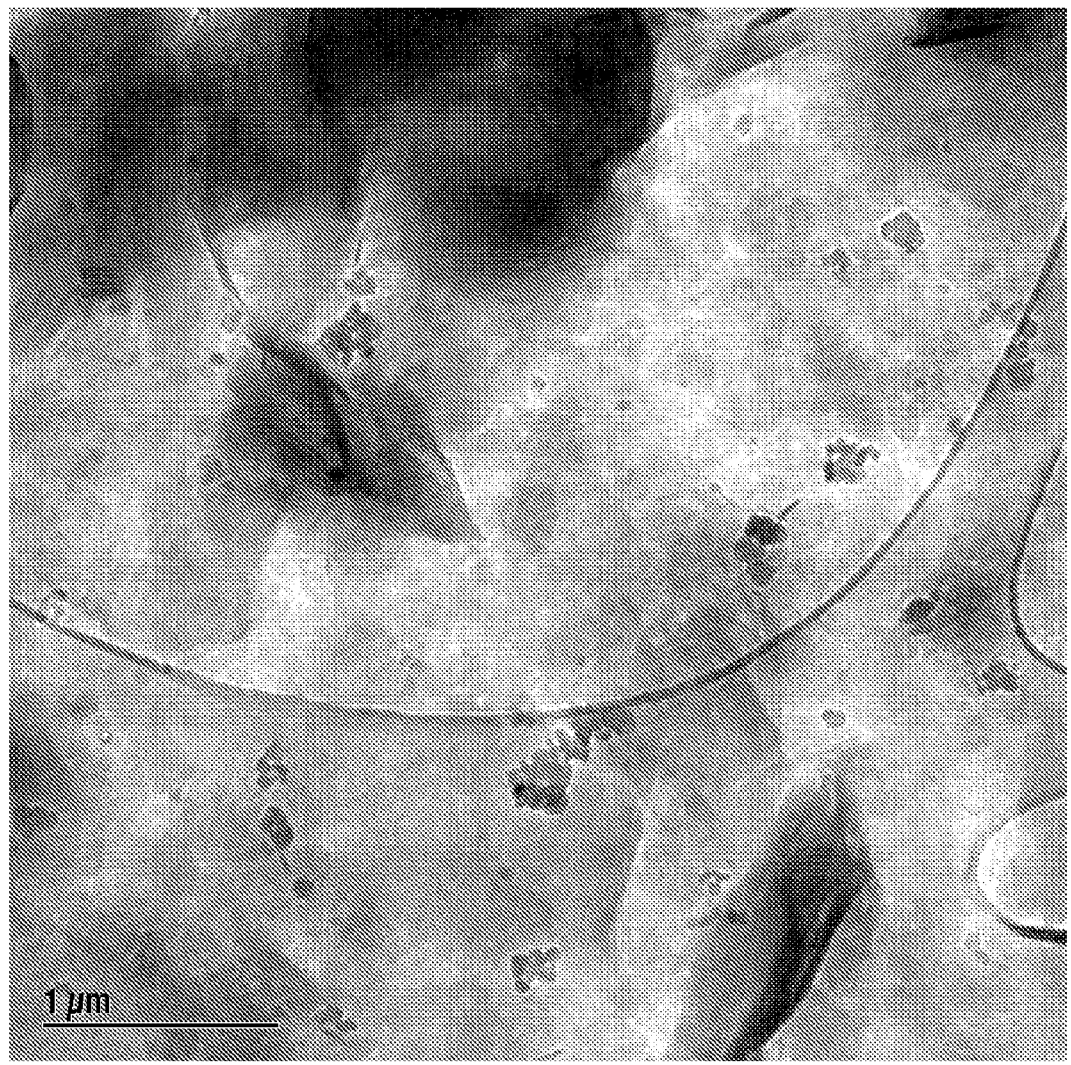
FIG. 13 shows an example of a TEM image from grain mount showing morphology of montmorillonite particles.

FIG. 13 shows a representative TEM image from grain mount showing morphology of montmorillonite particles. Particles are commonly ~0.3 μm to ~3.0 μm in diameter and are lamellar aggregates to pseudo platy in morphology. Darker particles tend to be lamellar aggregates while light particles dominantly are pseudo-platy to platy in morphology. Silica particles are of medium contrast and are rounded or rounded aggregates.

Figure 14:
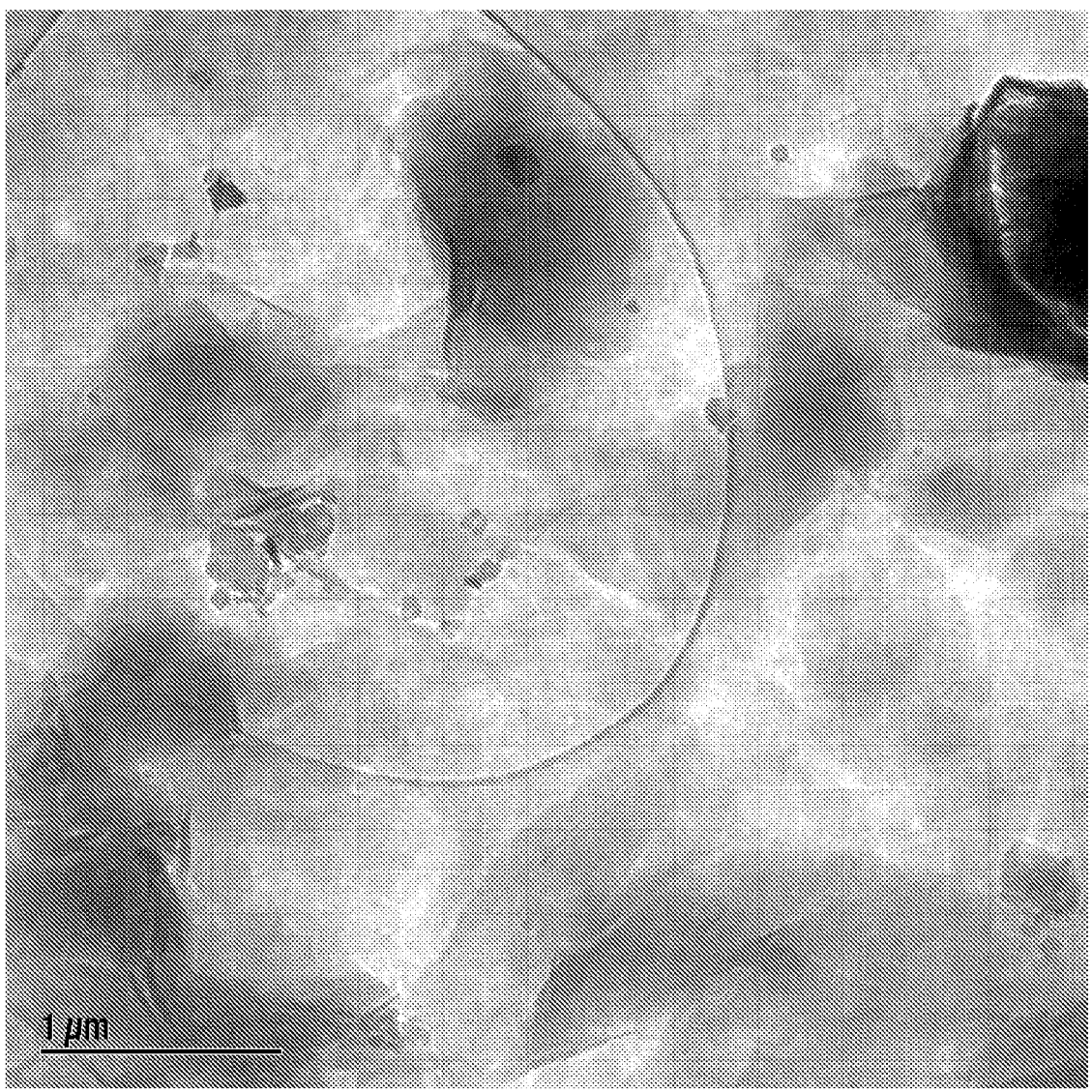
FIG. 14 shows another example of a TEM image from grain mount showing morphology of montmorillonite particles.

FIG. 14 shows a representative TEM image from grain mount showing morphology of montmorillonite particles. Particles are commonly ~0.80 μm to ~3.0 μm in diameter and are lamellar aggregates to pseudo platy in morphology. Silica particles are of medium contrast and are rounded or rounded aggregates.

Figure 15:
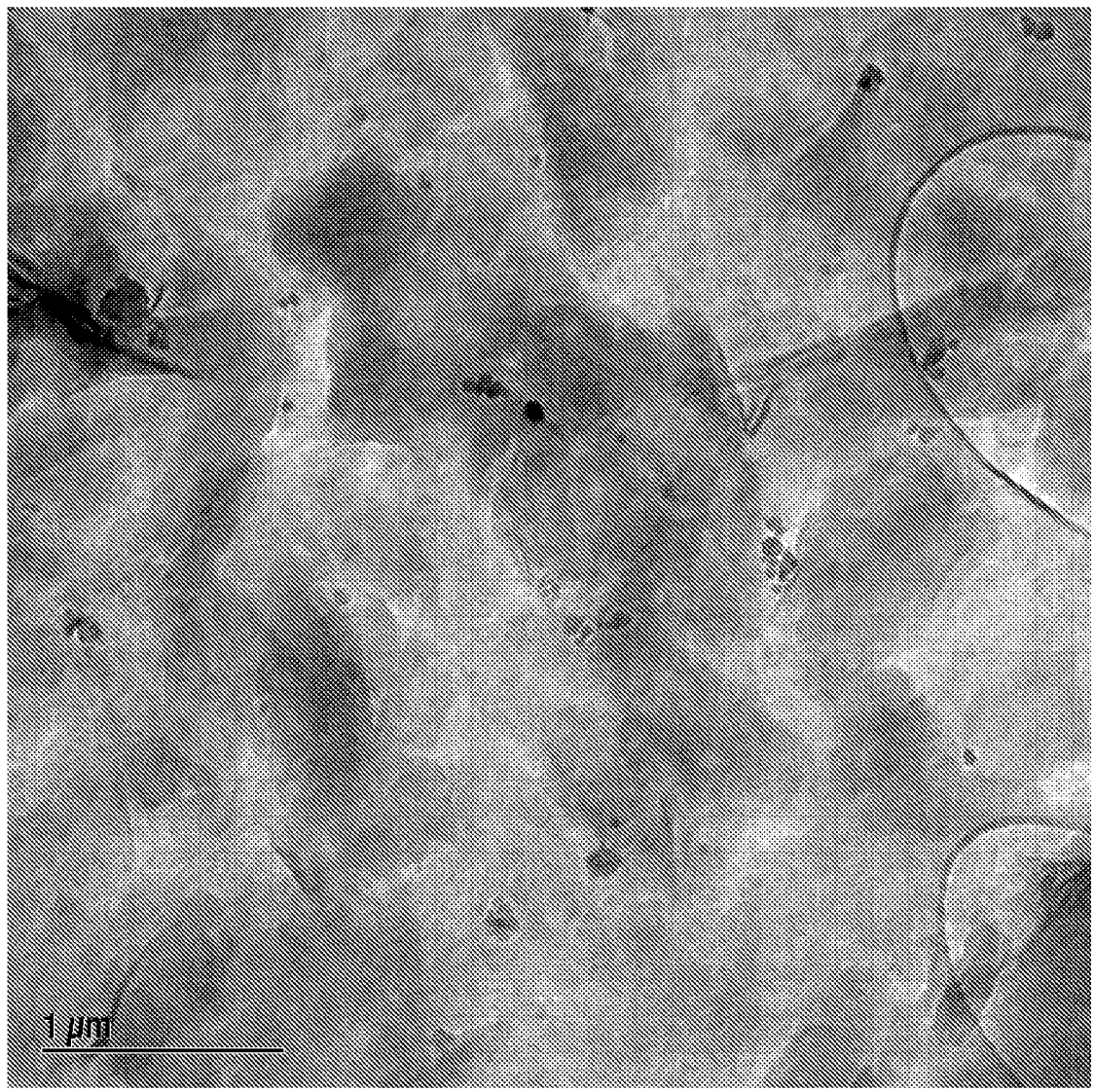
FIG. 15 also shows another example of a TEM image from grain mount showing morphology of montmorillonite particles.

FIG. 15 shows a representative TEM image from grain mount showing morphology of montmorillonite particles. Particles are commonly ~0.25 μm to ~3.0 μm in diameter and are lamellar aggregates to pseudo platy in morphology. Silica particles are of medium contrast and are rounded or rounded aggregates.

Figure 16:
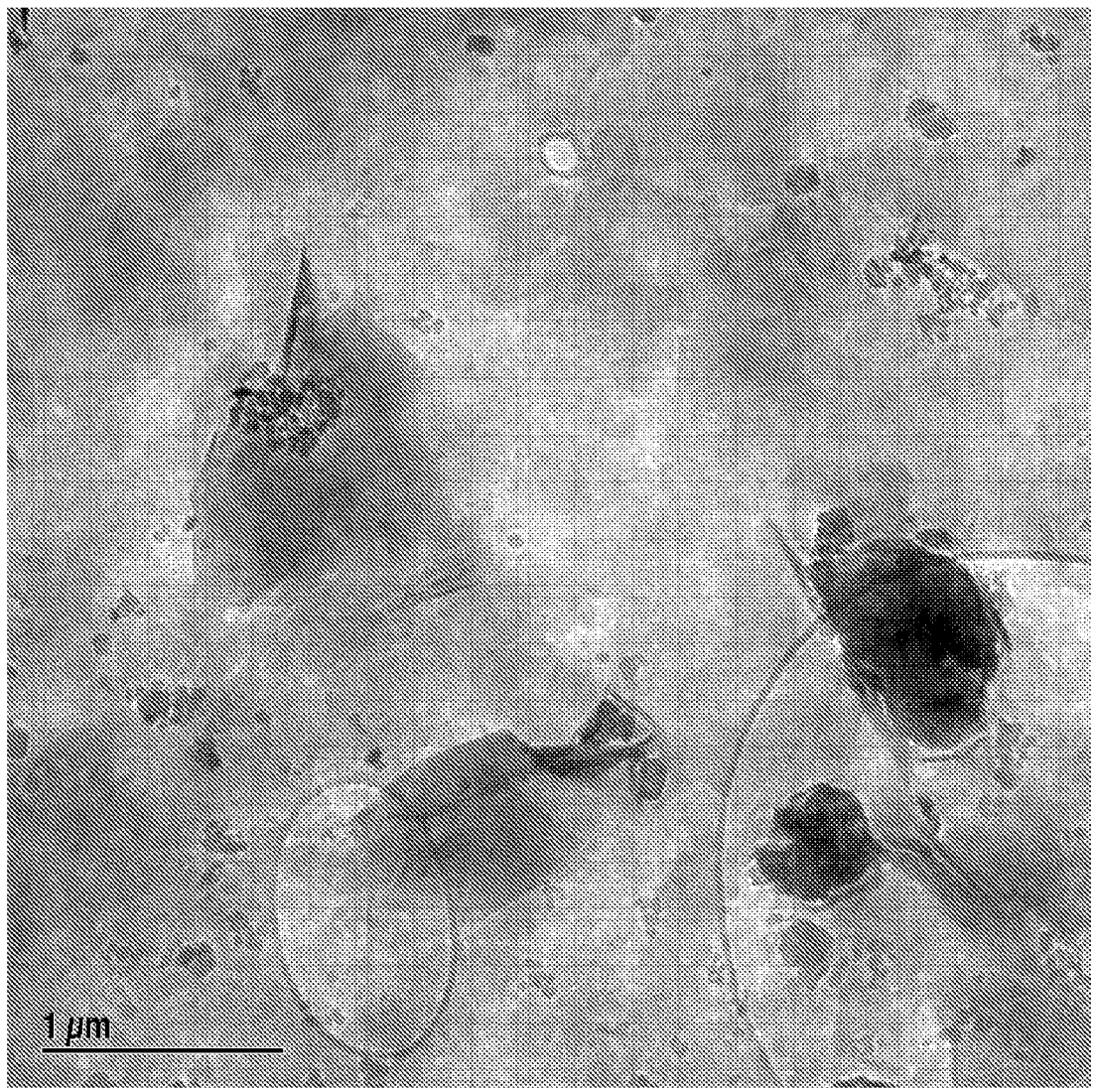
FIG. 16 shows yet another example of a TEM image from grain mount showing morphology of montmorillonite particles.

FIG. 16 shows a representative TEM image from grain mount showing morphology of montmorillonite particles. Four larger particles with darker contrast which are ~0.5 μm to ~1.5 μm in diameter are shown, which are lamellar aggregates. Smaller montmorillonite particles ~0.1 μm to ~0.5 μm in diameter occur throughout the image. Silica particles are of medium contrast and are rounded or rounded aggregates.

FIG. 17 shows an X-Y plot of the chemical compositional space ($Al_2O_3$ and $SiO_2$ in wt %) of montmorillonite used. Most of the particles have a composition with an $SiO_2$ content between ~50 and ~65 wt %. The $Al_2O_3$ content commonly falls between ~20 and ~32 wt %. The linear relationship shows that there is systematic variation between these two components.

FIG. 18 shows an X-Y plot of the chemical compositional space ($Al_2O_3$—$Fe_2O_3$ in wt %) of montmorillonite used. $Fe_2O_3$ content in the montmorillonite is commonly between ~1 and ~5.5 wt %. This range indicates that the montmorillonite used varies from near ideal compositions of montmorillonite to intermediate compositions between montmorillonite and nontronite. $Al_2O_3$ content commonly falls between ~20 and ~32 wt % but may be as low as ~10% in some particles. This compositional field in part defines 2:1 layer compositional characteristics of the technology.

FIG. 19 shows an X-Y plot of the chemical compositional space (MgO—$Fe_2O_3$ in wt %) of montmorillonite used. MgO content varies from ~2.0 to ~8.5 wt %. Mg and Fe are interpreted to be octahedral cations and can occur in the octahedral sheet in the 2:1 layer. This compositional field in part defines 2:1 layer characteristics of the technology. Although not likely, $Fe^{3+}$ may substitute in the tetrahedral layer as well and this may explain some of the variation observed.

C. Properties and Behavior of Reacted Aqueous Slurry

1. EXAMPLE

Exchange with CsCl

In one experiment, ~100 ml of the aqueous clay suspension comprising of a montmorillonite-based fluid was mixed with ~800 ml of 0.25 M solution of CsCl to sequester $^{133}Cs^+$ aqueous cations. Initially, when a small amount of montmorillonite-based fluid was introduced to the CsCl solution, immediate flocculation occurred and continued to occur. Phase separation began within ~30–~45 seconds as floccules began settling to the bottom. After a few minutes a large portion of the floccules separated from the solution.

In other experiments, repeated feasibility tests show that a small pile of CsCl that is ~1 inch in diameter can be contained by ~20 to ~30 pumps of aqueous clay suspension. The spraying of the suspension on the CsCl powder does not agitate and disperse the powder. This effect is due to the rheological properties of the suspension. The suspension self aggregates and seals the pile. The mixture can then be vacuumed or removed. Upon exchange with $Cs^+$, visible changes in the physical properties occur. After exchange, the color of the aqueous clay suspension turns to Munsell values of 5Y 7/2, 5Y 7/3, 5Y 6/2, 5Y 6/3 or intermediate colors between those values. A dramatic change in the rheological properties occurs where the gel-like consistency of the Na-montmorillonite completely disappears and becomes a waxy paste in the Cs-montmorillonite form.

The color of the aqueous clay suspension as compared to a Munsell color chart varies slightly from 2.5Y 6/3 to 2.5Y 6/2. The color is generally uniform within analyses and is not streaked.

Figure 20:
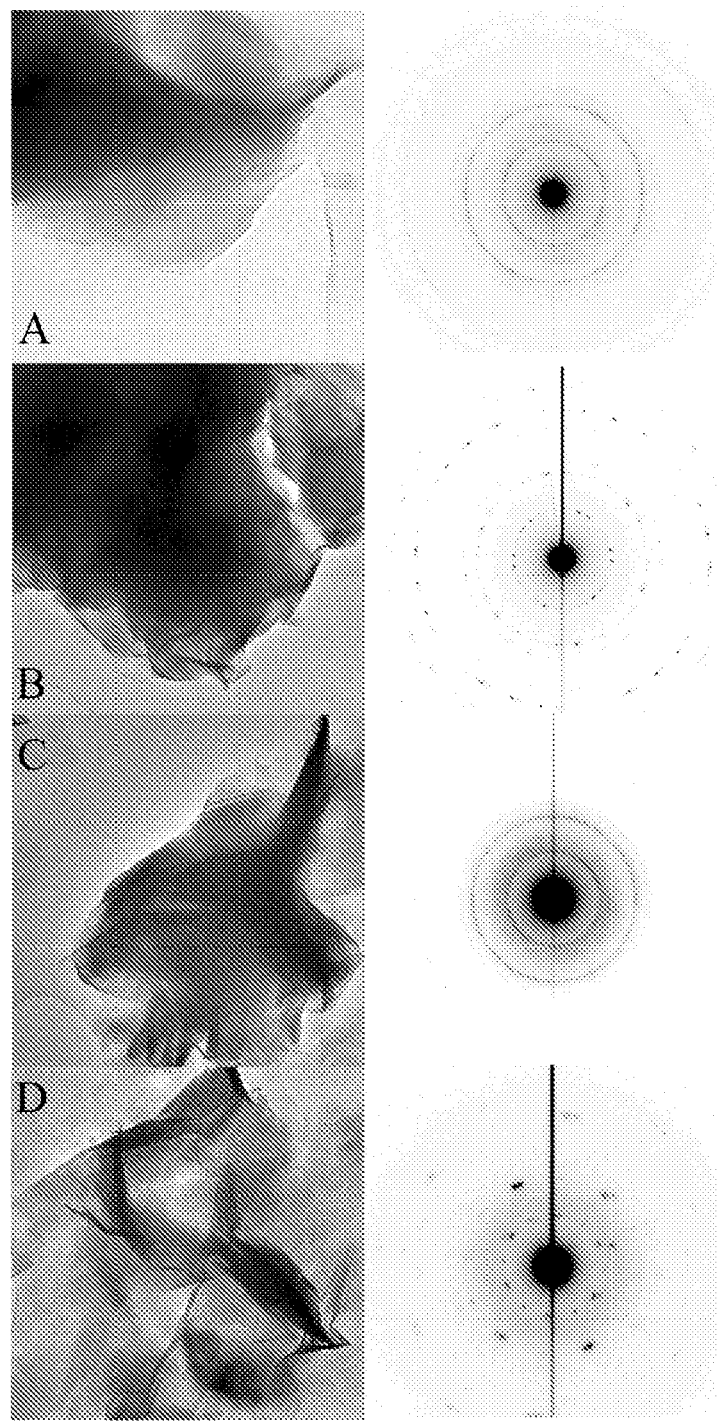
FIG. 20 shows examples of TEM images and respective SAED diffraction patterns of Cs-reacted montmorillonite particles.

Each of the thirty analyses of Cs-montmorillonite was analyzed for weight percentage of oxides using EDS. For transmission electron microscopy investigation, grain mounts were prepared of the Cs-exchanged montmorillonite using alcohol as a dispersing medium. Analyses were prepared on 300 mesh hole carbon Cu grids. Analyses were produced using a 300 kV JEM 3010 TEM. The weight percentages of oxides of each experimental run and the summary are respectively shown in TABLES 5-6. FIG. 20 illustrates some TEM and associated SAED images of Cs-reacted montmorillonite particles.

TABLE 5

Chemical compositions of Cs-reacted montmorillonite particles with descriptive statistics.

| Analysis | $SiO_2$ | $Al_2O_3$ | $Fe_2O_3$ | MgO | CaO | $Na_2O$ | $K_2O$ | $Cs_2O$ | Cl | Total |
|---|---|---|---|---|---|---|---|---|---|---|
| 1 | 56.05 | 19.30 | 3.17 | 1.29 | 0.00 | 0.65 | 0.00 | 18.77 | 0.77 | 100.00 |
| 2 | 57.29 | 20.03 | 1.92 | 3.26 | 0.00 | 1.14 | 0.02 | 15.53 | 0.81 | 100.00 |

TABLE 5-continued

Chemical compositions of Cs-reacted montmorillonite particles with descriptive statistics.

| Analysis | $SiO_2$ | $Al_2O_3$ | $Fe_2O_3$ | MgO | CaO | $Na_2O$ | $K_2O$ | $Cs_2O$ | Cl | Total |
|---|---|---|---|---|---|---|---|---|---|---|
| 3 | 58.52 | 20.05 | 2.05 | 4.84 | 0.09 | 0.75 | 0.08 | 12.63 | 0.99 | 100.00 |
| 4 | 60.33 | 19.73 | 2.50 | 5.31 | 0.05 | 0.40 | 0.04 | 10.93 | 0.71 | 100.00 |
| 5 | 59.08 | 20.11 | 2.36 | 4.66 | 0.06 | 0.60 | 0.00 | 12.40 | 0.73 | 100.00 |
| 6 | 56.05 | 21.52 | 2.31 | 5.79 | 0.02 | 1.89 | 0.00 | 11.91 | 0.51 | 100.00 |
| 7 | 60.03 | 19.88 | 1.67 | 5.15 | 0.10 | 1.15 | 2.11 | 9.09 | 0.82 | 100.00 |
| 8 | 58.64 | 19.95 | 2.15 | 4.49 | 0.05 | 0.81 | 0.00 | 12.90 | 1.01 | 100.00 |
| 9 | 58.90 | 19.76 | 1.94 | 4.13 | 0.11 | 0.92 | 0.52 | 12.80 | 0.92 | 100.00 |
| 10 | 60.60 | 19.35 | 1.54 | 4.96 | 0.03 | 1.24 | 2.17 | 9.27 | 0.84 | 100.00 |
| 11 | 60.04 | 19.24 | 1.60 | 4.44 | 0.05 | 1.39 | 2.07 | 10.40 | 0.77 | 100.00 |
| 12 | 64.08 | 15.87 | 1.89 | 5.30 | 0.07 | 0.57 | 0.18 | 11.30 | 0.74 | 100.00 |
| 13 | 56.06 | 21.74 | 1.96 | 5.41 | 0.00 | 1.53 | 0.02 | 12.23 | 1.05 | 100.00 |
| 14 | 58.00 | 19.78 | 2.23 | 4.46 | 0.03 | 1.13 | 0.00 | 13.29 | 1.08 | 100.00 |
| 15 | 59.29 | 18.83 | 1.97 | 4.21 | 0.08 | 0.70 | 0.02 | 13.59 | 1.31 | 100.00 |
| 16 | 58.45 | 19.11 | 2.00 | 2.09 | 0.04 | 0.73 | 0.02 | 16.19 | 1.37 | 100.00 |
| 17 | 56.87 | 21.04 | 1.91 | 5.48 | 0.11 | 1.38 | 0.08 | 11.95 | 1.18 | 100.00 |
| 18 | 55.40 | 21.16 | 1.73 | 4.98 | 0.07 | 1.88 | 0.02 | 13.62 | 1.14 | 100.00 |
| 19 | 58.87 | 19.03 | 1.71 | 4.62 | 0.07 | 1.14 | 0.01 | 13.43 | 1.12 | 100.00 |
| 20 | 58.38 | 18.98 | 2.16 | 3.23 | 0.14 | 0.71 | 0.26 | 14.84 | 1.30 | 100.00 |
| 21 | 57.95 | 19.29 | 1.96 | 2.97 | 0.08 | 1.15 | 0.05 | 14.37 | 2.18 | 100.00 |
| 22 | 57.99 | 19.76 | 1.92 | 2.12 | 0.04 | 0.83 | 0.07 | 15.67 | 1.60 | 100.00 |
| 23 | 57.65 | 20.71 | 1.88 | 3.38 | 0.02 | 0.80 | 0.01 | 14.91 | 0.64 | 100.00 |
| 24 | 57.39 | 21.72 | 1.45 | 4.79 | 0.09 | 0.86 | 0.08 | 12.72 | 0.90 | 100.00 |
| 25 | 57.27 | 20.95 | 1.58 | 3.30 | 0.03 | 0.91 | 0.01 | 15.13 | 0.82 | 100.00 |
| 26 | 58.60 | 19.50 | 2.30 | 3.86 | 0.09 | 0.89 | 0.01 | 14.33 | 0.42 | 100.00 |
| 27 | 57.53 | 20.39 | 1.79 | 3.15 | 0.05 | 0.85 | 0.00 | 15.48 | 0.76 | 100.00 |
| 28 | 56.74 | 23.15 | 2.63 | 3.70 | 0.12 | 0.58 | 0.35 | 11.60 | 1.13 | 100.00 |
| 29 | 56.92 | 21.53 | 1.72 | 3.45 | 0.06 | 0.86 | 0.51 | 14.32 | 0.63 | 100.00 |
| 30 | 56.34 | 22.27 | 1.32 | 4.53 | 0.06 | 0.89 | 0.00 | 13.90 | 0.69 | 100.00 |

TABLE 6

Summary of Weight % of Oxides in Montmorillonite

| | $SiO_2$ | $Al_2O_3$ | $Fe_2O_3$ | MgO | CaO | $Na_2O$ | $K_2O$ | $Cs_2O$ | Cl |
|---|---|---|---|---|---|---|---|---|---|
| Minimum | 55.40 | 15.87 | 1.32 | 1.29 | 0.00 | 0.40 | 0.00 | 9.09 | 0.42 |
| Maximum | 64.08 | 23.15 | 3.17 | 5.79 | 0.14 | 1.89 | 2.17 | 18.77 | 2.18 |
| Median | 58.00 | 19.92 | 1.93 | 4.45 | 0.06 | 0.88 | 0.02 | 13.36 | 0.87 |
| Variance | 3.07 | 1.83 | 0.14 | 1.22 | 0.00 | 0.13 | 0.40 | 4.40 | 0.12 |
| St. Dev. | 1.751 | 1.3512 | 0.379 | 1.11 | 0.036 | 0.362 | 0.6352 | 2.097 | 0.352 |

FIG. 20 shows representative TEM images (left) and respective SAED patterns (right) of Cs-reacted montmorillonite particles. Magnification is a 6,000× for all images. Particles shown are largely lamellar aggregates. SAED pattern show variation with some patterns being overall similar to un-reacted montmorillonite have turbostratic rings being well developed and lacking a large number of discrete diffraction spots such as SAED patterns for A and C. Other particles have very discrete diffraction spots after reaction with $Cs^+$ such as those in B and D. The Discrete spots are interpreted as a result of $Cs^+$ cations exchanging into specific discrete crystallographic sites in the hexagonal rings of between the tetrahedral sheets in the montmorillonite structure.

2. EXAMPLE

Exchange with $SrCl_2.6H_2O$

Similar to the CsCl experiments above, the aqueous clay suspension may be applied to $SrCl_2.6H_2O$. In one experiment, the aqueous clay suspension comprising of montmorillonite-based fluid was introduced to ~0.25 M solution of $SrCl_2.H_2O$. After a few minutes, the introduced montmorillonite-based fluid showed flocculation. A close inspection reveals that floccules are well-formed and discrete with diameters of ~1-~2 mm. Time lapse here is ~15 mins.

Figure 21:
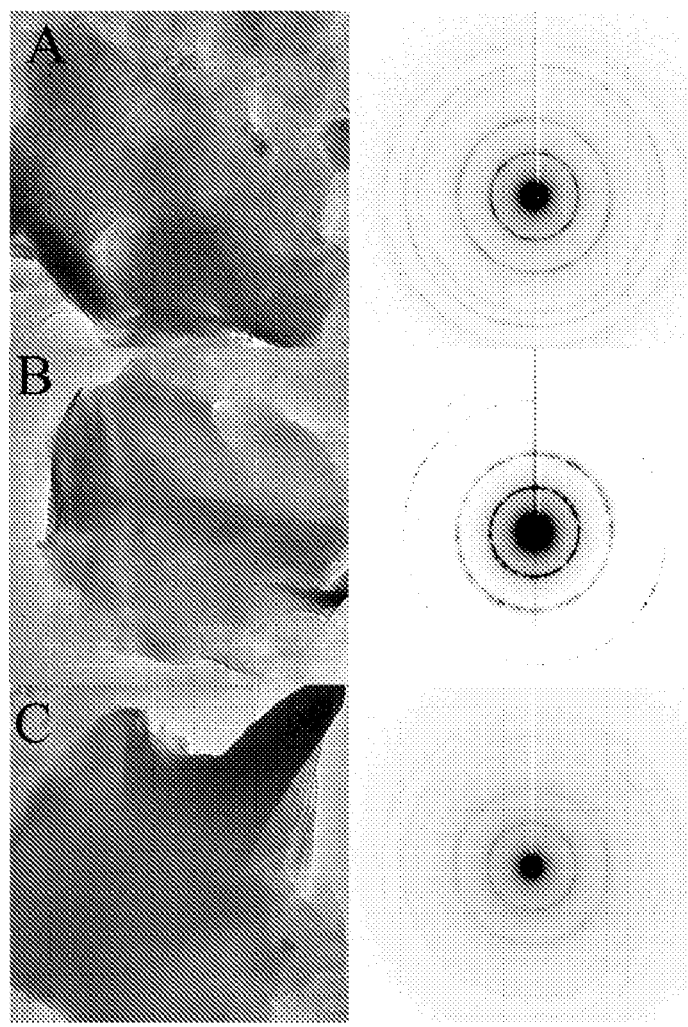
FIG. 21 shows examples of TEM images and respective SAED diffraction patterns of Sr-reacted montmorillonite particles.

For transmission electron microscopy investigation, grain mounts were prepared of the Sr-exchanged montmorillonite using alcohol as a dispersing medium. Analyses were prepared on 300 mesh hole carbon Cu grids. Analyses were investigated using a 300 kV JEM 3010 TEM and a 200 kV 2010 SEM. The weight percentages of oxides of each experimental run and the summary are respectively shown in TABLES 7-8. FIG. 21 illustrates some TEM and associated SAED images of Sr-reacted montmorillonite particles.

TABLE 7

Chemical compositions of Cs-reacted montmorillonite particles with descriptive statistics.

| Analysis | SiO$_2$ | Al$_2$O$_3$ | Fe$_2$O$_3$ | MgO | CaO | SrO | Na$_2$O | K$_2$O | Total |
|---|---|---|---|---|---|---|---|---|---|
| 1 | 57.40 | 23.19 | 3.62 | 4.85 | 0.55 | 9.26 | 1.14 | 0.00 | 100.00 |
| 2 | 56.80 | 24.46 | 3.81 | 5.13 | 0.39 | 7.44 | 1.97 | 0.00 | 100.00 |
| 3 | 58.70 | 22.29 | 4.17 | 5.78 | 0.36 | 7.22 | 1.47 | 0.01 | 100.00 |
| 4 | 60.72 | 23.13 | 3.11 | 5.61 | 0.37 | 5.58 | 1.48 | 0.01 | 100.00 |
| 5 | 58.28 | 23.75 | 4.10 | 4.73 | 0.43 | 7.70 | 1.02 | 0.00 | 100.00 |
| 6 | 58.27 | 23.85 | 3.27 | 4.54 | 0.46 | 8.68 | 0.93 | 0.00 | 100.00 |
| 7 | 61.86 | 22.06 | 2.75 | 5.46 | 0.37 | 6.34 | 1.10 | 0.07 | 100.00 |
| 8 | 60.49 | 22.59 | 2.76 | 5.74 | 0.38 | 6.26 | 1.77 | 0.01 | 100.00 |
| 9 | 59.39 | 23.25 | 2.57 | 5.91 | 0.44 | 6.74 | 1.71 | 0.00 | 100.00 |
| 10 | 61.21 | 23.12 | 2.90 | 4.82 | 0.38 | 6.28 | 1.30 | 0.00 | 100.00 |
| 11 | 59.05 | 23.11 | 3.47 | 5.51 | 0.37 | 6.88 | 1.62 | 0.00 | 100.00 |

TABLE 8

Summary of Weight % of Oxides in Montmorillonite

| | SiO$_2$ | Al$_2$O$_3$ | Fe$_2$O$_3$ | MgO | CaO | SrO | Na$_2$O | K$_2$O |
|---|---|---|---|---|---|---|---|---|
| Minimum | 56.80 | 22.06 | 2.57 | 4.54 | 0.36 | 5.58 | 0.93 | 0.00 |
| Maximum | 61.86 | 24.46 | 4.17 | 5.91 | 0.55 | 9.26 | 1.97 | 0.07 |
| Median | 59.05 | 23.13 | 3.27 | 5.46 | 0.38 | 6.88 | 1.47 | 0.00 |
| Variance | 2.60 | 0.48 | 0.31 | 0.23 | 0.00 | 1.21 | 0.11 | 0.00 |
| St. Dev. | 1.612 | 0.694 | 0.558 | 0.482 | 0.057 | 1.099 | 0.339 | 0.021 |

FIG. 21 shows representative TEM images (left) and respective SAED patterns (right) of Sr-reacted montmorillonite particles. Magnification is 6,000× for all images. Particles shown are largely lamellar aggregates. SAED pattern show variation with some patterns being overall similar to un-reacted montmorillonite have turbostratic rings being well developed and lacking a large number of discrete diffraction spots. The SAED pattern for B shows some discrete poorly formed spots in the rings.

D. Sorption Based Media

1. Pre-Contact with Aqueous Slurry

The sorption based media may comprise of any clay material from the smectite class. As an exemplified embodiment, the sorption based media comprises palygorskite-rich media. The palygorskite-rich media can be granulated in form from particle sizes of ~10 micrometers to ~1 cm. Particles are commonly angular but rarely rounded particles do occur.

In addition, as another embodiment, the palygorskite (as well as other minerals that may be used as the sorption based media) may be pretreated with a plurality of cations, such as $Na^+$, $Ca^{2+}$, $Mg^{2+}$, etc. Pretreating the sorption based media with various cations can help facilitate the exchange of cations with radionuclides.

Particle size distribution tends to allow the media to be modified to change the permeability. For example, RVM 420 formulation (a granulated product obtainable from Oil Dri Corporation of America of Chicago, Ill.) in unmodified form has a range of permeability coefficients that can vary from ~2.55 to ~4.29 cm/s. By modifying grain size, the permeability coefficient can be modified. For example, sieved material <1.18 mm in average diameter has permeability coefficients that can vary from ~1.14 to ~3.46 cm/s. Permeability tests and results can be seen in TABLES 9-16.

TABLE 9

Permeability Tests of Unmodified Data

| Meas | T$_0$ (sec) | T$_1$ (sec) | Vol$_0$ (mL) | Vol$_1$ (mL) | Height$_0$ (cm) | Height$_1$ (cm) | Q | L | h0–h1 | h0/h1 | Log h0/h1 | K cm/s |
|---|---|---|---|---|---|---|---|---|---|---|---|---|
| 1 | 0 | 47.33 | 20.0 | 60.9 | 55.0 | 31.5 | 40.9 | 7.9 | 23.5 | 1.75 | 0.24 | 2.82 |
| 2 | 0 | 51.05 | 19.0 | 59.4 | 55.5 | 32.0 | 40.4 | 7.9 | 23.5 | 1.73 | 0.24 | 2.55 |
| 3 | 0 | 50.80 | 17.4 | 60.1 | 56.5 | 31.5 | 42.7 | 7.9 | 25.0 | 1.79 | 0.25 | 3.06 |
| 4 | 0 | 50.69 | 18.3 | 60.2 | 56.1 | 31.4 | 41.9 | 7.9 | 24.7 | 1.79 | 0.25 | 2.95 |
| 5 | 0 | 46.63 | 19.3 | 60.0 | 55.4 | 31.5 | 40.7 | 7.9 | 23.9 | 1.76 | 0.25 | 2.94 |
| 6 | 0 | 46.30 | 19.5 | 60.4 | 55.2 | 31.3 | 40.9 | 7.9 | 23.9 | 1.76 | 0.25 | 2.99 |
| 7 | 0 | 46.35 | 19.1 | 60.1 | 55.4 | 31.5 | 41.0 | 7.9 | 23.9 | 1.76 | 0.25 | 2.98 |
| 8 | 0 | 46.83 | 20.0 | 60.1 | 55.0 | 31.5 | 40.1 | 7.9 | 23.5 | 1.75 | 0.24 | 2.80 |
| 9 | 0 | 48.92 | 19.2 | 60.4 | 55.4 | 31.3 | 41.2 | 7.9 | 24.1 | 1.77 | 0.25 | 2.89 |
| 10 | 0 | 48.61 | 18.8 | 60.5 | 55.6 | 31.3 | 41.7 | 7.9 | 24.3 | 1.78 | 0.25 | 2.99 |
| 11 | 0 | 49.44 | 18.8 | 60.4 | 55.6 | 31.3 | 41.6 | 7.9 | 24.3 | 1.78 | 0.25 | 2.93 |
| 12 | 0 | 49.14 | 19.8 | 60.6 | 55.1 | 31.1 | 40.8 | 7.9 | 24.0 | 1.77 | 0.25 | 2.84 |
| 13 | 0 | 47.97 | 18.5 | 60.2 | 55.9 | 31.4 | 41.7 | 7.9 | 24.5 | 1.78 | 0.25 | 3.06 |
| 14 | 0 | 47.15 | 19.5 | 60.9 | 55.1 | 31.5 | 41.4 | 7.9 | 23.6 | 1.75 | 0.24 | 2.89 |
| 15 | 0 | 46.94 | 19.7 | 59.9 | 55.3 | 31.6 | 40.2 | 7.9 | 23.7 | 1.75 | 0.24 | 2.83 |
| 16 | 0 | 47.91 | 19.1 | 60.2 | 55.4 | 31.4 | 41.1 | 7.9 | 24.0 | 1.76 | 0.25 | 2.91 |
| 17 | 0 | 48.84 | 18.2 | 60.1 | 56.1 | 31.5 | 41.9 | 7.9 | 24.6 | 1.78 | 0.25 | 3.04 |
| 18 | 0 | 47.33 | 20.0 | 60.3 | 55.0 | 31.4 | 40.3 | 7.9 | 23.6 | 1.75 | 0.24 | 2.81 |

TABLE 9-continued

Permeability Tests of Unmodified Data

| Meas | $T_0$ (sec) | $T_1$ (sec) | $Vol_0$ (mL) | $Vol_1$ (mL) | $Height_0$ (cm) | $Height_1$ (cm) | Q | L | h0–h1 | h0/h1 | Log h0/h1 | K cm/s |
|---|---|---|---|---|---|---|---|---|---|---|---|---|
| 19 | 0 | 47.59 | 19.6 | 61.0 | 55.3 | 30.9 | 41.4 | 7.9 | 24.4 | 1.79 | 0.25 | 3.08 |
| 20 | 0 | 48.47 | 19.7 | 60.4 | 55.3 | 31.3 | 40.7 | 7.9 | 24.0 | 1.77 | 0.25 | 2.86 |
| 21 | 0 | 47.79 | 20.1 | 60.3 | 54.9 | 31.4 | 40.2 | 7.9 | 23.5 | 1.75 | 0.24 | 2.75 |
| 22 | 0 | 47.71 | 19.6 | 60.2 | 55.3 | 31.4 | 40.6 | 7.9 | 23.9 | 1.76 | 0.25 | 2.87 |
| 23 | 0 | 47.29 | 19.7 | 59.9 | 55.3 | 31.6 | 40.2 | 7.9 | 23.7 | 1.75 | 0.24 | 2.81 |
| 24 | 0 | 48.44 | 20.2 | 60.2 | 54.9 | 31.4 | 40.0 | 7.9 | 23.5 | 1.75 | 0.24 | 2.70 |
| 25 | 0 | 49.59 | 19.8 | 60.4 | 55.1 | 31.3 | 40.6 | 7.9 | 23.8 | 1.76 | 0.25 | 2.75 |
| 26 | 0 | 48.52 | 19.6 | 60.2 | 55.3 | 31.4 | 40.6 | 7.9 | 23.9 | 1.76 | 0.25 | 2.82 |
| 27 | 0 | 49.58 | 19.8 | 60.6 | 55.1 | 31.1 | 40.8 | 7.9 | 24.0 | 1.77 | 0.25 | 2.82 |
| 28 | 0 | 48.94 | 19.6 | 60.2 | 55.3 | 31.4 | 40.6 | 7.9 | 23.9 | 1.76 | 0.25 | 2.80 |
| 29 | 0 | 49.36 | 19.6 | 60.2 | 55.3 | 31.4 | 40.6 | 7.9 | 23.9 | 1.76 | 0.25 | 2.77 |
| 30 | 0 | 52.40 | 19.4 | 60.4 | 55.4 | 31.3 | 41.0 | 7.9 | 24.1 | 1.77 | 0.25 | 2.68 |
| 31 | 0 | 52.01 | 19.3 | 60.3 | 55.4 | 31.4 | 41.0 | 7.9 | 24.0 | 1.76 | 0.25 | 2.68 |
| 32 | 0 | 51.74 | 19.8 | 60.2 | 55.1 | 31.4 | 40.4 | 7.9 | 23.7 | 1.75 | 0.24 | 2.59 |
| 33 | 0 | 51.88 | 19.6 | 60.4 | 55.3 | 31.3 | 40.8 | 7.9 | 24.0 | 1.77 | 0.25 | 2.68 |
| 34 | 0 | 47.82 | 19.5 | 60.2 | 55.4 | 31.4 | 40.7 | 7.9 | 24.0 | 1.76 | 0.25 | 2.89 |
| 35 | 0 | 48.26 | 20.0 | 60.6 | 55.0 | 31.1 | 40.6 | 7.9 | 23.9 | 1.77 | 0.25 | 2.86 |
| 36 | 0 | 49.63 | 19.4 | 60.1 | 55.4 | 31.5 | 40.7 | 7.9 | 23.9 | 1.76 | 0.25 | 2.76 |
| 37 | 0 | 49.47 | 20.2 | 59.8 | 54.9 | 31.6 | 39.6 | 7.9 | 23.3 | 1.74 | 0.24 | 2.57 |
| 38 | 0 | 50.11 | 20.2 | 60.7 | 54.9 | 31.1 | 40.5 | 7.9 | 23.8 | 1.77 | 0.25 | 2.73 |
| 39 | 0 | 48.66 | 19.7 | 60.7 | 55.3 | 31.1 | 41.0 | 7.9 | 24.2 | 1.78 | 0.25 | 2.93 |
| 40 | 0 | 49.84 | 20.2 | 61.0 | 54.9 | 30.9 | 40.8 | 7.9 | 24.0 | 1.78 | 0.25 | 2.82 |
| 41 | 0 | 33.10 | 20.0 | 61.0 | 55.0 | 30.9 | 41.0 | 7.9 | 24.1 | 1.78 | 0.25 | 4.29 |
| 42 | 0 | 32.14 | 20.0 | 60.0 | 55.0 | 31.5 | 40.0 | 7.9 | 23.5 | 1.75 | 0.24 | 4.06 |
| 43 | 0 | 32.52 | 20.0 | 60.2 | 55.0 | 31.4 | 40.2 | 7.9 | 23.6 | 1.75 | 0.24 | 4.08 |
| 44 | 0 | 33.25 | 20.0 | 61.8 | 55.0 | 32.4 | 41.8 | 7.9 | 22.6 | 1.70 | 0.23 | 3.75 |
| 45 | 0 | 32.56 | 19.5 | 60.0 | 55.2 | 31.5 | 40.5 | 7.9 | 23.7 | 1.75 | 0.24 | 4.12 |
| 46 | 0 | 33.03 | 19.4 | 60.2 | 55.4 | 31.4 | 40.8 | 7.9 | 24.0 | 1.76 | 0.25 | 4.20 |
| 47 | 0 | 32.82 | 19.4 | 60.2 | 55.4 | 31.4 | 40.8 | 7.9 | 24.0 | 1.76 | 0.25 | 4.22 |
| 48 | 0 | 32.32 | 19.6 | 59.9 | 55.3 | 31.5 | 40.3 | 7.9 | 23.8 | 1.76 | 0.24 | 4.16 |
| 49 | 0 | 32.47 | 19.8 | 60.0 | 55.1 | 31.5 | 40.2 | 7.9 | 23.6 | 1.75 | 0.24 | 4.07 |
| 50 | 0 | 32.41 | 19.6 | 60.2 | 55.3 | 31.4 | 40.6 | 7.9 | 23.9 | 1.76 | 0.25 | 4.23 |
| 51 | 0 | 32.61 | 19.8 | 60.1 | 55.1 | 31.5 | 40.3 | 7.9 | 23.6 | 1.75 | 0.24 | 4.07 |
| 52 | 0 | 32.75 | 20.0 | 60.4 | 55.0 | 31.3 | 40.4 | 7.9 | 23.7 | 1.76 | 0.24 | 4.11 |
| 53 | 0 | 32.54 | 20.0 | 60.4 | 55.0 | 31.3 | 40.4 | 7.9 | 23.7 | 1.76 | 0.24 | 4.14 |
| 54 | 0 | 32.75 | 19.8 | 60.4 | 55.1 | 31.3 | 40.6 | 7.9 | 23.8 | 1.76 | 0.25 | 4.16 |
| 55 | 0 | 32.47 | 19.6 | 60.0 | 55.3 | 31.5 | 40.4 | 7.9 | 23.8 | 1.76 | 0.25 | 4.16 |
| 56 | 0 | 32.38 | 19.5 | 60.2 | 55.4 | 31.4 | 40.7 | 7.9 | 24.0 | 1.76 | 0.25 | 4.27 |
| 57 | 0 | 32.64 | 20.0 | 60.2 | 55.0 | 31.4 | 40.2 | 7.9 | 23.6 | 1.75 | 0.24 | 4.06 |
| 58 | 0 | 32.71 | 20.0 | 60.4 | 55.0 | 31.3 | 40.4 | 7.9 | 23.7 | 1.76 | 0.24 | 4.11 |
| 59 | 0 | 32.97 | 19.3 | 60.4 | 55.4 | 31.3 | 41.1 | 7.9 | 24.1 | 1.77 | 0.25 | 4.28 |
| 60 | 0 | 32.33 | 19.9 | 60.2 | 55.1 | 31.4 | 40.3 | 7.9 | 23.7 | 1.75 | 0.24 | 4.14 |
| 61 | 0 | 32.94 | 19.6 | 60.0 | 55.3 | 31.5 | 40.4 | 7.9 | 23.8 | 1.76 | 0.24 | 4.10 |
| 62 | 0 | 33.22 | 19.3 | 60.0 | 55.4 | 31.5 | 40.7 | 7.9 | 23.9 | 1.76 | 0.25 | 4.12 |
| 63 | 0 | 33.02 | 20.0 | 60.6 | 55.0 | 31.1 | 40.6 | 7.9 | 23.9 | 1.77 | 0.25 | 4.18 |
| 64 | 0 | 33.31 | 19.6 | 60.2 | 55.3 | 31.4 | 40.6 | 7.9 | 23.9 | 1.76 | 0.25 | 4.11 |
| 65 | 0 | 33.14 | 19.4 | 60.0 | 55.4 | 31.5 | 40.6 | 7.9 | 23.9 | 1.76 | 0.25 | 4.12 |
| 66 | 0 | 32.80 | 20.0 | 60.2 | 55.0 | 31.4 | 40.2 | 7.9 | 23.6 | 1.75 | 0.24 | 4.04 |
| 67 | 0 | 32.84 | 19.6 | 60.0 | 55.3 | 31.5 | 40.4 | 7.9 | 23.8 | 1.76 | 0.24 | 4.11 |
| 68 | 0 | 33.34 | 19.6 | 60.2 | 55.3 | 31.4 | 40.6 | 7.9 | 23.9 | 1.76 | 0.25 | 4.11 |
| 69 | 0 | 32.16 | 20.0 | 59.8 | 55.0 | 31.6 | 39.8 | 7.9 | 23.4 | 1.74 | 0.24 | 4.00 |
| 70 | 0 | 33.14 | 19.8 | 60.4 | 55.1 | 31.3 | 40.6 | 7.9 | 23.8 | 1.76 | 0.25 | 4.11 |
| 71 | 0 | 33.38 | 20.0 | 60.2 | 55.0 | 31.4 | 40.2 | 7.9 | 23.6 | 1.75 | 0.24 | 3.97 |
| 72 | 0 | 32.59 | 20.0 | 60.1 | 55.0 | 31.5 | 40.1 | 7.9 | 23.5 | 1.75 | 0.24 | 4.02 |
| 73 | 0 | 33.11 | 19.4 | 60.3 | 55.4 | 31.4 | 40.9 | 7.9 | 24.0 | 1.76 | 0.25 | 4.20 |
| 74 | 0 | 33.31 | 20.0 | 60.3 | 55.0 | 31.4 | 40.3 | 7.9 | 23.6 | 1.75 | 0.24 | 3.99 |
| 75 | 0 | 33.04 | 19.8 | 60.3 | 55.1 | 31.4 | 40.5 | 7.9 | 23.7 | 1.75 | 0.24 | 4.07 |
| 76 | 0 | 32.98 | 20.0 | 60.2 | 55.0 | 31.4 | 40.2 | 7.9 | 23.6 | 1.75 | 0.24 | 4.02 |
| 77 | 0 | 33.46 | 19.8 | 60.2 | 55.1 | 31.4 | 40.4 | 7.9 | 23.7 | 1.75 | 0.24 | 4.01 |
| 78 | 0 | 33.43 | 19.4 | 60.0 | 55.4 | 31.5 | 40.6 | 7.9 | 23.9 | 1.76 | 0.25 | 4.09 |
| 79 | 0 | 32.80 | 20.0 | 60.2 | 55.0 | 31.4 | 40.2 | 7.9 | 23.6 | 1.75 | 0.24 | 4.04 |
| 80 | 0 | 32.90 | 20.0 | 60.4 | 55.0 | 31.3 | 40.4 | 7.9 | 23.7 | 1.76 | 0.24 | 4.09 |

TABLE 9 shows the results of RVM 420 tests conducted on palygorskite-rich media. The column height is 7.9 cm. The equation used is:

$$K = QL/13.76t(h0-h1) \times \log 10(h0/h1) \qquad (1).$$

M stands for the measurement number. $T_0$ stands for $Time_0$. $T_1$ stands for $Time_1$. $Vol_0$ stands for $Volume_0$. $Vol_1$ stands for $Volume_1$.

TABLE 10

Summary of Table 9 Results

| | | |
|---|---|---|
| Average | cm/s | 3.47 |
| Minimum | cm/s | 2.55 |
| Maximum | cm/s | 4.29 |

TABLE 10-continued

Summary of Table 9 Results

| | |
|---|---|
| Variance | 0.42 |
| Standard Deviation | 0.65 |

TABLE 10 shows the summary of results from TABLE 9. Data for fine palygorskite granulated at <1.18 mm are listed in TABLE 11. Here, the RVM 420 tests were conducted with a column height at 7.9 cm. The equation used is:

$$K = QL/13.76t(h0-h1) \times \log 10(h0/h1) \quad (2).$$

M stands for the measurement number. $T_0$ stands for $Time_0$. $T_1$ stands for $Time_1$. $Vol_0$ stands for $Volume_0$. $Vol_1$ stands for $Volume_1$.

TABLE 11

Permeability Tests of Fine Data

| M | $T_0$ (sec) | $T_1$ (sec) | $Vol_0$ (mL) | $Vol_1$ (mL) | $Height_0$ (cm) | $Height_1$ (cm) | Q | L | h0–h1 | h0/h1 | Log h0/h1 | K cm/s |
|---|---|---|---|---|---|---|---|---|---|---|---|---|
| 1 | 0 | 15.60 | 2.8 | 31.3 | 67.4 | 50.9 | 28.5 | 7.9 | 16.5 | 1.324165 | 0.121942 | 2.11 |
| 2 | 0 | 17.54 | 31.3 | 53.2 | 50.9 | 38.1 | 21.9 | 7.9 | 12.8 | 1.335958 | 0.125793 | 1.15 |
| 3 | 0 | 14.90 | 9.0 | 31.0 | 64.0 | 50.7 | 22.0 | 7.9 | 13.3 | 1.262327 | 0.101172 | 1.14 |
| 4 | 0 | 34.00 | 31.0 | 69.5 | 50.7 | 28.9 | 38.5 | 7.9 | 21.8 | 1.754325 | 0.24411 | 3.46 |
| 5 | 0 | 26.14 | 16.4 | 51.7 | 59.7 | 39.1 | 35.3 | 7.9 | 20.6 | 1.526854 | 0.183798 | 2.94 |
| 6 | 0 | 33.20 | 51.7 | 79.6 | 39.1 | 22.8 | 27.9 | 7.9 | 16.3 | 1.714912 | 0.234242 | 1.84 |
| 7 | 0 | 13.69 | 0.6 | 23.9 | 68.9 | 55.7 | 23.3 | 7.9 | 13.2 | 1.236984 | 0.092364 | 1.19 |
| 8 | 0 | 14.45 | 4.8 | 28.0 | 66.4 | 52.8 | 23.2 | 7.9 | 13.6 | 1.257576 | 0.099534 | 1.25 |
| 9 | 0 | 19.45 | 28.0 | 52.2 | 52.8 | 38.5 | 24.2 | 7.9 | 14.3 | 1.371429 | 0.137173 | 1.40 |
| 10 | 0 | 30.42 | 52.2 | 78.5 | 38.5 | 23.2 | 26.3 | 7.9 | 15.3 | 1.659483 | 0.219973 | 1.67 |
| 11 | 0 | 13.75 | 3.3 | 25.9 | 67.5 | 54.1 | 22.6 | 7.9 | 13.4 | 1.247689 | 0.096107 | 1.22 |
| 12 | 0 | 21.74 | 25.9 | 53.3 | 54.1 | 37.8 | 27.4 | 7.9 | 16.3 | 1.431217 | 0.155705 | 1.84 |
| 13 | 0 | 31.28 | 53.3 | 79.6 | 37.8 | 22.8 | 26.3 | 7.9 | 15.0 | 1.657895 | 0.219557 | 1.59 |
| 14 | 0 | 13.47 | 2.3 | 25.0 | 67.7 | 54.8 | 22.7 | 7.9 | 12.9 | 1.235401 | 0.091808 | 1.15 |
| 15 | 0 | 19.71 | 25.0 | 50.3 | 54.8 | 39.8 | 25.3 | 7.9 | 15.0 | 1.376884 | 0.138897 | 1.54 |
| 16 | 0 | 30.85 | 50.3 | 77.0 | 39.8 | 24.3 | 26.7 | 7.9 | 15.5 | 1.637860 | 0.214277 | 1.65 |
| 17 | 0 | 15.86 | 5.8 | 31.1 | 65.7 | 51.1 | 25.3 | 7.9 | 14.6 | 1.285714 | 0.109144 | 1.46 |
| 18 | 0 | 24.86 | 31.1 | 60.4 | 51.1 | 34.2 | 29.3 | 7.9 | 16.9 | 1.494152 | 0.174395 | 1.99 |
| 19 | 0 | 27.83 | 5.9 | 35.1 | 65.8 | 47.5 | 29.2 | 7.9 | 18.3 | 1.385263 | 0.141532 | 1.56 |
| 20 | 0 | 29.20 | 35.1 | 68.2 | 47.5 | 29.5 | 33.1 | 7.9 | 18.0 | 1.610169 | 0.206872 | 2.42 |

TABLE 12

Summary of Table 11 Results

| | |
|---|---|
| Average | 1.73 |
| Minimum | 1.14 |
| Maximum | 3.46 |
| Variance | 0.38 |
| Standard Deviation | 0.62 |

Results from conducted RVM test #s 1-4 can be seen in TABLES 13-16. The column height for each of these 4 tests is 7.9 cm.

TABLE 13

RVM Test #1

| Measurement | $Time_0$ (sec) | $Time_1$ (sec) | $Volume_0$ (mL) | $Volume_1$ (mL) | $Height_0$ (cm) | $Height_1$ (cm) |
|---|---|---|---|---|---|---|
| 1 | 0 | 47.33 | 20.0 | 60.9 | 55.0 | 31.5 |
| 2 | 0 | 51.05 | 19.0 | 59.4 | 55.5 | 32.0 |
| 3 | 0 | 50.80 | 17.4 | 60.1 | 56.5 | 31.5 |
| 4 | 0 | 50.69 | 18.3 | 60.2 | 56.1 | 31.4 |
| 5 | 0 | 46.63 | 19.3 | 60.0 | 55.4 | 31.5 |
| 6 | 0 | 46.30 | 19.5 | 60.4 | 55.2 | 31.3 |
| 7 | 0 | 46.35 | 19.1 | 60.1 | 55.4 | 31.5 |
| 8 | 0 | 46.83 | 20.0 | 60.1 | 55.0 | 31.5 |
| 9 | 0 | 48.92 | 19.2 | 60.4 | 55.4 | 31.3 |
| 10 | 0 | 48.61 | 18.8 | 60.5 | 55.6 | 31.3 |
| 11 | 0 | 49.44 | 18.8 | 60.4 | 55.6 | 31.3 |
| 12 | 0 | 49.14 | 19.8 | 60.6 | 55.1 | 31.1 |
| 13 | 0 | 47.97 | 18.5 | 60.2 | 55.9 | 31.4 |
| 14 | 0 | 47.15 | 19.5 | 60.9 | 55.1 | 31.5 |
| 15 | 0 | 46.94 | 19.7 | 59.9 | 55.3 | 31.6 |
| 16 | 0 | 47.91 | 19.1 | 60.2 | 55.4 | 31.4 |
| 17 | 0 | 48.84 | 18.2 | 60.1 | 56.1 | 31.5 |
| 18 | 0 | 47.33 | 20.0 | 60.3 | 55.0 | 31.4 |
| 19 | 0 | 47.59 | 19.6 | 61.0 | 55.3 | 30.9 |
| 20 | 0 | 48.47 | 19.7 | 60.4 | 55.3 | 31.3 |

TABLE 14

RVM Test #2

| Measurement | $Time_0$ (sec) | $Time_1$ (sec) | $Volume_0$ (mL) | $Volume_1$ (mL) | $Height_0$ (cm) | $Height_1$ (cm) |
|---|---|---|---|---|---|---|
| 1 | 0 | 47.79 | 20.1 | 60.3 | 54.9 | 31.4 |
| 2 | 0 | 47.71 | 19.6 | 60.2 | 55.3 | 31.4 |
| 3 | 0 | 47.29 | 19.7 | 59.9 | 55.3 | 31.6 |
| 4 | 0 | 48.44 | 20.2 | 60.2 | 54.9 | 31.4 |
| 5 | 0 | 49.59 | 19.8 | 60.4 | 55.1 | 31.3 |

TABLE 14-continued

RVM Test #2

| Measurement | $Time_0$ (sec) | $Time_1$ (sec) | $Volume_0$ (mL) | $Volume_1$ (mL) | $Height_0$ (cm) | $Height_1$ (cm) |
|---|---|---|---|---|---|---|
| 6 | 0 | 48.52 | 19.6 | 60.2 | 55.3 | 31.4 |
| 7 | 0 | 49.58 | 19.8 | 60.6 | 55.1 | 31.1 |
| 8 | 0 | 48.94 | 19.6 | 60.2 | 55.3 | 31.4 |
| 9 | 0 | 49.36 | 19.6 | 60.2 | 55.3 | 31.4 |
| 10 | 0 | 52.40 | 19.4 | 60.4 | 55.4 | 31.3 |
| 11 | 0 | 52.01 | 19.3 | 60.3 | 55.4 | 31.4 |
| 12 | 0 | 51.74 | 19.8 | 60.2 | 55.1 | 31.4 |
| 13 | 0 | 51.88 | 19.6 | 60.4 | 55.3 | 31.3 |
| 14 | 0 | 47.82 | 19.5 | 60.2 | 55.4 | 31.4 |
| 15 | 0 | 48.26 | 20.0 | 60.6 | 55.0 | 31.1 |
| 16 | 0 | 49.63 | 19.4 | 60.1 | 55.4 | 31.5 |
| 17 | 0 | 49.47 | 20.2 | 59.8 | 54.9 | 31.6 |
| 18 | 0 | 50.11 | 20.2 | 60.7 | 54.9 | 31.1 |
| 19 | 0 | 48.66 | 19.7 | 60.7 | 55.3 | 31.1 |
| 20 | 0 | 49.84 | 20.2 | 61.0 | 54.9 | 30.9 |

TABLE 15

RVM Test #3

| Measurement | $Time_0$ (sec) | $Time_1$ (sec) | $Volume_0$ (mL) | $Volume_1$ (mL) | $Height_0$ (cm) | $Height_1$ (cm) |
|---|---|---|---|---|---|---|
| 1 | 0 | 33.10 | 20.0 | 61.0 | 55.0 | 30.9 |
| 2 | 0 | 32.14 | 20.0 | 60.0 | 55.0 | 31.5 |
| 3 | 0 | 32.52 | 20.0 | 60.2 | 55.0 | 31.4 |
| 4 | 0 | 33.25 | 20.0 | 61.8 | 55.0 | 32.4 |
| 5 | 0 | 32.56 | 19.5 | 60.0 | 55.2 | 31.5 |
| 6 | 0 | 33.03 | 19.4 | 60.2 | 55.4 | 31.4 |
| 7 | 0 | 32.82 | 19.4 | 60.2 | 55.4 | 31.4 |
| 8 | 0 | 32.32 | 19.6 | 59.9 | 55.3 | 31.5 |
| 9 | 0 | 32.47 | 19.8 | 60.0 | 55.1 | 31.5 |
| 10 | 0 | 32.41 | 19.6 | 60.2 | 55.3 | 31.4 |
| 11 | 0 | 32.61 | 19.8 | 60.1 | 55.1 | 31.5 |
| 12 | 0 | 32.75 | 20.0 | 60.4 | 55.0 | 31.3 |
| 13 | 0 | 32.54 | 20.0 | 60.4 | 55.0 | 31.3 |
| 14 | 0 | 32.75 | 19.8 | 60.4 | 55.1 | 31.3 |
| 15 | 0 | 32.47 | 19.6 | 60.0 | 55.3 | 31.5 |
| 16 | 0 | 32.38 | 19.5 | 60.2 | 55.4 | 31.4 |
| 17 | 0 | 32.64 | 20.0 | 60.2 | 55.0 | 31.4 |
| 18 | 0 | 32.71 | 20.0 | 60.4 | 55.0 | 31.3 |
| 19 | 0 | 32.97 | 19.3 | 60.4 | 55.4 | 31.3 |
| 20 | 0 | 32.33 | 19.9 | 60.2 | 55.1 | 31.4 |

TABLE 16

RVM Test #4

| Measurement | $Time_0$ (sec) | $Time_1$ (sec) | $Volume_0$ (mL) | $Volume_1$ (mL) | $Height_0$ (cm) | $Height_1$ (cm) |
|---|---|---|---|---|---|---|
| 1 | 0 | 32.94 | 19.6 | 60.0 | 55.3 | 31.5 |
| 2 | 0 | 33.22 | 19.3 | 60.0 | 55.4 | 31.5 |
| 3 | 0 | 33.02 | 20.0 | 60.6 | 55.0 | 31.1 |
| 4 | 0 | 33.31 | 19.6 | 60.2 | 55.3 | 31.4 |
| 5 | 0 | 33.14 | 19.4 | 60.0 | 55.4 | 31.5 |
| 6 | 0 | 32.80 | 20.0 | 60.2 | 55.0 | 31.4 |
| 7 | 0 | 32.84 | 19.6 | 60.0 | 55.3 | 31.5 |
| 8 | 0 | 33.34 | 19.6 | 60.2 | 55.3 | 31.4 |
| 9 | 0 | 32.16 | 20.0 | 59.8 | 55.0 | 31.6 |
| 10 | 0 | 33.14 | 19.8 | 60.4 | 55.1 | 31.3 |
| 11 | 0 | 33.38 | 20.0 | 60.2 | 55.0 | 31.4 |
| 12 | 0 | 32.59 | 20.0 | 60.1 | 55.0 | 31.5 |
| 13 | 0 | 33.11 | 19.4 | 60.3 | 55.4 | 31.4 |
| 14 | 0 | 33.31 | 20.0 | 60.3 | 55.0 | 31.4 |
| 15 | 0 | 33.04 | 19.8 | 60.3 | 55.1 | 31.4 |
| 16 | 0 | 32.98 | 20.0 | 60.2 | 55.0 | 31.4 |
| 17 | 0 | 33.46 | 19.8 | 60.2 | 55.1 | 31.4 |
| 18 | 0 | 33.43 | 19.4 | 60.0 | 55.4 | 31.5 |
| 19 | 0 | 32.80 | 20.0 | 60.2 | 55.0 | 31.4 |

TABLE 16-continued

RVM Test #4

| Measurement | $Time_0$ (sec) | $Time_1$ (sec) | $Volume_0$ (mL) | $Volume_1$ (mL) | $Height_0$ (cm) | $Height_1$ (cm) |
|---|---|---|---|---|---|---|
| 20 | 0 | 32.90 | 20.0 | 60.4 | 55.0 | 31.3 |

Figure 22:
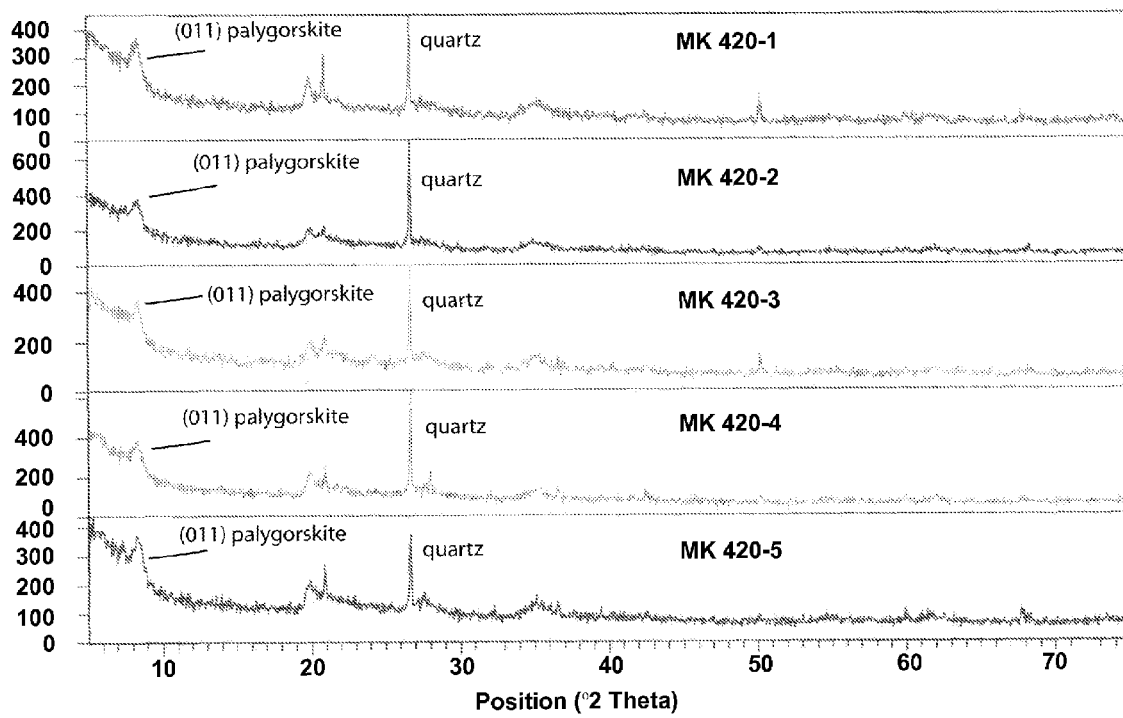
FIG. 22 shows a powder X-ray diffraction patterns for palygorskite-rich media.

Referring to FIG. 22, powder X-ray diffraction patterns for palygorskite-rich media used in the technology are shown for the range of 5-75° 2θ. The most intense peak of palygorskite is the (011) and is labeled in each pattern. There is some variation in the intensity, width and overall shape of the (011) palygorskite peak and this is interpreted to be a function of variation in width and chemical composition. Quartz is a common impurity and the most intense peak is labeled as well.

EDS chemical composition data for unreacted palygorskite fibers (weight percent of oxides for each experimental run) are provided in TABLE 17. The minimum, maximum, median, variance and standard deviation of the elements are presented in TABLE 18.

TABLE 17

EDS data for unreacted palygorskite fibers

| Analysis | $SiO_2$ | $Al_2O_3$ | $Fe_2O_3$ | MgO | CaO | $Na_2O$ | $K_2O$ | Total |
|---|---|---|---|---|---|---|---|---|
| 1 | 64.92 | 12.01 | 12.89 | 7.97 | 1.17 | 0.50 | 0.54 | 100.00 |
| 2 | 68.90 | 9.69 | 12.15 | 8.23 | 0.76 | 0.00 | 0.28 | 100.01 |
| 3 | 62.19 | 11.95 | 12.48 | 9.25 | 2.79 | 0.78 | 0.55 | 99.99 |
| 4 | 62.80 | 17.37 | 8.13 | 7.48 | 2.07 | 0.58 | 1.58 | 100.01 |
| 5 | 59.72 | 18.04 | 6.71 | 9.28 | 2.59 | 2.65 | 1.01 | 100.00 |
| 6 | 63.07 | 12.73 | 10.52 | 11.42 | 1.07 | 0.63 | 0.56 | 100.00 |
| 7 | 65.57 | 11.33 | 12.12 | 9.85 | 0.45 | 0.00 | 0.68 | 100.00 |
| 8 | 63.87 | 12.46 | 7.65 | 8.02 | 6.83 | 0.77 | 0.39 | 99.99 |
| 9 | 64.43 | 12.67 | 12.22 | 8.61 | 1.01 | 0.56 | 0.50 | 100.00 |
| 10 | 66.20 | 10.50 | 12.89 | 8.03 | 1.41 | 0.32 | 0.64 | 99.99 |
| 11 | 63.71 | 12.81 | 6.62 | 9.62 | 5.46 | 1.06 | 0.71 | 99.99 |
| 12 | 69.26 | 8.71 | 11.52 | 8.95 | 0.32 | 0.69 | 0.57 | 100.02 |
| 13 | 64.85 | 9.44 | 10.71 | 13.26 | 0.67 | 0.82 | 0.26 | 100.01 |
| 14 | 67.62 | 10.72 | 10.98 | 9.80 | 0.60 | 0.15 | 0.12 | 99.99 |
| 15 | 62.26 | 12.08 | 10.50 | 13.01 | 1.02 | 0.88 | 0.26 | 100.01 |
| 16 | 62.40 | 11.55 | 11.17 | 10.92 | 2.03 | 0.64 | 1.30 | 100.01 |
| 17 | 63.93 | 12.83 | 9.84 | 11.51 | 0.57 | 0.67 | 0.66 | 100.01 |
| 18 | 76.19 | 8.55 | 5.05 | 9.97 | 0.20 | 0.02 | 0.01 | 99.99 |
| 19 | 75.90 | 8.20 | 5.30 | 9.61 | 0.31 | 0.56 | 0.11 | 99.99 |
| 20 | 74.35 | 10.22 | 4.50 | 9.37 | 0.67 | 0.50 | 0.40 | 100.01 |
| 21 | 68.85 | 8.89 | 10.91 | 10.46 | 0.50 | 0.20 | 0.19 | 100.00 |
| 22 | 72.90 | 11.37 | 5.04 | 9.72 | 0.49 | 0.42 | 0.06 | 100.00 |
| 23 | 66.65 | 10.09 | 10.93 | 10.71 | 0.89 | 0.37 | 0.35 | 99.99 |
| 24 | 69.55 | 10.49 | 9.39 | 9.06 | 0.91 | 0.32 | 0.28 | 100.00 |
| 25 | 78.53 | 6.93 | 3.82 | 9.35 | 0.56 | 0.73 | 0.07 | 99.99 |
| 26 | 80.06 | 6.91 | 3.60 | 8.36 | 0.55 | 0.31 | 0.21 | 100.00 |
| 27 | 77.40 | 8.58 | 4.39 | 8.89 | 0.48 | 0.00 | 0.26 | 100.00 |
| 28 | 74.75 | 9.64 | 3.89 | 10.47 | 0.35 | 0.71 | 0.19 | 100.00 |
| 29 | 71.23 | 15.49 | 4.44 | 7.51 | 0.33 | 0.25 | 0.76 | 100.01 |
| 30 | 70.18 | 14.56 | 4.63 | 9.22 | 0.62 | 0.30 | 0.50 | 100.01 |
| 31 | 68.62 | 17.62 | 4.43 | 6.98 | 0.64 | 0.56 | 1.16 | 100.01 |
| 32 | 67.70 | 11.36 | 11.49 | 8.22 | 0.87 | 0.04 | 0.32 | 100.00 |
| 33 | 65.70 | 19.54 | 6.26 | 4.45 | 0.33 | 0.00 | 0.67 | 100.00 |
| 34 | 68.05 | 17.39 | 6.16 | 5.47 | 1.17 | 0.68 | 1.08 | 100.00 |
| 35 | 63.91 | 19.54 | 6.23 | 5.72 | 4.09 | 0.13 | 0.39 | 100.01 |
| 36 | 70.36 | 16.79 | 4.44 | 7.33 | 0.48 | 0.12 | 0.47 | 99.99 |
| 37 | 70.26 | 13.35 | 4.80 | 10.20 | 0.55 | 0.54 | 0.29 | 99.99 |
| 38 | 71.32 | 12.28 | 4.09 | 11.27 | 0.29 | 0.24 | 0.52 | 100.01 |
| 39 | 73.57 | 11.03 | 3.37 | 10.32 | 0.68 | 0.66 | 0.37 | 100.00 |
| 40 | 72.31 | 14.92 | 3.97 | 7.77 | 0.76 | 0.00 | 0.28 | 100.01 |
| 41 | 72.99 | 13.49 | 4.36 | 8.13 | 0.59 | 0.02 | 0.41 | 99.99 |
| 42 | 73.72 | 9.91 | 4.05 | 11.47 | 0.48 | 0.00 | 0.37 | 100.00 |
| 43 | 68.22 | 11.26 | 10.51 | 8.90 | 0.92 | 0.10 | 0.09 | 100.00 |
| 44 | 72.72 | 12.55 | 3.30 | 11.36 | 0.04 | 0.00 | 0.04 | 100.01 |
| 45 | 74.44 | 11.03 | 3.64 | 9.73 | 0.69 | 0.12 | 0.34 | 99.99 |
| 46 | 73.69 | 10.42 | 4.42 | 10.98 | 0.48 | 0.00 | 0.02 | 100.01 |

TABLE 17-continued

EDS data for unreacted palygorskite fibers

| Analysis | SiO$_2$ | Al$_2$O$_3$ | Fe$_2$O$_3$ | MgO | CaO | Na$_2$O | K$_2$O | Total |
|---|---|---|---|---|---|---|---|---|
| 47 | 72.01 | 13.28 | 5.09 | 7.71 | 0.87 | 0.53 | 0.51 | 100.00 |
| 48 | 72.06 | 14.11 | 4.28 | 8.48 | 0.46 | 0.09 | 0.51 | 99.99 |
| 49 | 73.26 | 11.81 | 3.93 | 9.87 | 0.29 | 0.79 | 0.05 | 100.00 |
| 50 | 76.49 | 8.10 | 3.15 | 10.62 | 0.86 | 0.30 | 0.48 | 100.00 |
| 51 | 74.19 | 12.17 | 2.43 | 10.13 | 0.76 | 0.00 | 0.31 | 99.99 |
| 52 | 73.50 | 13.35 | 3.12 | 9.33 | 0.43 | 0.13 | 0.13 | 99.99 |
| 53 | 68.42 | 13.98 | 4.72 | 10.34 | 0.76 | 0.82 | 0.97 | 100.01 |
| 54 | 64.39 | 22.10 | 4.33 | 6.79 | 0.90 | 0.81 | 0.66 | 99.98 |
| 55 | 71.24 | 13.67 | 4.53 | 9.46 | 0.78 | 0.00 | 0.33 | 100.01 |
| 56 | 70.28 | 12.16 | 4.28 | 10.70 | 1.28 | 0.73 | 0.57 | 100.00 |
| 57 | 75.06 | 12.57 | 4.08 | 7.61 | 0.47 | 0.00 | 0.21 | 100.00 |
| 58 | 75.02 | 12.80 | 3.96 | 7.15 | 0.71 | 0.05 | 0.31 | 100.00 |
| 59 | 71.57 | 15.54 | 4.39 | 6.79 | 0.94 | 0.32 | 0.44 | 99.99 |
| 60 | 75.02 | 9.38 | 4.29 | 5.81 | 3.68 | 1.41 | 0.42 | 100.01 |
| 61 | 68.17 | 18.36 | 4.92 | 6.27 | 1.03 | 0.47 | 0.77 | 99.99 |
| 62 | 73.16 | 13.16 | 6.76 | 5.76 | 0.79 | 0.00 | 0.38 | 100.01 |
| 63 | 78.43 | 8.79 | 4.29 | 7.17 | 0.84 | 0.00 | 0.48 | 100.00 |
| 64 | 66.43 | 12.50 | 5.69 | 9.23 | 3.96 | 1.56 | 0.64 | 100.01 |
| 65 | 74.19 | 12.15 | 4.25 | 8.10 | 0.51 | 0.46 | 0.33 | 99.99 |
| 66 | 70.12 | 13.80 | 3.23 | 11.73 | 0.36 | 0.45 | 0.32 | 100.01 |
| 67 | 71.51 | 13.76 | 3.26 | 10.59 | 0.48 | 0.20 | 0.19 | 99.99 |
| 68 | 67.52 | 18.30 | 7.58 | 4.25 | 1.45 | 0.00 | 0.90 | 100.00 |
| 69 | 66.17 | 19.73 | 6.39 | 5.82 | 0.78 | 0.65 | 0.45 | 99.99 |
| 70 | 73.16 | 11.55 | 5.80 | 7.98 | 1.23 | 0.00 | 0.29 | 100.01 |
| 71 | 74.80 | 11.70 | 4.21 | 8.50 | 0.78 | 0.00 | 0.00 | 99.99 |
| 72 | 74.07 | 11.43 | 4.84 | 8.08 | 1.07 | 0.40 | 0.12 | 100.01 |
| 73 | 75.06 | 10.32 | 5.20 | 7.98 | 1.14 | 0.25 | 0.05 | 100.00 |
| 74 | 67.95 | 16.94 | 5.19 | 7.82 | 1.04 | 0.32 | 0.75 | 100.01 |
| 75 | 68.17 | 11.83 | 8.66 | 10.18 | 0.65 | 0.32 | 0.19 | 100.00 |
| 76 | 70.60 | 10.72 | 9.41 | 8.00 | 0.96 | 0.00 | 0.30 | 99.99 |
| 77 | 70.75 | 8.64 | 10.79 | 8.36 | 1.13 | 0.00 | 0.33 | 100.00 |
| 78 | 70.60 | 11.09 | 8.92 | 7.49 | 1.75 | 0.00 | 0.15 | 100.00 |
| 79 | 69.07 | 11.17 | 6.32 | 7.75 | 4.35 | 0.82 | 0.51 | 99.99 |
| 80 | 64.58 | 16.20 | 8.19 | 6.98 | 2.10 | 0.38 | 1.56 | 99.99 |

TABLE 18

Summary of EDS data for unreacted palygorskite fibers

| | SiO$_2$ | Al$_2$O$_3$ | Fe$_2$O$_3$ | MgO | CaO | Na$_2$O | K$_2$O |
|---|---|---|---|---|---|---|---|
| Average | 70.09 | 12.58 | 6.51 | 8.81 | 1.16 | 0.40 | 0.44 |
| Minimum | 59.72 | 6.91 | 2.43 | 4.25 | 0.04 | 0.00 | 0.00 |
| Maximum | 80.06 | 22.10 | 12.89 | 13.26 | 6.83 | 2.65 | 1.58 |
| Variance | 20.23712 | 10.02039 | 9.167704 | 3.320647 | 1.438338 | 0.182031 | 0.107066 |
| St. Dev. | 4.498569 | 3.1655 | 3.027822 | 1.822264 | 1.199307 | 0.426651 | 0.32721 |

Figure 23:
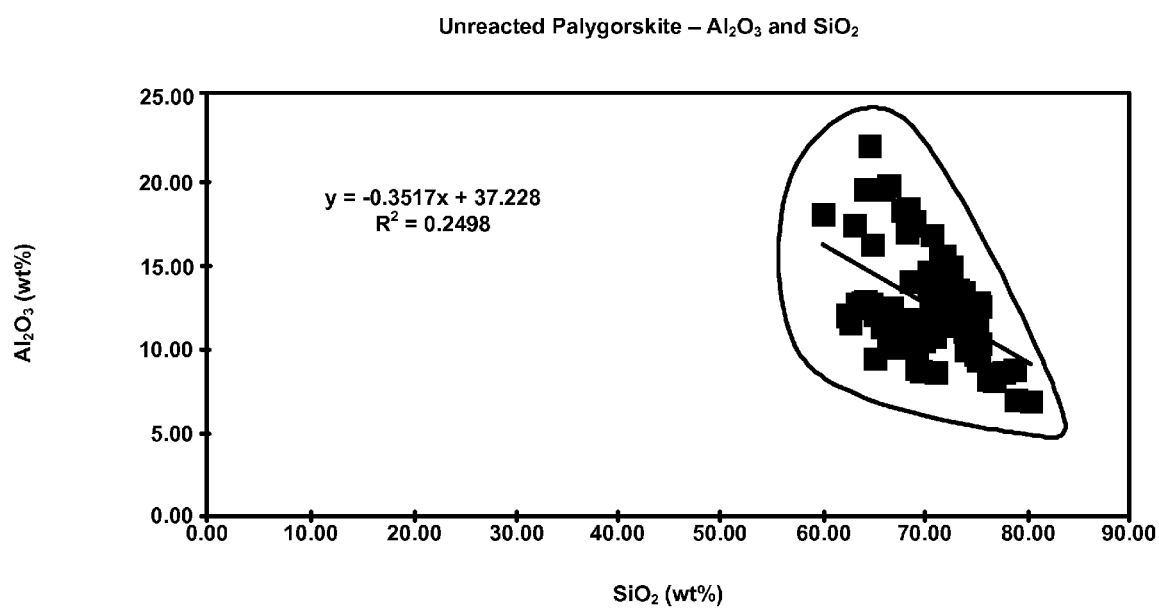
FIG. 23 shows an EDS compositions plot for $Al_2O_3$ and $SiO_2$.
Figure 24:
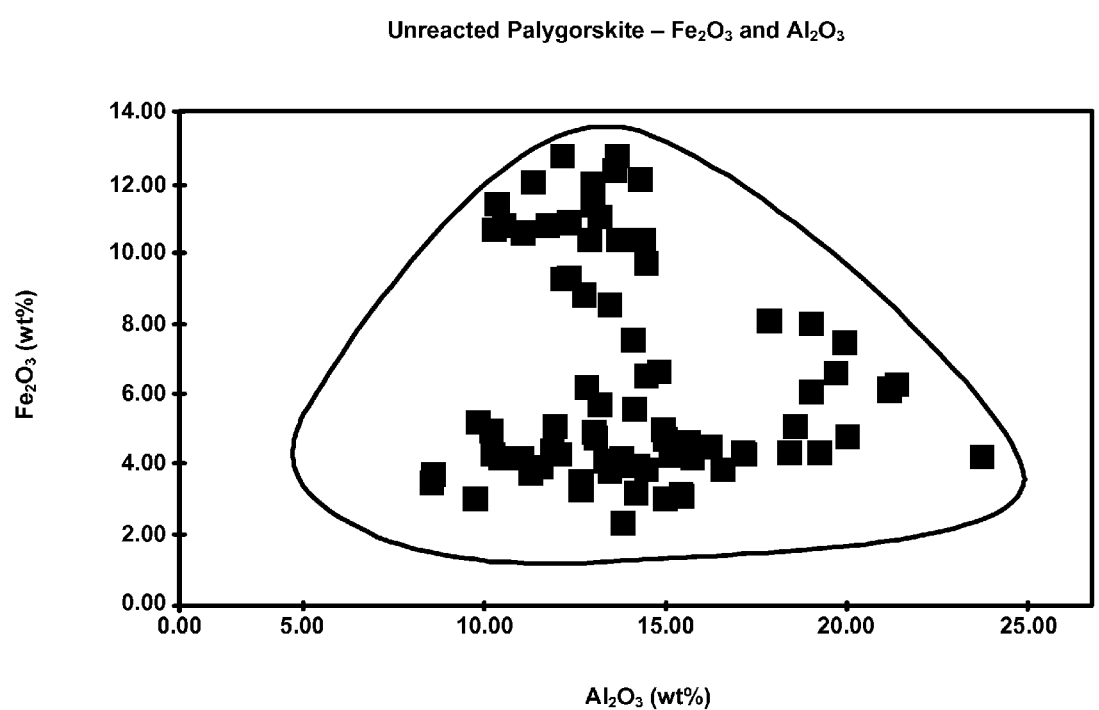
FIG. 24 shows an EDS compositions plot for $Fe_2O_3$ and $Al_2O_3$.
Figure 25:
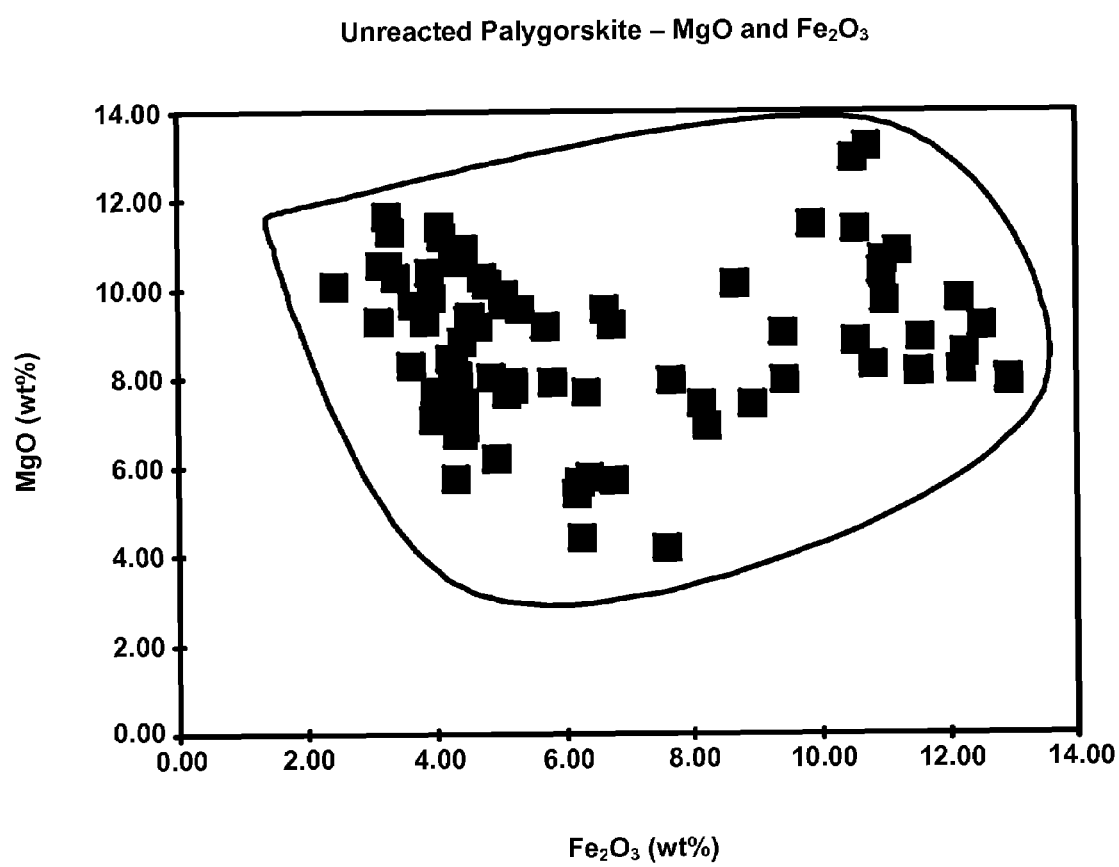
FIG. 25 shows an EDS compositions plot for MgO and $Fe_2O_3$.
Figure 26:
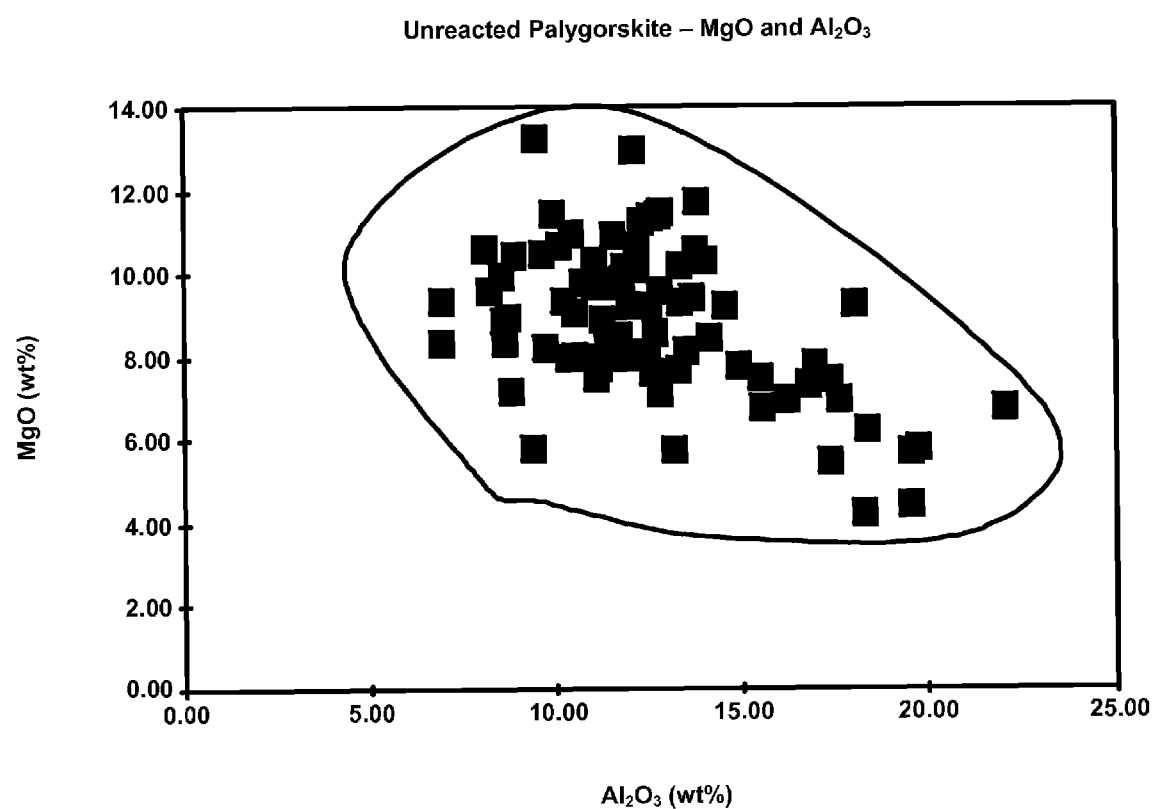
FIG. 26 shows an EDS compositions plot for MgO and $Al_2O_3$.

The following figures show plotted chemical compositions of individual, unreacted palygorskite particles. FIG. 23 shows a moderate linear relationship between Al$_2$O$_3$ and SiO$_2$. However, FIGS. 24, 25 and 26 show no linear trends. FIG. 24 plots Fe$_2$O$_3$ and Al$_2$O$_3$ in a broadly triangular in shape. FIG. 25 shows MgO and Fe$_2$O$_3$ in a weak relationship, as does FIG. 26, which compares MgO and Al$_2$O$_3$.

Figure 27:
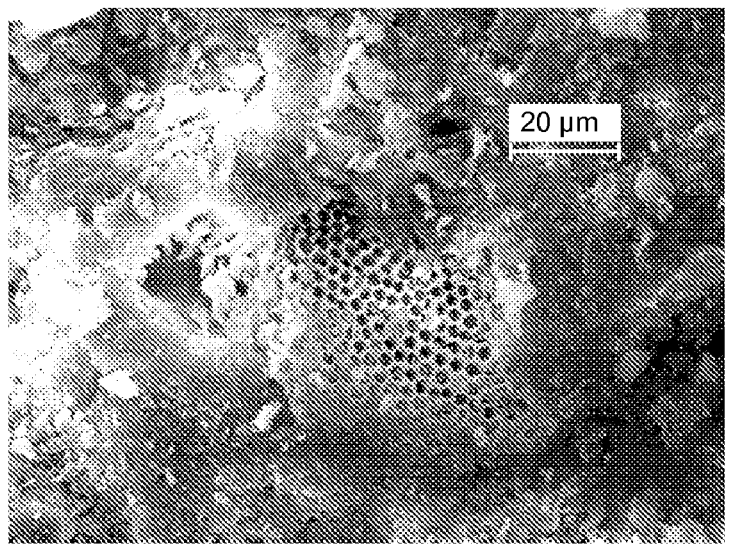
FIG. 27 shows an SEM image of palygorskite rich clay used as the sorption based media.

Illustrating images of unreacted palygorskite as the sorption based media, reference is made to FIGS. 27-30. FIG. 27 shows an SEM image of palygorskite rich clay used as an additional sorption media. The center portion of the image consists of a siliceous diatom fragment. Diatoms and similar microfossils are very common in the palygorskite-rich clay and add a minor amount to the overall sorption capacity.

Figure 28:
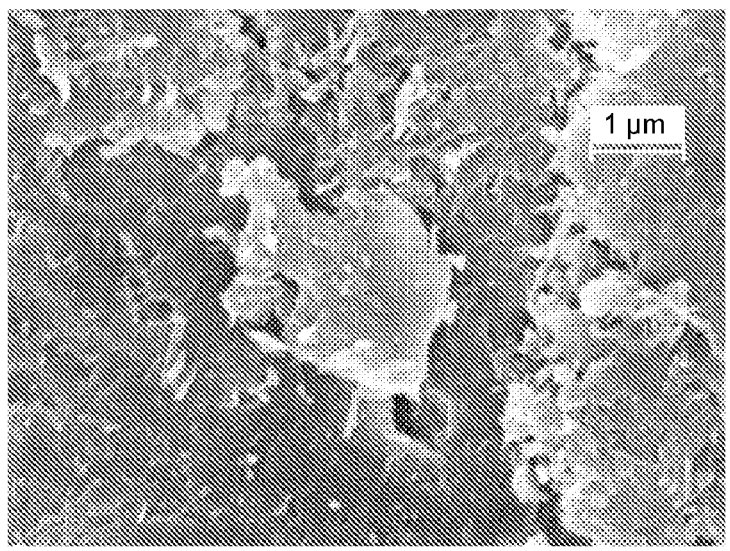
FIG. 28 shows another an SEM image of palygorskite rich clay as the sorption based media.

FIG. 28 shows an SEM image of palygorskite rich clay used as an additional sorption media. This image shows a platy mesoscale texture commonly observed in the palygorskite rich clay. Irregular shapes and clusters of fibers can be observed at the edge terminations of the platy particles. Minor pits and local micro topography of the samples can be seen in this image and the occurrence and distribution of these features adds to the reactive sorptive media.

Figure 29:
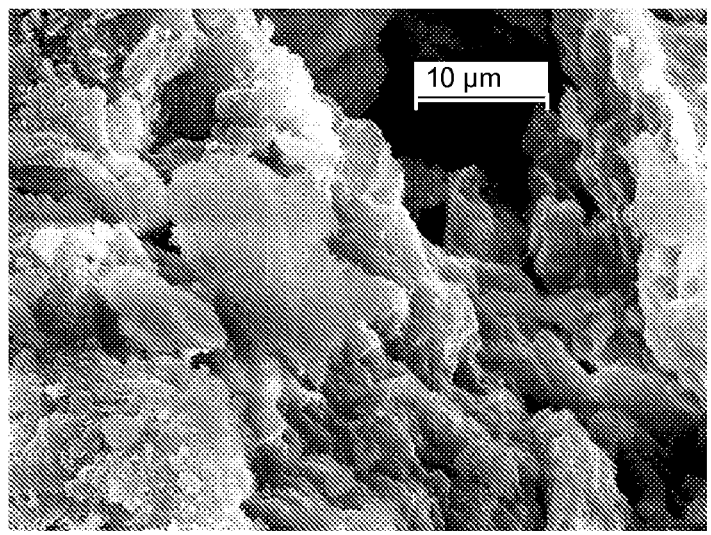
FIG. 29 shows an additional SEM image of palygorskite rich clay as the sorption based media.

FIG. 29 shows an additional SEM image of palygorskite rich clay used as an additional sorption media. This image shows a platy mesoscale texture commonly observed in the palygorskite rich clay. Platy regions of sample material vary in average diameter form ~0.5 µm to ~15 µm. Edge terminations at this magnification appear to be irregular. Clusters of fibers can be observed at the edge terminations of the platy particle in the center. Minor pits can be observed in the low left of the image. Local microtopography of the sample material is clearly evident in this image. The occurrence and distribution of these features adds to the reactive sorptive media.

Figure 30:
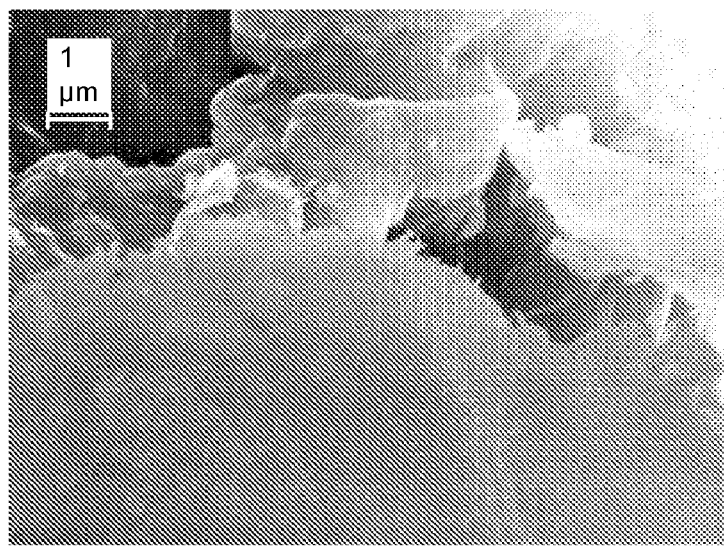
FIG. 30 shows an SEM image of the upper edge termination of the central platy particle.

FIG. 30 shows an SEM image of the upper edge termination of the central platy particle in the above image. Clusters of fibers protrude form the particle edge. The anastamosing or interlocking texture of palygorskite fibers is evident from a few examples in this image. Surface topography of particle is irregular and varied from particle to particle. Broad step like structures are observed in the fore ground and irregular "foil"-like textures are shown in the background.

Palygorskite is reported to have a solubility product constant of 22.43 (Jones B. F. and Galán E., 19 Rev. in Mins. 631-674 (1988)). This constant suggests that the mineral is functionally insoluble over periods of years. For example, calcite and aragonite have solubility product constants of approximately 8.2-8.3 (Langmuir D, Aqueous Environmental Geochemistry, 1997) and are thus orders of magnitude more soluble than palygorskite. The palygorskite media is generally robust under water conditions as expected in radiological contamination.

Palygorskite materials in the technology are broadly similar to those described by Krekeler et al., 53 Clays and Clay Mins. 94-101 (2005), Krekeler et al., 52 Clays and Clay Mins. 263-274 (2004), Krekeler 52 Clays and Clay Mins. 253-262 (2004) and Jones and Galán (1988). Palygorskite materials in the technology have somewhat less apatite, illite and oxide minerals.

2. Contact with Aqueous Slurry

Once a radioactive containment composition contacts a radioactive material to form an aqueous slurry, floccules may be present. Such floccules may be removed using the sorption based media as a filtering mechanism. By accumulating floccules, the sorption based media may separate the floccules from the liquid. Separation may occur as a mechanical process.

After the sorption based media contacts the aqueous slurry, a weight ratio of the sorption based media to aqueous slurry may range from 1:99 to 99:1.

The following RVM 420 experimental results have been generated when the sorption based media is contacted with aqueous slurry.

TABLE 19

Experimental Permeability Test Results

| M | $T_0$ (sec) | $T_1$ (sec) | $V_0$ (mL) | $V_1$ (mL) | Hght$_0$ (cm) | Hght$_1$ (cm) | Q | L | h0–h1 | h0/h1 | Log h0/h1 | K cm/s |
|---|---|---|---|---|---|---|---|---|---|---|---|---|
| 1 | 0 | 1683 | 20.0 | 29.0 | 54.5 | 52.6 | 9.0 | 7.9 | 1.9 | 1.0361 | 0.015411 | 0.000089910 |
| 2 | 0 | 1636 | 28.5 | 29.0 | 52.6 | 52.1 | 0.5 | 7.9 | 0.5 | 1.0096 | 0.004148 | 0.000000364 |
| 3 | 0 | 981.3 | 0.4 | 0.7 | 69.0 | 68.7 | 0.3 | 7.9 | 0.3 | 1.0044 | 0.001892 | 0.000000100 |
| 4 | 0 | 1892 | 37.0 | 39.2 | 47.6 | 46.8 | 2.2 | 7.9 | 0.8 | 1.0171 | 0.007361 | 0.000003931 |
| 5 | 0 | 58831 | 3.0 | 18.0 | 67.3 | 59.0 | 15.0 | 7.9 | 8.3 | 1.1407 | 0.057163 | 0.000069452 |

TABLE 19 shows RVM 420 experimental permeability test results. These results generally show how the palygorskite media slows down and accumulated floccules from a montmorillonite based aqueous slurry. The column height is 7.9 cm. The equation used is:

$$K = QL/13.76t(h0-h1) \times \log 10(h0/h1) \qquad (1).$$

M stands for the measurement number. $T_0$ stands for Time$_0$. $T_1$ stands for Time$_1$. Vol$_0$ stands for Volume$_0$. Vol$_1$ stands for Volume$_1$. Height$_0$ stands for Height$_0$. Hght$_1$ stands for Height$_1$.

TABLE 20

Summary of Experimental Permeability Test Results

| Average | 0.000032751 |
|---|---|
| Minimum | 0.000000100 |
| Maximum | 0.000089910 |
| Variance | 0.000000002 |
| Standard Deviation | 0.000043473 |

TABLE 20 shows a summary of the results of the RVM 420 experimental permeability tests.

The exemplified palygorskite-rich media may be used to accumulate floccules and additional cations in water or fluids with which the radionuclide containment composition having, for instance montmorillonite, interacts.

In one example, hydraulic conductivity experiments using mixed SrCl$_2$.6H$_2$O and CsCl reacted montmorillonite waste formed visible floccules with sizes of ~0.2-~2 mm in average diameter. These sizes indicate that permeability tends to decrease orders of magnitude. Permeability coefficients may vary from ~0.0000001 cm/s to ~0.000089 cm/s compared to the observed range of ~1.14 to ~4.29 cm/sec for unmodified palygorskite-rich media using water. This variation indicates that the floccules are most likely being captured by the palygorskite sorption based media. The reduction in permeability is most likely the result of floccules clogging pore throats.

TABLES 21 shows EDS chemical composition data (weight percent of oxides for each experimental run) for Sr reacted palygorskite fibers. The average, minimum, maximum, variance and standard deviation of the elements are presented in TABLE 22.

TABLE 21

EDS data for reacted Sr-palygorskite fibers

| Analysis | SiO$_2$ | Al$_2$O$_3$ | Fe$_2$O$_3$ | MgO | CaO | Na$_2$O | K$_2$O | SrO | Cl | Total |
|---|---|---|---|---|---|---|---|---|---|---|
| 1 | 63.08 | 15.89 | 5.30 | 5.90 | 0.47 | 0.06 | 0.17 | 8.88 | 0.25 | 100.00 |
| 2 | 58.92 | 14.41 | 4.03 | 10.44 | 0.00 | 0.90 | 0.22 | 7.90 | 0.18 | 97.00 |
| 3 | 62.90 | 16.23 | 4.73 | 7.45 | 0.00 | 0.62 | 0.27 | 7.56 | 0.24 | 100.00 |
| 4 | 66.30 | 13.49 | 3.85 | 7.95 | 0.17 | 0.14 | 0.30 | 7.57 | 0.23 | 100.00 |
| 5 | 63.66 | 15.39 | 5.44 | 5.83 | 0.36 | 0.02 | 0.37 | 8.58 | 0.34 | 99.99 |
| 6 | 61.08 | 15.50 | 4.53 | 9.48 | 0.00 | 0.65 | 0.17 | 8.48 | 0.12 | 100.01 |
| 7 | 65.89 | 6.82 | 4.09 | 10.77 | 0.02 | 0.51 | 0.46 | 9.61 | 1.84 | 100.01 |
| 8 | 58.81 | 10.58 | 3.85 | 11.81 | 0.52 | 0.89 | 0.06 | 10.86 | 2.62 | 100.00 |
| 9 | 60.49 | 19.45 | 4.64 | 7.75 | 0.00 | 0.53 | 0.20 | 6.79 | 0.16 | 100.01 |
| 10 | 60.51 | 18.60 | 4.29 | 7.76 | 0.05 | 0.60 | 0.33 | 7.57 | 0.29 | 100.00 |
| 11 | 59.39 | 17.63 | 4.47 | 8.85 | 0.71 | 0.34 | 0.28 | 8.21 | 0.14 | 100.02 |
| 12 | 63.12 | 12.48 | 3.68 | 13.21 | 0.05 | 0.59 | 0.00 | 6.84 | 0.03 | 100.00 |
| 13 | 61.85 | 17.32 | 4.20 | 8.63 | 0.16 | 0.48 | 0.16 | 7.06 | 0.15 | 100.01 |
| 14 | 61.57 | 17.43 | 4.16 | 8.54 | 0.08 | 0.79 | 0.24 | 6.98 | 0.22 | 100.01 |
| 15 | 61.52 | 16.94 | 4.89 | 7.67 | 0.00 | 0.56 | 0.43 | 7.83 | 0.17 | 100.01 |
| 16 | 64.50 | 7.03 | 3.09 | 10.58 | 0.00 | 0.41 | 0.55 | 11.44 | 2.38 | 99.98 |

TABLE 22

Summary of reacted Sr-exchanged palygorskite fibers EDS data

| | SiO$_2$ | Al$_2$O$_3$ | Fe$_2$O$_3$ | MgO | CaO | Na$_2$O | K$_2$O | SrO | Cl |
|---|---|---|---|---|---|---|---|---|---|
| Average | 61.94 | 15.21 | 4.41 | 8.80 | 0.17 | 0.51 | 0.24 | 8.05 | 0.47 |
| Minimum | 58.81 | 6.82 | 3.68 | 5.83 | 0.00 | 0.02 | 0.00 | 6.79 | 0.03 |
| Maximum | 66.30 | 19.45 | 5.44 | 13.21 | 0.71 | 0.90 | 0.46 | 10.86 | 2.62 |

TABLE 22-continued

Summary of reacted Sr-exchanged palygorskite fibers EDS data

|  | $SiO_2$ | $Al_2O_3$ | $Fe_2O_3$ | MgO | CaO | $Na_2O$ | $K_2O$ | SrO | Cl |
|---|---|---|---|---|---|---|---|---|---|
| Variance | 5.129 | 10.87 | 0.2703 | 4.21 | 0.05 | 0.074 | 0 | 1.247 | 0.54 |
| St. Dev | 2.265 | 3.297 | 0.5199 | 2.05 | 0.23 | 0.272 | 0.1 | 1.117 | 0.74 |

TABLES 23 shows EDS chemical composition data (weight percent of oxides for each experimental run) for Sr reacted palygorskite fibers with Sr chloride mineralization. The average, minimum, maximum, variance and standard deviation of the elements are presented in TABLE 24.

TABLE 23

EDS data for Sr-exchanged palygorskite fibers with Sr chloride mineralization

| Analysis | $SiO_2$ | $Al_2O_3$ | $Fe_2O_3$ | MgO | CaO | $Na_2O$ | $K_2O$ | SrO | Cl |
|---|---|---|---|---|---|---|---|---|---|
| 1 | 46.38 | 7.46 | 3.62 | 7.92 | 0.12 | 0.46 | 0.2 | 27.34 | 6.51 |
| 2 | 41.72 | 6.84 | 2.95 | 5.62 | 0.39 | 0 | 0 | 34.85 | 7.64 |
| 3 | 38.9 | 7.72 | 2.28 | 5.67 | 0.04 | 0 | 0.2 | 38.04 | 7.14 |
| 4 | 46.08 | 3.38 | 1.99 | 9.13 | 0 | 0 | 0.2 | 32.22 | 7.02 |
| 5 | 60.44 | 8.23 | 3.31 | 8.59 | 0.21 | 0.58 | 0 | 15.72 | 2.92 |
| 6 | 37.34 | 5.96 | 2.57 | 6.1 | 0.06 | 0 | 0.1 | 41.49 | 6.35 |
| 7 | 44.13 | 5.4 | 3.63 | 7.09 | 0.35 | 0 | 0 | 31.05 | 8.32 |

TABLE 24

Summary of EDS data for Sr-exchanged palygorskite fibers with Sr chloride mineralization

|  | $SiO_2$ | $Al_2O_3$ | $Fe_2O_3$ | MgO | CaO | $Na_2O$ | $K_2O$ | SrO | Cl |
|---|---|---|---|---|---|---|---|---|---|
| Average | 44.77 | 6.255 | 2.7883 | 7.03 | 0.18 | 0.097 | 0.1 | 32.23 | 6.57 |
| Minimum | 37.34 | 3.38 | 1.99 | 5.62 | 0 | 0 | 0 | 15.72 | 2.92 |
| Maximum | 60.44 | 8.23 | 3.63 | 9.13 | 0.39 | 0.58 | 0.2 | 41.49 | 8.32 |
| Variance | 69.33 | 3.095 | 0.39 | 2.31 | 0.03 | 0.056 | 0 | 80.07 | 3.62 |
| St. Dev | 8.326 | 1.759 | 0.6245 | 1.52 | 0.17 | 0.237 | 0.1 | 8.948 | 1.9 |

Figure 31:
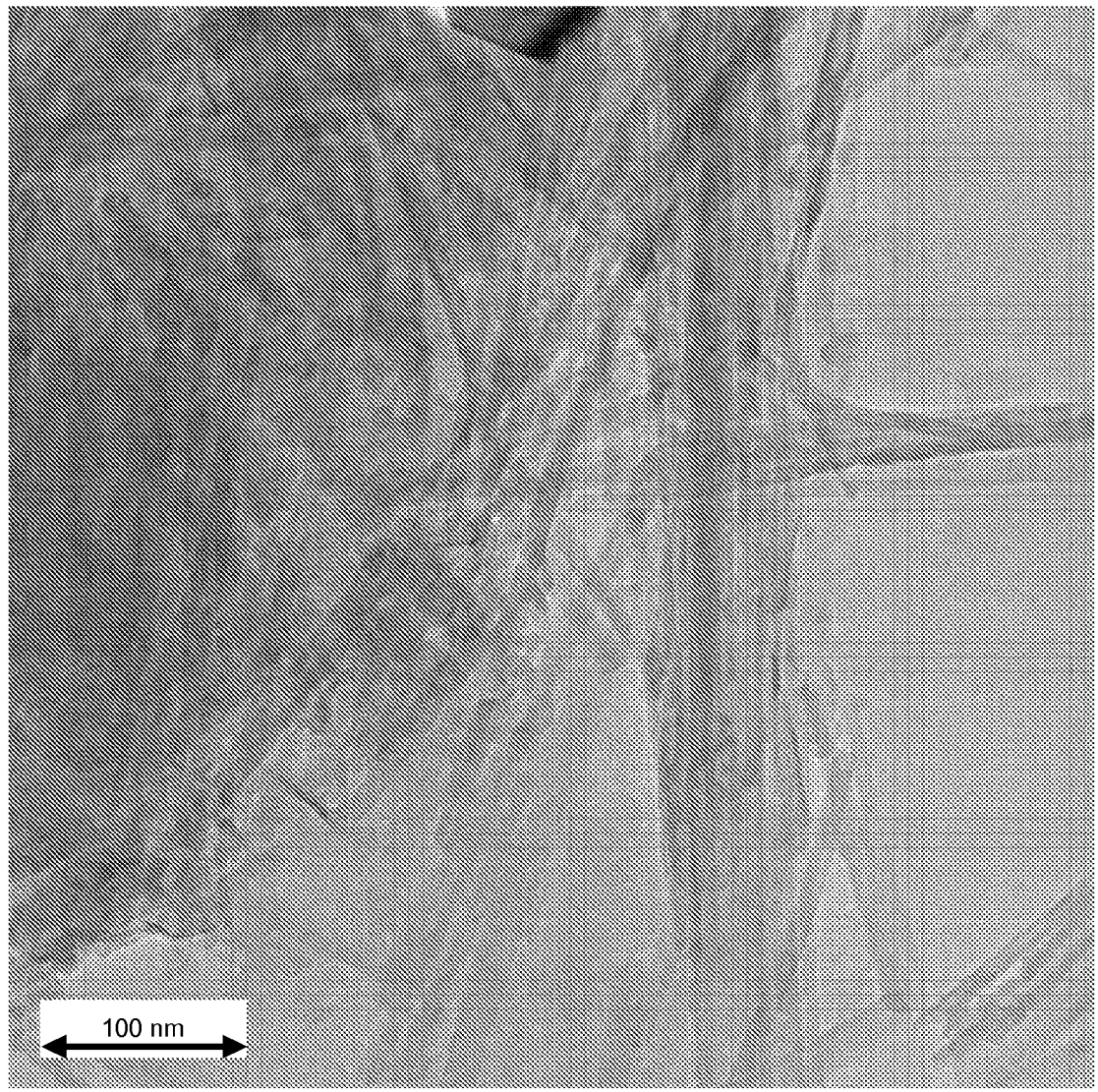
FIG. 31 shows a TEM image of a strontium chloride reacted sample showing interlocking palygorskite fibers.

Illustrating Sr-exchange with the sorption based media, FIG. 31 shows a TEM image of a strontium chloride reacted sample showing interlocking palygorskite fibers. Fiber edges are straight and show no indication of dissolution. Widths are ~15 nm to ~40 nm.

TABLES 25 shows EDS chemical composition data (weight percent of oxides for each experimental run) for Cs reacted palygorskite fibers. The average, minimum, maximum, variance and standard deviation of the elements are presented in TABLE 26.

TABLE 25

EDS data for Cs-exchanged palygorskite fibers

| Analysis | $SiO_2$ | $Al_2O_3$ | $Fe_2O_3$ | MgO | CaO | $Na_2O$ | $K_2O$ | $Cs_2O$ | Total |
|---|---|---|---|---|---|---|---|---|---|
| 1 | 64.49 | 10.09 | 5.66 | 8.98 | 2.58 | 0.00 | 0.16 | 7.86 | 100.02 |
| 2 | 64.42 | 8.66 | 6.75 | 10.60 | 0.40 | 0.00 | 0.09 | 9.07 | 99.99 |
| 3 | 64.93 | 9.19 | 6.38 | 9.05 | 2.36 | 0.22 | 0.10 | 7.77 | 100.00 |
| 4 | 64.44 | 10.77 | 6.51 | 9.27 | 2.75 | 0.00 | 0.15 | 6.11 | 100.00 |
| 5 | 64.11 | 13.67 | 6.38 | 7.06 | 0.13 | 0.00 | 0.24 | 8.40 | 99.99 |
| 6 | 67.27 | 12.53 | 6.92 | 6.07 | 0.08 | 0.00 | 0.10 | 7.02 | 99.99 |
| 7 | 56.11 | 17.52 | 6.46 | 6.99 | 0.95 | 2.58 | 1.05 | 8.34 | 100.00 |
| 8 | 59.08 | 16.09 | 7.36 | 6.92 | 0.90 | 0.24 | 1.20 | 8.20 | 99.99 |
| 9 | 60.67 | 13.89 | 8.98 | 7.39 | 0.18 | 0.02 | 1.90 | 6.97 | 100.00 |
| 10 | 57.18 | 15.35 | 8.07 | 9.36 | 0.11 | 2.29 | 1.48 | 6.16 | 100.00 |
| 11 | 60.70 | 13.84 | 9.08 | 7.67 | 0.16 | 0.16 | 1.82 | 6.57 | 100.00 |
| 12 | 60.23 | 15.91 | 8.89 | 7.56 | 0.09 | 0.00 | 1.80 | 5.52 | 100.00 |
| 13 | 54.22 | 14.48 | 10.04 | 6.99 | 4.39 | 0.23 | 2.72 | 6.93 | 100.00 |
| 14 | 54.82 | 16.34 | 10.71 | 7.31 | 0.25 | 0.28 | 3.30 | 7.00 | 100.01 |
| 15 | 64.69 | 15.50 | 4.75 | 5.61 | 0.16 | 0.42 | 0.27 | 8.59 | 99.99 |

TABLE 25-continued

EDS data for Cs-exchanged palygorskite fibers

| Analysis | SiO$_2$ | Al$_2$O$_3$ | Fe$_2$O$_3$ | MgO | CaO | Na$_2$O | K$_2$O | Cs$_2$O | Total |
|---|---|---|---|---|---|---|---|---|---|
| 16 | 66.85 | 13.11 | 4.68 | 5.46 | 0.00 | 0.50 | 0.32 | 9.07 | 99.99 |
| 17 | 64.25 | 15.33 | 5.32 | 5.12 | 0.14 | 0.00 | 0.35 | 9.49 | 100.00 |
| 18 | 66.32 | 15.85 | 4.46 | 4.40 | 0.09 | 0.00 | 0.00 | 8.88 | 100.00 |
| 19 | 66.74 | 12.07 | 5.61 | 5.93 | 0.10 | 0.31 | 0.41 | 8.82 | 99.99 |
| 20 | 67.07 | 12.80 | 5.23 | 6.02 | 0.05 | 0.16 | 0.10 | 8.57 | 100.00 |
| 21 | 66.04 | 13.49 | 5.29 | 5.42 | 1.99 | 0.01 | 0.17 | 7.59 | 100.00 |
| 22 | 67.22 | 14.50 | 4.45 | 5.41 | 0.88 | 0.05 | 0.18 | 7.30 | 99.99 |
| 23 | 66.32 | 16.09 | 4.32 | 6.84 | 0.20 | 0.42 | 0.02 | 5.78 | 99.99 |
| 24 | 65.64 | 15.66 | 5.00 | 5.10 | 0.11 | 0.17 | 0.41 | 7.89 | 99.98 |
| 25 | 66.06 | 15.09 | 4.84 | 4.87 | 0.02 | 0.08 | 0.30 | 8.73 | 99.99 |
| 26 | 63.74 | 18.29 | 4.79 | 3.92 | 0.10 | 0.24 | 1.28 | 7.64 | 100.00 |
| 27 | 62.68 | 18.21 | 4.74 | 3.90 | 0.17 | 0.32 | 1.27 | 8.71 | 100.00 |
| 28 | 61.24 | 19.24 | 4.63 | 4.75 | 0.07 | 0.00 | 0.92 | 9.16 | 100.01 |
| 29 | 63.69 | 15.24 | 4.81 | 5.41 | 0.96 | 0.00 | 0.84 | 9.05 | 100.00 |
| 30 | 65.07 | 14.58 | 4.66 | 5.54 | 1.18 | 0.00 | 0.69 | 8.28 | 100.00 |
| 31 | 62.70 | 18.77 | 4.97 | 4.05 | 0.00 | 0.00 | 1.00 | 8.51 | 100.00 |
| 32 | 62.62 | 19.68 | 4.80 | 4.46 | 0.00 | 0.43 | 1.66 | 6.35 | 100.00 |
| 33 | 66.34 | 11.33 | 5.45 | 8.22 | 0.11 | 0.44 | 0.35 | 7.75 | 99.99 |
| 34 | 65.54 | 13.41 | 5.66 | 8.27 | 0.00 | 0.16 | 0.35 | 6.61 | 100.00 |
| 35 | 63.93 | 10.26 | 5.86 | 9.11 | 1.66 | 1.26 | 0.27 | 7.66 | 100.01 |
| 36 | 63.43 | 11.86 | 6.03 | 8.52 | 1.47 | 0.29 | 0.41 | 7.99 | 100.00 |
| 37 | 63.57 | 14.49 | 5.61 | 7.53 | 1.48 | 0.56 | 0.50 | 6.26 | 100.00 |
| 38 | 64.43 | 17.38 | 5.77 | 6.43 | 0.71 | 0.48 | 0.73 | 4.07 | 100.00 |
| 38 | 65.92 | 14.16 | 5.75 | 6.83 | 0.71 | 0.00 | 0.51 | 6.11 | 99.99 |
| 40 | 63.64 | 13.53 | 6.81 | 9.29 | 0.81 | 0.31 | 0.18 | 5.44 | 100.01 |

TABLE 26

Summary of EDS data for Cs-exchanged palygorskite fibers

| | SiO$_2$ | Al$_2$O$_3$ | Fe$_2$O$_3$ | MgO | CaO | Na$_2$O | K$_2$O | Cs$_2$O |
|---|---|---|---|---|---|---|---|---|
| Average | 63.41 | 14.72 | 6.05 | 6.53 | 0.67 | 0.33 | 0.77 | 7.51 |
| Minimum | 54.22 | 9.19 | 4.32 | 3.90 | 0.00 | 0.00 | 0.00 | 4.07 |
| Maximum | 67.27 | 19.68 | 10.71 | 9.36 | 4.39 | 2.58 | 3.30 | 9.49 |
| Variance | 11.6749 | 6.0692 | 2.6977 | 2.6472 | 0.8956 | 0.3136 | 0.5948 | 1.5931 |
| St. Dev. | 3.41686 | 2.4636 | 1.6425 | 1.627 | 0.9463 | 0.56 | 0.7712 | 1.2622 |

Figure 32:
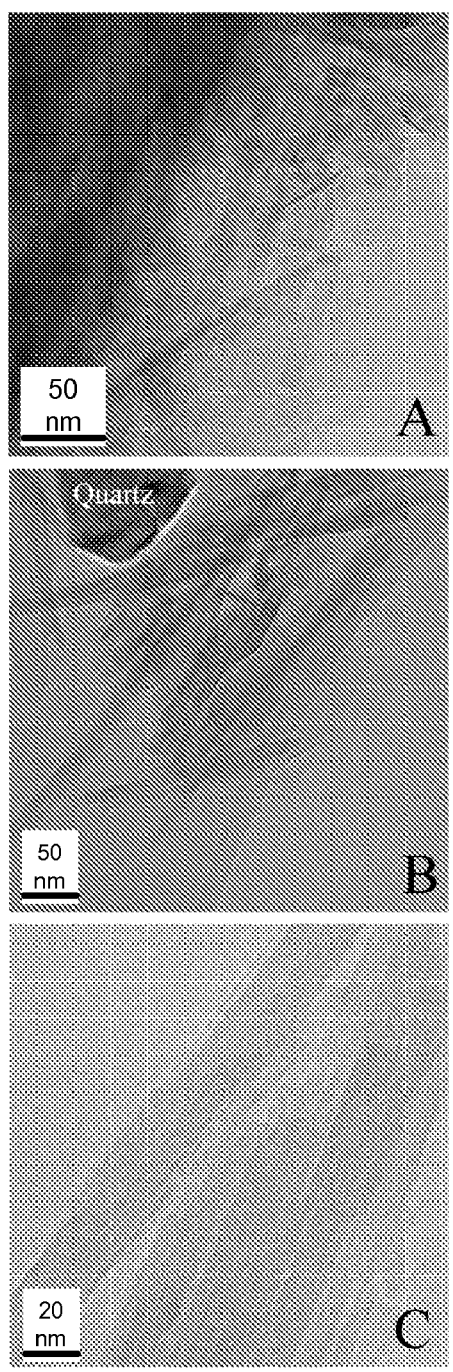
FIG. 32 shows TEM images of Cs-exchange with the sorption based media.

FIG. 32 illustrates TEM images of Cs-exchange with the sorption based media. A shows a TEM image showing palygorskite fibers that have been reacted with CsCl. Fibers are ~10 nm to ~25 nm in width. B shows a TEM image where palygorskite fibers have been reacted with CsCl. It may be noted that this images shows grain of quartz impurity. Fibers are commonly ~20-~50 nm in width. C shows a TEM image with aggregates of palygorskite fibers having been reacted with CsCl. Terminations of fibers are commonly straight. The larger fiber is approximately 100 nm in width. It appears that the fibers are not corroded and are essentially the same texture as unreacted fibers.

Figure 33:
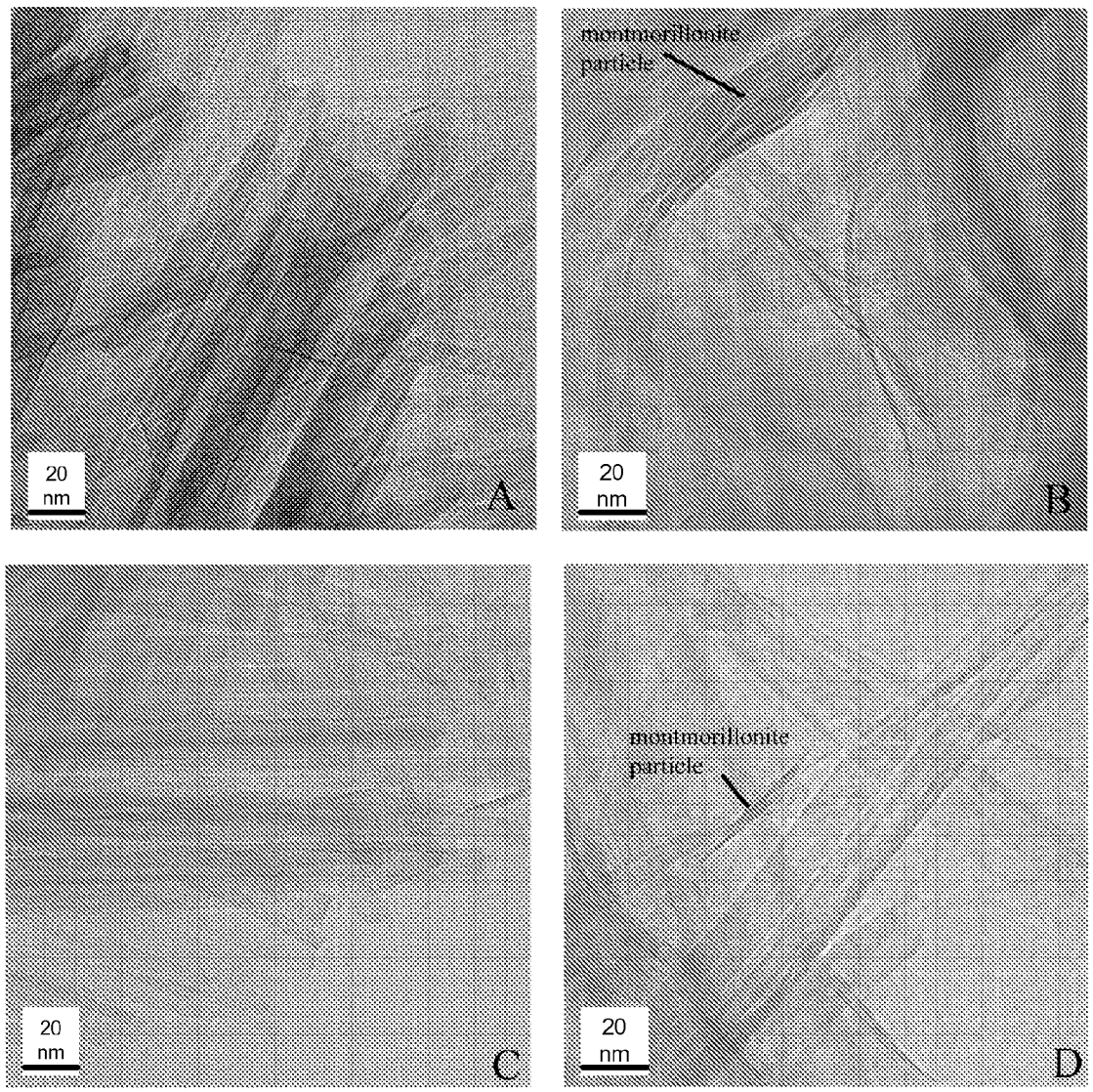
FIG. 33 shows TEM images of a mixture of the sorption based media and radioactive containment composition.
Figure 34:
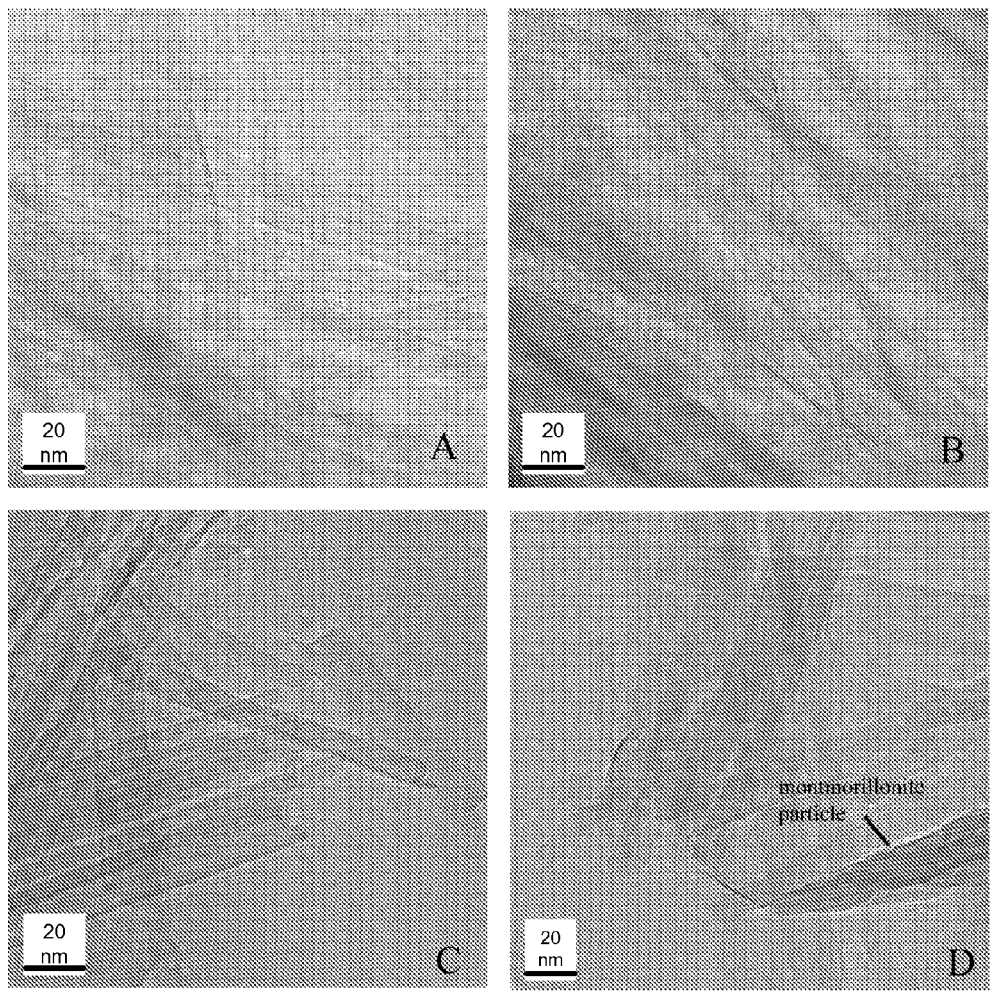
FIG. 34 shows additional TEM images of a mixture of the sorption based media and radioactive containment composition.

In addition to these data and figures, the mixture of the sorption based media and radioactive containment composition can be seen in FIGS. 33 and 34. Each of these figures identify the differences in fiber size for the sorption based media and radioactive containment composition. As an example, the sorption based media is palygorskite and the radioactive containment composition involves montmorillonite.

Referring to FIG. 33, A shows a TEM image from a grain mount with palygorskite fibers having widths ranging from ~10 nm to ~60 nm. Particles are inter-grown and form aggregates similar to those described in Krekeler et al. 2005. B shows a TEM image with a mixture of montmorillonite and palygorskite fibers. Montmorillonite occurs in the palygorskite source materials. Palygorskite fibers are ~8 nm to ~25 nm in width. The montmorillonite particle is ~25 nm thick and ~150 nm in length. C shows a TEM image with palygorskite fibers varying in width from ~9 nm to ~30 nm. It appears that there are straight and irregular terminations of the fibers along [100]. D shows a TEM image with palygorskite fibers that are ~5 nm to ~32 nm in width. A small montmorillonite particle is labeled and is ~3 nm thick and ~40 nm in length.

Similarly, referring to FIG. 34, A shows a TEM image of a grain mount showing palygorskite fibers with widths from ~15 nm to ~30 nm. B shows a TEM image showing a mixture of palygorskite fibers ranging from ~20 nm to ~30 nm in width. C shows a TEM image with palygorskite fibers varying in width from ~10 nm to ~70 nm. It appears that there are straight and irregular terminations of the fibers along [100]. D shows a TEM image with palygorskite fibers that are ~12 nm to ~40 nm in width. A small montmorillonite particle is labeled and is ~30 nm thick and ~100+ nm in length.

E. Relevance of pH Values

The pH values of solutions and suspensions are critical data for understanding the mechanisms of the chemistry of the solutions and suspensions. The range of pH values observed in the reacted material serves as a function of the degree of reaction that has taken place. Below are described pH data from bulk experiments.

For example, $NO_3^-$ from a 0.05 N $AgNO_3$ solution is not precipitated in any phase and is ambient in the solution. Accordingly, $NO_3^-$ equilibrates to $HNO_3$, giving rise to more acid conditions in reacted supernatant fluids.

1. Montmorillonite Suspensions pH Analyses

As shown in TABLE 27, the following pH values were obtained for the montmorillonite used in the experiments. The montmorillonite here has not yet been applied to a chloride containing substance or treated with $AgNO_3$ (aq).

TABLE 27 pH Values of Montmorillonite Suspensions

| Analysis # | pH | mV | Temperature (° C.) |
|---|---|---|---|
| 1 | 9.15 | −141.8 | 18.6 |
| 2 | 9.13 | −140.1 | 18.1 |
| 3 | 9.19 | −143.9 | 18.7 |
| 4 | 8.59 | −108.5 | 18.6 |
| 5 | 9.10 | −139.4 | 18.5 |
| 6 | 9.25 | −147.6 | 18.4 |
| 7 | 9.26 | −148.3 | 18.7 |
| 8 | 9.29 | −150.4 | 18.5 |
| 9 | 9.30 | −151.9 | 18.6 |
| 10 | 9.33 | −152.7 | 18.5 |
| 11 | 9.21 | −145.9 | 18.4 |
| 12 | 9.30 | −150.7 | 18.8 |

2. pH of Na-Montmorillonite

In addition to the data above, the pH of Na-montmorillonite was measured in forty other different analyses. The pH values of several preparations of the aqueous clay suspension 115 were measured directly using an accumet XL 15 pH meter. Each measurement took between 10 and 20 minutes to stabilize. The pH value gradually would climb from approximately 7 to final numbers obtained. A stable value was considered to be one that did not fluctuate for 3 minutes. Three measurements were made for each analysis. For each weight percent solid determination, the product was placed in aluminum dishes and heated at 120° C. for a minimum of 24 hours. The pH values varied from 8.60 to 9.42 with 9.21 being the average. The standard deviation is 0.19. Weight percent solids varied from 2.60 to 13.99 with 5.33 being the average. The standard deviation is 4.28. The data is shown in TABLES 28-29.

Although the pH is elevated with respect to environmental waters, it is still comparatively low compared to many bases, and therefore is safe for building materials to which it would be applied. The pH range is also acceptable for short term human exposure.

TABLE 28 pH and mV of Na-montmorillonite

| | pH | | | | mV | | |
|---|---|---|---|---|---|---|---|
| Analysis | Trial 1 | Trial 2 | Trial 3 | Average | Trial 1 | Trial 2 | Trial 3 |
| 1 | 9.24 | 9.35 | 9.34 | 9.31 | −146.1 | −151.3 | −151.3 |
| 2 | 9.31 | 9.25 | 9.29 | 9.28 | −149.3 | −146.4 | −148.6 |
| 3 | 9.31 | 9.34 | 9.34 | 9.33 | −150.0 | −151.2 | −151.1 |
| 4 | 9.35 | 9.33 | 9.33 | 9.34 | −151.4 | −150.1 | −150.5 |
| 5 | 9.40 | 9.39 | 9.39 | 9.39 | −154.9 | −154.2 | −153.6 |
| 6 | 9.42 | 9.36 | 9.36 | 9.38 | −156.5 | −152.5 | −152.9 |
| 7 | 9.37 | 9.34 | 9.34 | 9.35 | −152.7 | −151.6 | −150.8 |

TABLE 28-continued pH and mV of Na-montmorillonite

| | pH | | | | mV | | |
|---|---|---|---|---|---|---|---|
| Analysis | Trial 1 | Trial 2 | Trial 3 | Average | Trial 1 | Trial 2 | Trial 3 |
| 8 | 9.32 | 9.29 | 9.28 | 9.30 | −149.9 | −148.5 | −147.9 |
| 9 | 9.38 | 9.35 | 9.31 | 9.35 | −154.0 | −152.2 | −149.9 |
| 10 | 9.35 | 9.34 | 9.29 | 9.33 | −151.8 | −151.7 | −148.5 |
| 11 | 9.31 | 9.26 | 9.28 | 9.28 | −149.4 | −146.5 | −147.9 |
| 12 | 8.69 | 8.77 | 8.81 | 8.76 | −113.5 | −118.1 | −120.1 |
| 13 | 9.04 | 9.05 | 9.07 | 9.05 | −133.8 | −134.3 | −135.6 |
| 14 | 9.20 | 9.15 | 9.15 | 9.17 | −143.3 | −140.4 | −140.4 |
| 15 | 9.17 | 9.12 | 9.12 | 9.14 | −141.9 | −138.8 | −138.6 |
| 16 | 9.15 | 9.13 | 9.11 | 9.13 | −140.1 | −139.0 | −137.8 |
| 17 | 9.21 | 9.19 | 9.19 | 9.20 | −143.9 | −142.7 | −142.6 |
| 18 | 8.61 | 8.88 | 8.84 | 8.78 | −108.6 | −124.6 | −122.6 |
| 19 | 9.12 | 9.07 | 9.12 | 9.10 | −139.4 | −135.8 | −139.2 |
| 20 | 9.27 | 9.22 | 9.23 | 9.24 | −147.6 | −145.0 | −145.8 |
| 21 | 9.28 | 9.31 | 9.31 | 9.30 | −148.2 | −150.2 | −150.1 |
| 22 | 9.31 | 9.30 | 9.30 | 9.30 | −150.4 | −149.4 | −149.4 |
| 23 | 9.32 | 9.32 | 9.30 | 9.31 | −150.9 | −151.0 | −149.8 |
| 24 | 9.35 | 9.36 | 9.31 | 9.34 | −152.7 | −153.4 | −150.4 |
| 25 | 9.23 | 9.25 | 9.32 | 9.27 | −145.9 | −146.8 | −150.9 |
| 26 | 9.32 | 9.31 | 9.29 | 9.31 | −150.7 | −150.2 | −149.4 |
| 27 | 8.60 | 8.80 | 8.67 | 8.69 | −108.4 | −120.4 | −112.2 |
| 28 | 9.08 | 9.08 | 9.15 | 9.10 | −136.5 | −136.8 | −141.2 |
| 29 | 9.09 | 9.05 | 9.02 | 9.05 | −137.3 | −134.9 | −133.3 |
| 30 | 9.20 | 9.19 | 9.20 | 9.20 | −143.7 | −143.3 | −143.6 |
| 31 | 9.32 | 9.34 | 9.32 | 9.33 | −151.2 | −152.4 | −151.1 |
| 32 | 9.42 | 9.40 | 9.38 | 9.40 | −157.2 | −156.6 | −154.8 |
| 33 | 9.31 | 9.34 | 9.14 | 9.26 | −151.1 | −153.2 | −141.9 |
| 34 | 9.33 | 9.39 | 9.36 | 9.36 | −153.3 | −156.9 | −154.9 |
| 35 | 9.23 | 9.27 | 9.30 | 9.27 | −147.2 | −149.5 | −151.5 |
| 36 | 9.37 | 9.39 | 9.41 | 9.39 | −155.4 | −156.8 | −158.0 |
| 37 | 9.40 | 9.44 | 9.44 | 9.43 | −157.7 | −159.6 | −159.6 |
| 38 | 8.87 | 8.89 | 8.90 | 8.89 | −126.1 | −126.1 | −127.6 |
| 39 | 8.90 | 8.92 | 8.96 | 8.93 | −127.7 | −127.7 | −130.4 |
| 40 | 8.93 | 8.93 | 8.95 | 8.94 | −128.7 | −128.7 | −130.1 |
| Average | 9.20 | 9.21 | 9.21 | 9.21 | −144.0 | −144.5 | −144.1 |
| Maximum | 9.42 | 9.44 | 9.44 | 9.43 | −108.4 | −118.1 | −112.2 |
| Minimum | 8.60 | 8.77 | 8.67 | 8.69 | −157.7 | −159.6 | −159.6 |
| Std. Dev. | | 0.191 | | | | | |

TABLE 29

Temp (° C.) and Weight % Solid of Na-montmorillonite for the Respective pH and mV Values in Table 12

| | Temp (C.) | | | |
|---|---|---|---|---|
| Analysis | Trial 1 | Trial 2 | Trial 3 | % solid |
| 1 | 18.0 | 15.9 | 17.1 | 2.94 |
| 2 | 17.1 | 17.3 | 17.3 | 2.89 |
| 3 | 17.2 | 17.1 | 16.4 | 3.00 |
| 4 | 16.3 | 15.5 | 16.9 | 2.97 |
| 5 | 17.2 | 17.2 | 17.1 | 2.98 |
| 6 | 17.6 | 17.5 | 17.3 | 2.96 |
| 7 | 16.7 | 17.2 | 16.3 | 2.94 |
| 8 | 17.1 | 16.8 | 17.2 | 2.95 |
| 9 | 17.8 | 17.4 | 17.6 | 3.01 |
| 10 | 17.3 | 17.6 | 17.1 | 3.05 |
| 11 | 17.0 | 16.9 | 17.2 | 2.99 |
| 12 | 18.2 | 17.8 | 17.0 | 2.87 |
| 13 | 17.7 | 17.4 | 17.8 | 2.98 |
| 14 | 17.9 | 18.0 | 18.1 | 2.99 |
| 15 | 18.0 | 17.9 | 18.0 | 3.04 |
| 16 | 17.1 | 17.2 | 17.6 | 3.09 |
| 17 | 17.5 | 17.5 | 17.5 | 2.77 |
| 18 | 18.9 | 18.7 | 18.8 | 2.60 |
| 19 | 18.6 | 18.6 | 18.7 | 2.67 |
| 20 | 18.4 | 18.5 | 18.6 | 2.68 |
| 21 | 18.2 | 18.6 | 18.6 | 2.77 |

TABLE 29-continued

Temp (° C.) and Weight % Solid of Na-montmorillonite for the Respective pH and mV Values in Table 12

| Analysis | Trial 1 | Trial 2 | Trial 3 | % solid |
|---|---|---|---|---|
| 22 | 18.1 | 18.1 | 17.9 | 2.72 |
| 23 | 18.4 | 18.4 | 18.5 | 2.69 |
| 24 | 18.7 | 18.5 | 18.6 | 2.73 |
| 25 | 18.7 | 18.4 | 19.0 | 2.72 |
| 26 | 18.6 | 18.8 | 18.6 | 2.75 |
| 27 | 18.9 | 18.7 | 18.8 | 2.92 |
| 28 | 18.5 | 18.5 | 18.8 | 3.08 |
| 29 | 18.8 | 18.8 | 19.0 | 3.00 |
| 30 | 18.5 | 18.6 | 18.6 | 3.10 |
| 31 | 19.4 | 19.4 | 19.4 | 12.32 |
| 32 | 19.8 | 19.8 | 19.7 | 11.70 |
| 33 | 20.1 | 20.6 | 20.6 | 13.38 |
| 34 | 21.8 | 21.6 | 21.6 | 10.90 |
| 35 | 21.7 | 21.5 | 21.5 | 12.76 |
| 36 | 21.3 | 21.5 | 21.5 | 13.08 |
| 37 | 21.6 | 21.6 | 21.7 | 13.99 |
| 38 | 20.7 | 20.7 | 20.7 | 12.43 |
| 39 | 20.4 | 20.4 | 20.4 | 13.04 |
| 40 | 20.7 | 20.4 | 20.4 | 12.62 |
| Average | | | | 5.33 |
| Maximum | | | | 13.99 |
| Minimum | | | | 2.60 |
| Std. Dev. | | | | 4.288 |

3. $AgNO_3$ Solution Experiment

In this set of experiments, pH values were obtained for the 0.05 N $AgNO_3$ solution. The observed pH values varied from about 3.22 to about 4.6. As shown in TABLE 30, these values tend to range low because the base pair for $Ag^+$, AgOH is much weaker than the acid $HNO_3$. The 4.6 reading was obtained after the solution may be a result of allowing the solution to sit overnight, equilibrate with atmospheric $CO_2$, and/or be a product from light. However, this higher value indicates how the solution can intrinsically behave in open air.

TABLE 30

Representative pH Values of 0.05 N $AgNO_3$ Solution Used in Experiments

| Analysis # | pH | mV | Temperature (° C.) |
|---|---|---|---|
| 1 | 3.22 | 199.5 | 23 |
| 2 | 3.28 | 197.2 | 23 |
| 3 | 4.6 | 156.6 | 18 |
| 4 | 3.55 | 185.0 | 21 |
| 5 | 3.25 | 198.5 | 22 |

4. Chloride Powders Experiment

In this set of experiments, chloride powders (i.e., CsCl, $SrCl_2.6H_2O$ and $BaCl_2$) were reacted with the montmorillonite technology and were then mixed with variable amounts of 0.05 N $AgNO_3$ solution. The $AgNO_3$ solution had approximately between 150 ml and 10 ml per 0.014 mol cation equivalent.

Specifically, 2.5 g of equivalent Cs cation, 3.082 g of equivalent Ba cation and 3.944 g of equivalent Sr cation were used. Each of these piles was sprayed 20 times with a slurry of Na-montmorillonite. Thereafter, each pile was removed and placed into a beaker. The beaker was then filled with more Na-montmorillonite slurry until there was 100 ml of combined substance. Approximately 50 ml of de-ionized water may be added to each beaker to aid dissolution of each respective salt. An additional 50 ml was added to each beaker for a total of 200 ml of mixture. To these mixtures, a volume of 10 ml, 50 ml, 100 ml, and 150 ml of 0.05 N $AgNO_3$.

The pH data from replicate measurements from the resulting mixtures ranged from about 6.76 to 7.61, as shown in TABLE 31. This range indicates that the waste is not corrosive and could be stored in a variety of containers. Examples of containers include, but are not limited to, stainless steel, plastic lined drums, metal drums, or other storage tanks made of polymers, metals or a combination of materials.

TABLE 31 pH values of Mixed Waste

| Analysis # | pH | mV | Temperature (° C.) |
|---|---|---|---|
| 1 | 6.76 | -3.5 | 23.5 |
| 2 | 6.97 | -7.8 | 23.6 |
| 3 | 7.14 | -17.5 | 23.6 |
| 4 | 7.10 | -15.2 | 23.3 |
| 5 | 7.20 | -21.6 | 23.6 |
| 6 | 7.34 | -29.9 | 23.6 |
| 7 | 7.28 | -25.9 | 23.6 |
| 8 | 7.55 | -41.7 | 23.3 |
| 9 | 7.60 | -45.2 | 23.6 |
| 10 | 7.61 | -45.4 | 23.4 |
| 11 | 7.31 | -27.5 | 23.6 |
| 12 | 7.41 | -33.7 | 23.6 |
| 13 | 7.39 | -32.3 | 23.4 |
| 14 | 7.47 | -37.4 | 23.4 |
| 15 | 7.52 | -39.3 | 23.4 |
| Average | 7.31 | -28.26 | 23.50 |
| Minimum | 6.76 | -45.40 | 23.30 |
| Maximum | 7.61 | -3.50 | 23.60 |

For the same experiment above, supernatant solutions were also obtained. The pH data from replicate measurements from the resulting solutions separated from the water mixture are provided below. The pH values are between approximately 6.9 and approximately 7.53, as shown in TABLE 32. As above, this range indicates (and perhaps reaffirms) that the waste is not corrosive and could be stored in a variety of containers. Again, nonlimiting examples of containers include: stainless steel, plastic lined drums, metal drums, or other storage tanks made of polymers, metals or a combination of materials.

TABLE 32

Representative pH Values of Supernatant Solution from Experiments where Waste from CsCl, $BaCl_2$ and $SrCl_2 \cdot 6H_2O$ were Mixed

| Analysis # | pH | mV | Temperature (° C.) |
|---|---|---|---|
| 1 | 7.38 | -31.9 | 23.8 |
| 2 | 7.53 | -40.8 | 23.4 |
| 3 | 7.34 | -29.3 | 23.7 |
| 4 | 7.5 | -39 | 23.8 |
| 5 | 6.9 | -16.3 | 23.7 |
| 6 | 6.94 | -17.3 | 23.8 |
| 7 | 6.98 | -19.3 | 23.7 |
| 8 | 7.02 | -23 | 23.8 |
| 9 | 7.05 | -23.5 | 23.7 |
| 10 | 7.08 | -27.9 | 23.8 |

5. Pure End Member Experiment

Below demonstrates an example of a pure end member reaction. Here, 100 ml of 0.05 N $AgNO_3$ solution was reacted with 100 ml of 0.25 M Cl. The solution immediately turned white as expected. As shown in TABLE 33, the pH values for the resulting solution varied from about 6.47 to about 6.96. This near neutral pH range occurs because the acid-base pairs for $Ag^+$, $Cs$, $Cl^-$ and $NO_3^-$ are of similar strength with $HNO_3$, making a slightly stronger acid in the system than equilibration of the base CsOH. Also, this range indicates that the waste is stable for storage in the same or similar manner as described above, where a variety of containers may be used.

TABLE 33 pH Values of Resulting Suspension from the Reaction of 100 ml of 0.05 N $AgNO_3$ solution was reacted with 100 ml of 0.25 M Cl solution.

| Analysis # | pH | mV | Temperature (° C.) |
|---|---|---|---|
| 1 | 6.47 | −10.9 | 23.1 |
| 2 | 6.92 | −13.9 | 23.1 |
| 3 | 7 | −18.9 | 23.2 |
| 4 | 6.96 | −18.2 | 23.1 |
| 5 | 6.88 | −13.3 | 23.2 |
| 6 | 6.74 | −5.5 | 23.2 |
| 7 | 6.74 | −5.2 | 23.2 |
| 8 | 6.71 | −3.4 | 23.2 |
| 9 | 6.47 | −11.1 | 23.4 |
| 10 | 6.5 | −9.1 | 23.1 |
| 11 | 6.52 | −7.7 | 23.1 |

F. Proving the Exchange of $Cs^+$

Transmission electron microscopy investigation of the aqueous clay suspension 115 indicates that the material does indeed exchange with Cs and sequesters the cation. The crystallinity of the montmorillonite generally increases with the exchange of Cs into the structure. SAED data show that diffraction along (hk0) in Na-montmorillonite particles is heavily streaked as expected from the turbostratic stacking. However, the Cs-exchanged montmorillonite shows discrete spots along (hk0) in a pseudohexagonal net indicating a higher degree of crystallinity. The overall morphology of the particles does not appear to change significantly.

The foregoing descriptions of the embodiments of the present invention have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the present invention and its practical application to thereby enable others skilled in the art to best utilize it in various embodiments and with various modifications as are suited to the particular use contemplated without departing from the spirit and scope of the present invention. In fact, after reading the above description, it will be apparent to one skilled in the relevant art(s) how to implement the present invention in alternative embodiments. Thus, the present invention should not be limited by any of the above described example embodiments. For example, the present invention may be practiced over water treatment plants, environmental and/or biohazardous spills, etc. Further, the present invention may be used for containing chemical and/or biological weapons (e.g., anthrax, small pox, etc.).

In addition, it should be understood that any figures, graphs, tables, examples, etc., which highlight the functionality and advantages of the present invention, are presented for example purposes only. The architecture of the disclosed is sufficiently flexible and configurable, such that it may be utilized in ways other than that shown. For example, the steps listed in any flowchart may be reordered or only optionally used in some embodiments.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the present invention of the application. The Abstract is not intended to be limiting as to the scope of the present invention in any way.

Furthermore, it is the applicants' intent that only claims that include the express language "means for" or "step for" be interpreted under 35 U.S.C. § 112, paragraph 6. Claims that do not expressly include the phrase "means for" or "step for" are not to be interpreted under 35 U.S.C. § 112, paragraph 6.

A portion of the present invention of this patent document contains material which is subject to copyright protection. The copyright owner has no objection to the facsimile reproduction by anyone of the patent document or the patent invention, as it appears in the Patent and Trademark Office patent file or records, but otherwise reserves all copyright rights whatsoever.

What is claimed is:

1. A radioactive material sequestration system comprising:
    a. a radionuclide containment composition dispenser that holds and dispenses a radionuclide containment composition to remove radionuclides from a radioactive material, forming an aqueous slurry upon contact with the radioactive material, said radionuclide containment composition consisting of a mixture of a clay mineral and water;
    b. a sorption based media container that:
        i. holds a sorption based media;
        ii. receives the aqueous slurry; and
        iii. sequesters said radionuclides; and
    c. a probe that detects the radionuclides and aids in pushing the aqueous slurry towards the sorption based media, the probe having:
        i. an illuminator device;
        ii. a camera; and
        iii. a sensor.

2. The radioactive material sequestration system according to claim 1, wherein said probe is an ultrasonic probe.

3. The radioactive material sequestration system according to claim 1, wherein said clay mineral is montmorillonite.

4. The radioactive material sequestration system according to claim 1, wherein a weight ratio of said clay mineral to said water ranges from 1:99 to 99:1.

5. The radioactive material sequestration system according to claim 1, wherein said mixture being refined by filtering said mixture with sieves to remove coarse material.

6. The radioactive material sequestration system according to claim 5, wherein an aperture size of said sieves ranges from 300 µm to <38 µm.

7. The radioactive material sequestration system according to claim 1, wherein said sorption based media comprises at least one mineral from a palygorskite-sepiolite mineral group.

8. The radioactive material sequestration system according to claim 1, wherein said sorption based media sequesters said radionuclides by:
    a. chemical ion exchange;
    b. mechanical separation of floccules, said floccules produced by the contact of said radionuclide containment composition with said radioactive material; and
    c. a combination thereof.

* * * * *